(12) United States Patent
Yamamoto et al.

(10) Patent No.: US 8,325,917 B2
(45) Date of Patent: Dec. 4, 2012

(54) REPRODUCING DEVICE, RECORDING DEVICE, RECORDING MEDIUM, DATA PROCESSING METHOD, DATA PROCESSING PROGRAM, DATA RECORDING METHOD, DATA RECORDING PROGRAM, AND INTEGRATED CIRCUIT

(75) Inventors: Masaya Yamamoto, Arcadia, CA (US); Senichi Onoda, Osaka (JP); Minehisa Nagata, Hyogo (JP); Kaoru Murase, Nara (JP)

(73) Assignee: Panasonic Corporation, Osaka (JP)

( * ) Notice: Subject to any disclaimer, the term of this patent is extended or adjusted under 35 U.S.C. 154(b) by 942 days.

(21) Appl. No.: 11/658,177

(22) PCT Filed: May 23, 2006

(86) PCT No.: PCT/JP2006/310274
§ 371 (c)(1),
(2), (4) Date: Mar. 28, 2007

(87) PCT Pub. No.: WO2006/126554
PCT Pub. Date: Nov. 30, 2006

(65) Prior Publication Data
US 2008/0130885 A1 Jun. 5, 2008

Related U.S. Application Data

(60) Provisional application No. 60/683,653, filed on May 23, 2005, provisional application No. 60/683,654, filed on May 23, 2005, provisional application No. 60/689,669, filed on Jun. 13, 2005, provisional application No. 60/689,530, filed on Jun. 13, 2005.

(51) Int. Cl.
*H04N 7/167* (2006.01)

(52) U.S. Cl. ........ 380/201; 380/205; 380/207; 380/217; 380/230; 369/84; 369/85; 705/57; 705/58

(58) Field of Classification Search .................. 380/201, 380/205, 207, 217, 230; 369/84, 85; 705/57, 705/58
See application file for complete search history.

(56) References Cited

U.S. PATENT DOCUMENTS

| | | | |
|---|---|---|---|
| 6,477,649 B2 | 11/2002 | Kambayashi et al. | |
| 6,757,911 B1 * | 6/2004 | Shimoji et al. | 725/136 |
| 7,028,340 B1 * | 4/2006 | Kamada et al. | 726/29 |
| 7,142,692 B2 | 11/2006 | Arimura et al. | |
| 2003/0004888 A1 | 1/2003 | Kambayashi et al. | |
| 2003/0101142 A1 | 5/2003 | Kambayashi et al. | |
| 2003/0112973 A1 * | 6/2003 | Tsutsui et al. | 380/46 |
| 2004/0049694 A1 * | 3/2004 | Candelore | 713/200 |
| 2006/0150251 A1 * | 7/2006 | Takashima et al. | 726/26 |

FOREIGN PATENT DOCUMENTS

| | | |
|---|---|---|
| JP | 09-305492 | 11/1997 |
| JP | 11-283327 | 10/1999 |

(Continued)

*Primary Examiner* — Ashok Patel
*Assistant Examiner* — Brian Shaw
(74) *Attorney, Agent, or Firm* — Wenderoth Lind & Ponack, L.L.P.

(57) ABSTRACT

A data generating device is capable of preventing unauthorized extraction of plaintext content between decryption processing and digital watermark embedment processing. A content reproducing device obtains restoration information and, in accordance with the restoration information, selectively performs predetermined restoration processing and processing of embedding device unique information, on content data at a position shown by the restoration information.

14 Claims, 62 Drawing Sheets

SPECIFY OPERATION PROCESSING, TRANSFORMATION POSITION, AND OPERATION-USE PARAMETER IN TRANSFORMATION PROCESSING-USE PACKET

| TS PACKET HEADER | TS PACKET PAYLOAD | | | |
|---|---|---|---|---|
| | DATA TRANSFORMATION OPERATION PROCESSING | TRANSFORMATION POSITION | | DATA TRANSFORMATION OPERATION-USE PARAMETER |
| | | PACKET COUNT | IN-PACKET POSITION | |
| | 0x00 | 0x00000002 | 0x0A | 0xAABB..CCDD |

FOREIGN PATENT DOCUMENTS

| | | |
|---|---|---|
| JP | 2000-076136 | 3/2000 |
| JP | 2000-100069 | 4/2000 |
| JP | 2000-312291 | 11/2000 |
| JP | 2002-165191 | 6/2002 |
| JP | 2002-344730 | 11/2002 |
| JP | 2003-060884 | 2/2003 |
| JP | 2003-308096 | 10/2003 |
| JP | 2003-308099 | 10/2003 |

\* cited by examiner

FIG.4A SPECIFY OPERATION PROCESSING, TRANSFORMATION POSITION, AND OPERATION-USE PARAMETER IN TRANSFORMATION PROCESSING-USE PACKET

| TS PACKET HEADER | TS PACKET PAYLOAD | | | |
|---|---|---|---|---|
| | DATA TRANSFORMATION OPERATION PROCESSING | TRANSFORMATION POSITION | | DATA TRANSFORMATION OPERATION-USE PARAMETER |
| | | PACKET COUNT | IN-PACKET POSITION | |
| | 0x00 | 0x00000002 | 0x0A | 0xAABB..CCDD |

FIG.4B SPECIFY ONLY TRANSFORMATION POSITION IN TRANSFORMATION PROCESSING-USE PACKET

| TS PACKET HEADER | TS PACKET PAYLOAD | | | |
|---|---|---|---|---|
| | DATA TRANSFORMATION OPERATION PROCESSING | TRANSFORMATION POSITION | | DATA TRANSFORMATION OPERATION-USE PARAMETER |
| | | PACKET COUNT | IN-PACKET POSITION | |
| | — | 0x00000008 | 0x0A | — |

FIG.5A

SPECIFY OPERATION MODE AND
OPERATION-USE PARAMETER POSITION IN BYTE CODE

| OPERATION MODE | DATA TRANSFORMATION OPERATION PROCESSING | SPECIFICATION OF DATA TRANSFORMATION OPERATION-USE PARAMETER POSITION |
|---|---|---|
| 0x00 | — | 0x0123 |

FIG.5B

SPECIFY OPERATION MODE, TRANSFORMATION PROCESSING,
AND OPERATION-USE PARAMETER IN BYTE CODE

| OPERATION MODE | DATA TRANSFORMATION OPERATION PROCESSING | DATA TRANSFORMATION OPERATION-USE PARAMETER |
|---|---|---|
| 0x11 | 0x01 | 0xAABB..CCDD |

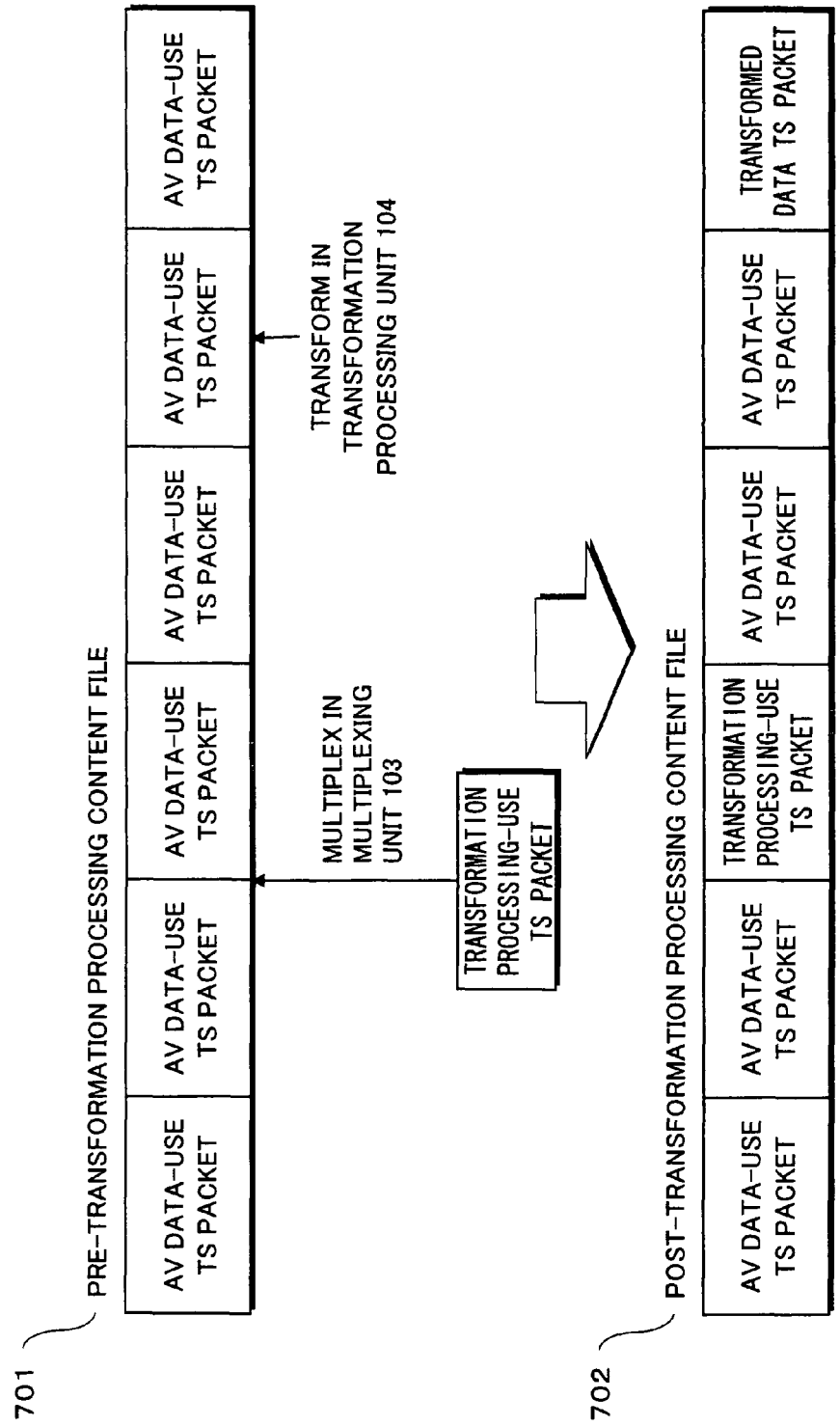

FIG.8

| OPERATION MODE | DATA TRANSFORMATION OPERATION PROCESSING | TRANSFORMATION POSITION | DATA TRANSFORMATION OPERATION PARAMETER | DATA TRANSFORMATION OPERATION-USE PARAMETER | SPECIFICATION OF DATA TRANSFORMATION OPERATION PARAMETER POSITION | USE OF TERMINAL ID |
|---|---|---|---|---|---|---|
| 0x00 | PACKET(※1) | PACKET | PACKET | PACKET | CODE(※2) | — |
| 0x01 | CODE | PACKET | PACKET | CODE | — | — |
| 0x02 | PACKET | PACKET | PACKET | PACKET+CODE | — | — |
| 0x03 | PACKET | CODE | PACKET | PACKET | CODE | — |
| 0x10 | PACKET | PACKET | PACKET | PACKET | CODE | ○(※3) |
| 0x11 | CODE | PACKET | PACKET | CODE | — | ○ |
| 0x12 | PACKET | PACKET | PACKET | PACKET+CODE | — | ○ |
| 0x13 | PACKET | CODE | CODE | PACKET | CODE | ○ |

※1: TRANSFORMATION PROCESSING-USE PACKET

※2: BYTE CODE DATA

※3: PROCESS INCLUDING TERMINAL ID

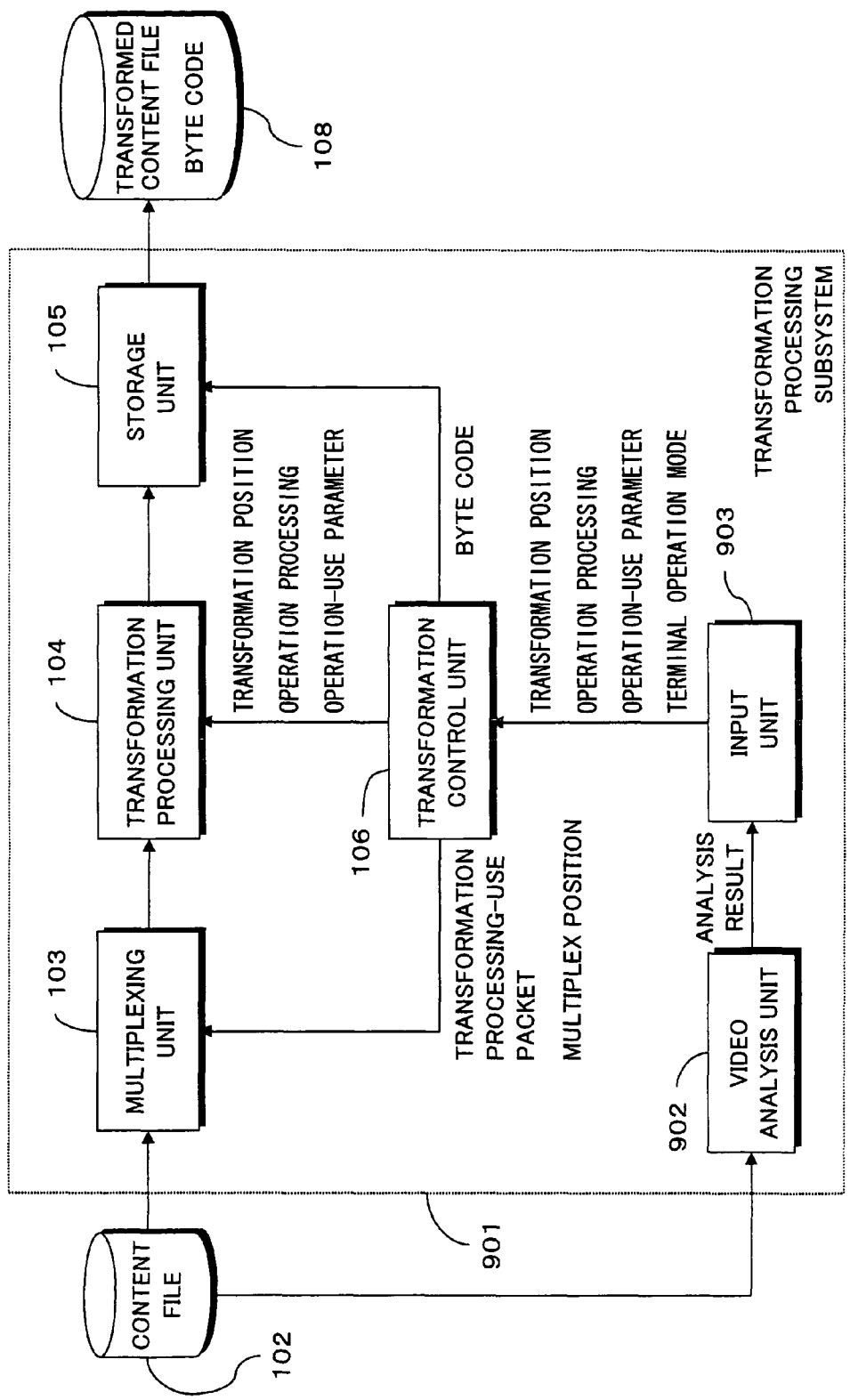

FIG.10

| SPECIFICATION INFORMATION IN TS PACKET | CONTENT UNIQUE MODE (0x01) | DEVICE UNIQUE MODE (0x10) | DEVICE UNIQUE MODE + CONTENT UNIQUE MODE (0x11) | NON-TRANSFORMATION MODE (0x00) |
|---|---|---|---|---|
| CONTENT UNIQUE MODE (0x01) | MATCH | MISMATCH | MATCH | MISMATCH |
| DEVICE UNIQUE MODE (0x10) | MISMATCH | MATCH | MATCH | MISMATCH |

RESTORATION INFORMATION

SECRET PARAMETER IDENTIFYING VALUE, SECRET PARAMETER
1, 12345678h
2, AABBCCDDh
3, 55555555h
  .
  .
  .
13, FE130479h
14, AEDB57CAh
  .
  .
  .

SECRET PARAMETER LIST SPECIFIED BY BYTE CODE

RESTORATION INFORMATION

```
#PACKET COUNT FROM HEAD PACKET, RESTORATION INFORMATION
00001234, RESTORATION INFORMATION 1
00005432, RESTORATION INFORMATION 2
00022222, RESTORATION INFORMATION 3
       .
       .
       .
34567890, RESTORATION INFORMATION 329
34569012, RESTORATION INFORMATION 330
       .
       .
       .
```

RESTORATION INFORMATION FILE

FIG.37

| BIT | MEANING |
|---|---|
| 00 | RESTORATION IS NOT PERFORMED |
| 01 | RESTORATION IS PERFORMED |
| 10 | DEVICE UNIQUE INFORMATION EMBEDMENT |
| 11 | RESERVED |

FIG.38

| PACKET COUNT FROM HEAD OF PROTECTED CONTENT DATA (B1101) | SECRET PARAMETER IDENTIFYING VALUE (B1102) | SECRET PARAMETER (B1103) |
|---|---|---|
| 0x00001234 | 0x1111 | 0x12345678 |
| 0x00005678 | 0x2222 | 0xAABBCCDD |
| ... | ... | ... |
| 0x0000CDEF | 0x9999 | 0x55555555 |

FIG.43

| PROTECTED CONTENT DATA NAME (B1601) | PACKET POSITION INFORMATION (B1602) | RESTORATION INFORMATION IDENTIFYING VALUE (B1603) | RESTORATION INFORMATION (B1604) |
|---|---|---|---|
| Clip_0001.m2ts | 0x00000001 | 0x01 | RESTORATION INFORMATION #1 |
| Clip_0001.m2ts | 0x00000002 | 0x02 | RESTORATION INFORMATION #2 |
| Clip_0001.m2ts | 0x00000005 | 0x03 | RESTORATION INFORMATION #3 |
| ... | ... | ... | ... |
| Clip_000F.m2ts | 0x000000FF | 0xFF | RESTORATION INFORMATION #n |

FIG.50A  SPECIFY OPERATION PROCESSING, TRANSFORMATION POSITION,
AND OPERATION-USE PARAMETER IN TRANSFORMATION PROCESSING-USE PACKET

| TS PACKET HEADER | DATA TRANSFORMATION OPERATION PROCESSING | TS PACKET PAYLOAD | | |
|---|---|---|---|---|
| | | TRANSFORMATION POSITION | | DATA TRANSFORMATION OPERATION-USE PARAMETER |
| | | PACKET COUNT | IN-PACKET POSITION | |
| — | 0x00 | 0x00000002 | 0x0A | 0xAABB..CCDD |

FIG.50B  SPECIFY ONLY TRANSFORMATION POSITION IN TRANSFORMATION
PROCESSING-USE PACKET

| TS PACKET HEADER | DATA TRANSFORMATION OPERATION PROCESSING | TS PACKET PAYLOAD | | |
|---|---|---|---|---|
| | | TRANSFORMATION POSITION | | DATA TRANSFORMATION OPERATION-USE PARAMETER |
| | | PACKET COUNT | IN-PACKET POSITION | |
| — | — | 0x00000008 | 0x0A | — |

FIG.51A

SPECIFY OPERATION MODE AND
OPERATION-USE PARAMETER POSITION IN BYTE CODE

| OPERATION MODE | DATA TRANSFORMATION OPERATION PROCESSING | SPECIFICATION OF DATA TRANSFORMATION OPERATION-USE PARAMETER POSITION |
|---|---|---|
| 0x00 | — | 0x0123 |

FIG.51B

SPECIFY OPERATION MODE, TRANSFORMATION PROCESSING,
AND OPERATION-USE PARAMETER IN BYTE CODE

| OPERATION MODE | DATA TRANSFORMATION OPERATION PROCESSING | DATA TRANSFORMATION OPERATION-USE PARAMETER |
|---|---|---|
| 0x11 | 0x01 | 0xAABB..CCDD |

FIG.54

| OPERATION MODE | DATA TRANSFORMATION OPERATION PROCESSING | TRANSFORMATION POSITION | DATA TRANSFORMATION OPERATION-USE PARAMETER | SPECIFICATION OF DATA TRANSFORMATION OPERATION PARAMETER POSITION | USE OF TERMINAL ID |
|---|---|---|---|---|---|
| 0x00 | PACKET(※1) | PACKET | PACKET | CODE(※2) | — |
| 0x01 | CODE | PACKET | CODE | — | — |
| 0x02 | PACKET | PACKET | PACKET + CODE | — | — |
| 0x03 | PACKET | CODE | PACKET | CODE | — |
| 0x10 | PACKET | PACKET | PACKET | CODE | O(※3) |
| 0x11 | CODE | PACKET | CODE | — | O |
| 0x12 | PACKET | PACKET | PACKET + CODE | — | O |
| 0x13 | PACKET | CODE | PACKET | CODE | O |

※1: TRANSFORMATION PROCESSING-USE PACKET

※2: BYTE CODE DATA

※3: PROCESS INCLUDING TERMINAL ID

FIG.62

| OPERATION MODE (D701) | RESTORATION OPERATION PROCESSING (D702) | RESTORATION OPERATION-USE PARAMETER SPECIFICATION (D703) | | DEVICE UNIQUE INFORMATION (D706) |
|---|---|---|---|---|
| | | HEAD POSITION (D704) | DATA LENGTH (D705) | |
| 0x11 | 0x11 | 0x0000000A | 0x04 | 0x0011..EEFF |

FIG.64A
DEVICE UNIQUE MODE-USE

| TS PACKET HEADER (D901) | TS PACKET PAYLOAD (D902) | | | |
|---|---|---|---|---|
| | OPERATION MODE (D903) | RESTORATION OPERATION PROCESSING (D904) | TRANSFORMATION POSITION (D905) | RESTORATION OPERATION-USE PARAMETER (D908) |
| | | | PACKET (D906) | IN-PACKET POSITION (D907) | |
| | 0x10 | (0 EMBEDDED) | 0x00000008 | 0x64 | (0 EMBEDDED) |

FIG.64B
CONTENT UNIQUE MODE-USE

| TS PACKET HEADER (D901) | TS PACKET PAYLOAD (D902) | | | |
|---|---|---|---|---|
| | OPERATION MODE (D903) | RESTORATION OPERATION PROCESSING (D904) | TRANSFORMATION POSITION (D905) | RESTORATION OPERATION-USE PARAMETER (D908) |
| | | | PACKET (D906) | IN-PACKET POSITION (D907) | |
| | 0x01 | 0x00 | 0x00000002 | 0x64 | 0xAABB..CCDD |

FIG.65

| SPECIFICATION INFORMATION IN TS PACKET | CONTENT UNIQUE MODE (0x01) | DEVICE UNIQUE MODE (0x10) | DEVICE UNIQUE MODE + CONTENT UNIQUE MODE (0x11) | NON-TRANSFORMATION MODE (0x00) |
|---|---|---|---|---|
| CONTENT UNIQUE MODE (0x01) | MATCH | MISMATCH | MATCH | MISMATCH |
| DEVICE UNIQUE MODE (0x10) | MISMATCH | MATCH | MATCH | MISMATCH |

REPRODUCING DEVICE, RECORDING DEVICE, RECORDING MEDIUM, DATA PROCESSING METHOD, DATA PROCESSING PROGRAM, DATA RECORDING METHOD, DATA RECORDING PROGRAM, AND INTEGRATED CIRCUIT

This application is a National Stage Application of PCT/JP2006/310274 filed May 23, 2006, which claims priority to U.S. Provisional Application No. 60/683,653 filed May 23, 2005, U.S. Provisional Application No. 60/683,654 filed May 23, 2005, U.S. Provisional Application No. 60/689,669 filed Jun. 13, 2005, and U.S. Provisional Application No. 60/689,530 filed Jun 13, 2005.

BACKGROUND

1. Tecnical Field

The present invention relates to a method for storing data obtained by digitizing content that is a work such as a movie, onto a large-capacity medium such as a digital optical disc, and enabling the data to be completely acquired only in a specific terminal. In particular, the present invention relates to a technique for transforming content data for copyright protection, and a technique for reproducing content data that is recorded on a large-capacity medium and has been encrypted and transformed for copyright protection.

2. Background Art

Systems in which content that is a work such as a movie is digitized, and stored and distributed on a medium have become widespread. In such a system, the content is recorded on the medium in an encrypted form, in order to prevent unauthorized use of the content. A reproducing device reads the encrypted content from the medium, decrypts the encrypted content, and reproduces the decrypted content.

Furthermore, a technique for preventing unauthorized copying of the content which has undergone the decryption in the reproducing device is disclosed in patent document 1. According to this technique, a digital watermark is embedded in the content generated as a result of decrypting the encrypted content. In so doing, unauthorized copying of the generated content can be suppressed. Even if the content is unauthorizedly copied, the device which copied the content unauthorizedly can be specified.

Patent document 1: Japanese Patent Application Publication No. 2000-312291

Patent document 2: Japanese Patent Application Publication No. 2000-100069

According to the above technique, however, there is a possibility that, during transfer from a decryption circuit to a digital watermark superimposing circuit, plaintext content before embedding a digital watermark may be extracted and used unauthorizedly. In view of this, the present invention aims to provide a data generating device, a data processing device, a recording medium, a data recording method, a data processing method, a data recording program, a data processing program, and an integrated circuit that can prevent unauthorized extraction of content between decryption processing and digital watermark embedment processing.

SUMMARY

To achieve the stated aim, the present invention is a reproducing device for reproducing content data recorded on a recording medium, the content data and at least one piece of restoration information being recorded on the recording medium, each piece of restoration information including restoration position information that shows a position in the content data, a restoration-use parameter, and a restoration instruction flag, the restoration instruction flag indicating any of that (a) restoration processing of replacing part of the content data with the restoration-use parameter is performed, (b) the restoration processing is not performed, and (c) the restoration processing is performed depending on device unique information unique to the reproducing device, The reproducing device includes: a device unique information storage unit operable to store the device unique information; an acquisition unit operable to acquire the content data and each piece of restoration information from the recording medium; a position specification unit operable to specify, in the acquired content data, the position shown by the restoration position information included in the acquired piece of restoration information; a restoration unit operable to perform the restoration processing on part of the content data corresponding to the specified position, depending on the restoration instruction flag; and a reproducing unit operable to reproduce the content data after the restoration processing is performed depending on the restoration instruction flag.

Also, the present invention is a recording device for recording content data onto a recording medium, including: a transformation control unit operable to generate at least one piece of restoration information; and a storage unit operable to write the content data and the at least one piece of restoration information onto the recording medium, wherein each piece of restoration information includes restoration position information that shows a position in the content data, a restoration-use parameter, and a restoration instruction flag, and the restoration instruction flag indicates any of that (a) restoration processing of replacing part of the content data with the restoration-use parameter is performed, (b) the restoration processing is not performed, and (c) the restoration processing is performed depending on device unique information.

Also, the present invention is a recording medium on which content data and at least one piece of restoration information are recorded, wherein each piece of restoration information includes restoration position information that shows a position in the content data, a restoration-use parameter, and a restoration instruction flag, and the restoration instruction flag indicates any of that (a) restoration processing of replacing part of the content data with the restoration-use parameter is performed, (b) the restoration processing is not performed, and (c) the restoration processing is performed depending on device unique information.

EFFECTS OF THE INVENTION

The function of the "device unique information storage unit" is realized by a device unique information storage unit B133 in the following embodiment B, and a device unique information storage unit D133 in the following embodiment D. The function of the "acquisition unit" is realized by a disc reading unit B121 and a stream analysis unit B134 in the embodiment B, and a disc reading unit D121 and a content restoration processing unit D126 in the embodiment D. The functions of the "position specification unit" and "restoration unit" are realized by a content restoration processing unit B126 in the embodiment B, and the content restoration processing unit D126 in the embodiment D. The function of the "reproducing unit" is realized by a demultiplexing unit B127, a video decoder B128, and an audio decoder B129 in the embodiment B, and a demultiplexing unit D127, a video decoder D128, and an audio decoder D129 in the embodiment D.

Also, the function of the "transformation control unit" is realized by a transformation control unit A106 in the following embodiment A, and a transformation control unit C106 in the following embodiment C. The function of the "storage unit" is realized by a storage unit A105 in the embodiment A, and a storage unit C105 in the embodiment C.

According to this construction, the reproducing device determines whether to perform the restoration processing, and whether to perform the restoration processing depending on device unique information, in accordance with the restoration flag. Therefore, an authorized content provider can obtain information that differs depending on the device unique information, by checking whether the restoration processing has been performed for the position shown by the restoration position information of the content on which a series of restoration processing has completed. Which is to say, performing the restoration processing depending on the device unique information is substantially equivalent to embedding the device unique information (the digital watermark in the conventional techniques).

Thus, by employing a construction of selectively performing mere restoration processing and substantial device unique information embedment at each restoration position in the content data, there is no occasion for plaintext content, on which neither transformation processing such as encryption nor device unique information embedment has been performed, to exist in the reproducing device. As a result, the danger that the plaintext data is extracted and submitted to unauthorized use can be prevented.

Also, even when the restoration instruction flag indicates that the restoration processing is performed depending on the device unique information, that is, even when the restoration instruction flag substantially instructs to embed the device unique information, the operation actually performed by the restoration unit is the replacement with the restoration-use parameter. This being so, it is difficult for a third party to distinguish, based on the operation of the reproducing device, whether the device unique information was inserted or the mere restoration processing was performed. This prevents a third party from obtaining the plaintext content data while excluding part of the content data where the device unique information has been inserted.

Here, the present invention may be the reproducing device wherein each piece of restoration information is encrypted using a secret parameter, a byte code, in which a procedure of outputting the secret parameter is described in a form executable by the reproducing device, is further recorded on the recording medium, the reproducing device further includes: a byte code execution unit operable to execute the byte code; and a decryption unit operable to decrypt the encrypted piece of restoration information using the secret parameter output as a result of executing the byte code, and the restoration unit performs the restoration processing using the decrypted piece of restoration information.

Here, the present invention may be the recording device wherein the transformation control unit further encrypts each piece of restoration information using a secret parameter, and generates a byte code including a procedure of outputting the secret parameter, and the storage unit writes the encrypted piece of restoration information onto the recording medium, and further writes the generated byte code onto the recording medium.

Here, the present invention may be the recording medium wherein each piece of restoration information is encrypted using a secret parameter, and a byte code including a procedure of outputting the secret parameter is further recorded on the recording medium.

The function of the "byte code execution unit" is realized by a byte code execution unit B124 in the embodiment B, and a byte code execution unit D124 in the embodiment D. The function of the "decryption unit" is realized by a packet decryption unit B135 in the embodiment B, and a packet decryption unit in the embodiment D.

According to this construction, the restoration information is encrypted, so that the restoration position information, the restoration-use parameter, and the restoration flag are unknown to a third party. This prevents an unauthorized third party from unauthorizedly restoring the content data.

Here, the present invention may be the reproducing device wherein each piece of restoration information is multiplexed in the content data, and the acquisition unit includes: a reading unit operable to read the content data including each piece of restoration information; and an analysis unit operable to detect each piece of restoration information in the content data.

Here, the present invention may be the recording device further including: a multiplexing unit operable to multiplex each piece of restoration information in the content data, wherein the storage unit writes the content data in which each piece of restoration information has been multiplexed, onto the recording medium.

Here, the present invention may be the recording medium wherein each piece of restoration information is multiplexed in the content data.

The function of the "reading unit" is realized by the disc reading unit B121 in the embodiment B, and the disc reading unit D121 in the embodiment D. The function of the "analysis unit" is realized by a stream analysis unit B134 in the embodiment B, and the content restoration processing unit D126 in the embodiment D.

Also, the function of the "multiplexing unit" is realized by a multiplexing unit A103 in the embodiment A, and a multiplexing unit C103 in the embodiment C.

According to this construction, the restoration information is multiplexed in the content data. This being so, in the case where the position specification unit and the restoration unit are implemented on a single CPU, just transferring the content data to this single CPU enables the position specification unit and the restoration unit to easily acquire the restoration information and the content data respectively.

Here, the present invention may be the reproducing device wherein a restoration file constituted by the at least one piece of restoration information is recorded on the recording medium, and the acquisition unit acquires each piece of restoration information from the restoration file.

Here, the present invention may be the recording device wherein the at least one piece of restoration information generated by the transformation control unit constitutes a restoration file, and the storage unit writes the restoration file constituted by the at least one piece of restoration information, onto the recording medium.

Here, the present invention may be the recording medium wherein a restoration file constituted by the at least one piece of restoration information is recorded on the recording medium.

According to this construction, the restoration information is recorded separately from the content data. This being so, in the case where the position specification unit and the restoration unit are implemented on separate CPUs, the content data and the restoration information can easily be transferred to the CPUs to which the respective units belong.

BRIEF DESCRIPTION OF THE DRAWINGS

FIG. 4 shows multiplexing processing in the embodiment A1 of the present invention.

FIG. 5 shows a structure of restoration information in the embodiment A1 of the present invention.

FIG. 7 shows a structure of a restoration instruction descriptor in the embodiment A1 of the present invention.

FIG. 8 shows a structure of a private section in the embodiment A1 of the present invention.

FIG. 9 shows a structure of a TS packet that includes a private section in the embodiment A1 of the present invention.

FIG. 10 shows a structure of a secret parameter list in the embodiment A1 of the present invention.

FIG. 18 shows a structure of a secret parameter list in the embodiment A2 of the present invention.

FIG. 37 shows meanings of a restoration instruction flag in the embodiment B1.

FIG. 38 shows a data structure of a secret parameter held by a byte code in the embodiment B1.

FIG. 43 shows a data structure example of a restoration information file in the embodiment B2.

FIG. 50 shows a structure of a transformation processing-use packet in the embodiment C1 of the present invention. FIG. 50A shows a structure of a transformation processing-use packet specifying operation processing, a transformation position, and an operation-use parameter.

FIG. 50B shows a structure of a transformation processing-use packet specifying only a transformation position.

FIG. 51 shows a structure of byte code data in the embodiment C1 of the present invention. FIG. 51A shows a structure of a byte code specifying an operation mode and an operation-use parameter use position.

FIG. 51B shows a structure of a byte code specifying an operation mode, transformation processing, and an operation-use parameter.

FIG. 54 shows a combination of information transmitted by a transformation processing-use packet and byte code data in the embodiment C1 of the present invention.

FIG. 62 shows a data structure example of restoration setting information in the embodiment D of the present invention.

FIG. 64 shows a data structure example of a restoration processing-use TS packet in the embodiment D of the present invention. FIG. 64A shows a structure of a restoration processing-use TS packet for use in a device unique mode.

FIG. 64B shows a structure of a restoration processing-use TS packet for use in a content unique mode.

FIG. 65 shows a matching criterion example of an operation mode in the embodiment D of the present invention.

DESCRIPTION OF REFERENCE NUMERALS

A101 . . . transformation processing subsystem
A103 . . . multiplexing unit
A104 . . . transformation processing unit
A105 . . . storage unit
A106 . . . transformation control unit
A107 . . . input unit
B102 . . . content reproducing device
B121 . . . disc reading unit
B122 . . . reproduction control unit
B123 . . . user operation reception unit
B124 . . . byte code execution unit
B125 . . . stream decryption unit
B126 . . . content restoration processing unit
B127 . . . demultiplexing unit
B128 . . . video decoder
B129 . . . audio decoder
B130 . . . content key generation unit
B131 . . . revocation information processing unit
B132 . . . device key storage unit
B133 . . . device unique information storage unit
B134 . . . stream analysis unit
B135 . . . packet decryption unit
C101 . . . transformation processing subsystem
C103 . . . multiplexing unit
C104 . . . transformation processing unit
C105 . . . storage unit
C106 . . . transformation control unit
C107 . . . input unit
D102 . . . content reproducing device
D121 . . . disc reading unit
D122 . . . reproduction control unit
D123 . . . user operation reception unit
D124 . . . byte code execution unit
D125 . . . decryption unit
D126 . . . content restoration processing unit
D127 . . . demultiplexing unit
D128 . . . video decoder
D129 . . . audio decoder
D130 . . . content key generation unit
D131 . . . revocation information processing unit
D132 . . . device key storage unit
D133 . . . device unique information storage unit

DETAILED DESCRIPTION

Below, the embodiments of the present invention are described with reference to drawings. It is to be noted that the present invention is by no means limited to these embodiments and may take various forms that do not depart from the scope of the invention.

1. Embodiment A: Disc Production System (Embodiment A1)

Figure 1:
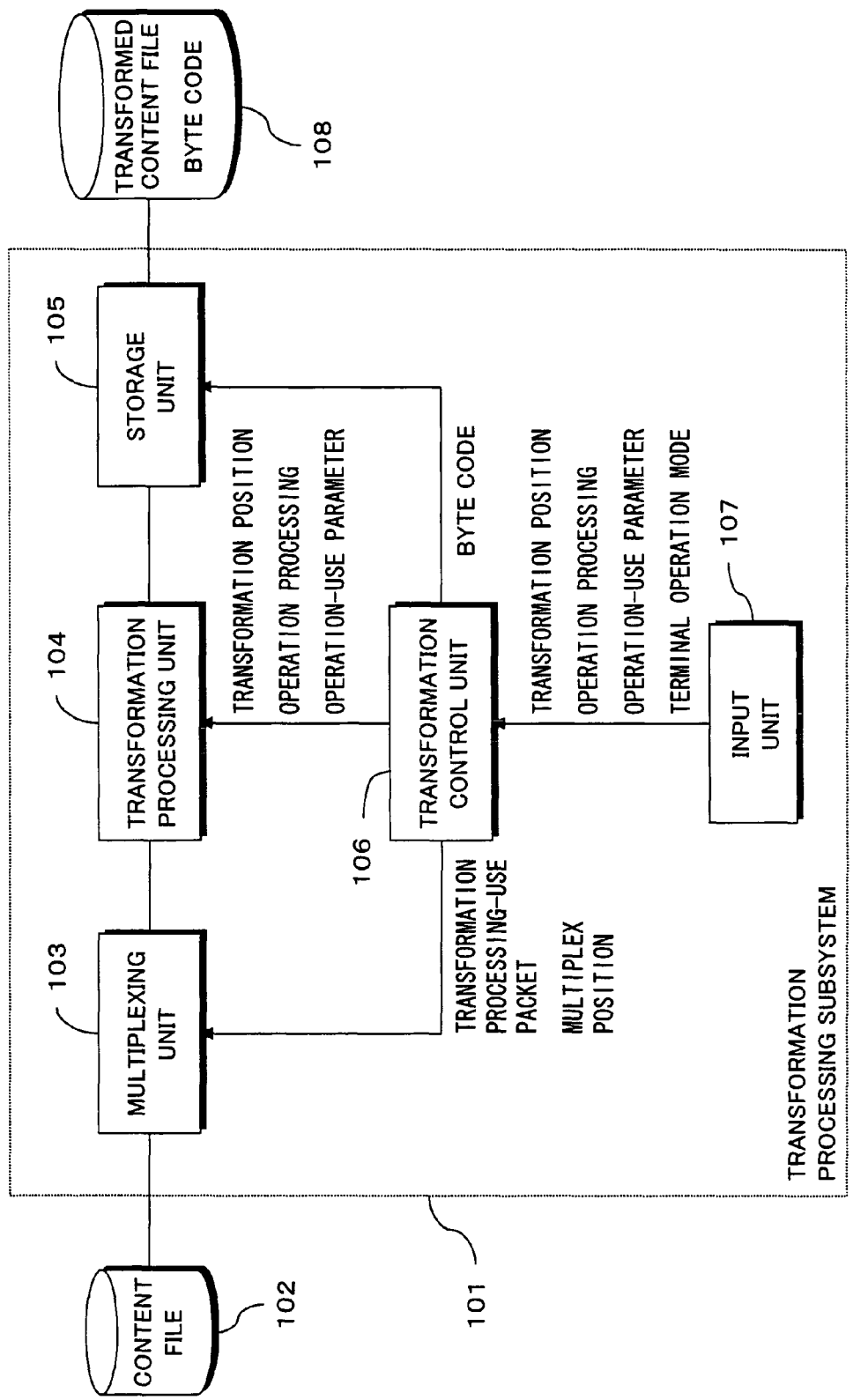
FIG. 1 is a block diagram showing a structure of a transformation processing subsystem in an embodiment A1 of the present invention.

FIG. 1 is a block diagram showing main parts of a structure of a transformation processing subsystem A101 for executing transformation processing in an embodiment A1 of the present invention. The transformation processing subsystem A101 includes a multiplexing unit A103, a transformation processing unit A104, a storage unit A105, a transformation control unit A106, and an input unit A107. The multiplexing unit A103 is connected to a recording medium A102 and the transformation control unit A106, and multiplexes, with a content file, multiplex information, which includes restoration information for restoring content that has been transformed according to instructions from the transformation control unit A106, and outputs the resultant content file. The transformation processing unit A104 is connected to the multiplexing unit A103 and the transformation control unit A106, and executes transformation processing on specified content packets in the content file according to instructions from the transformation control unit A106. The storage unit A105 is connected to the transformation processing unit A104 and the transformation control unit A106, and stores, on a recording medium A108, a post-transformation, transformed content file and byte code data that has been received from the transformation control unit A106. The transformation control unit A106 is connected to the input unit A107, and, based on data received from the input unit A107, issues transformation processing instructions to the multiplexing unit A103 and to the transformation processing unit A104. The transformation control unit A106 also generates the byte code data including processes and parameters for reversing the transformation corresponding to the transformation processing, and transmits the byte code data to the storage unit A105. The input unit A107 inputs data to specify the transformation processing.

Below, a disc production system including the transformation processing subsystem A101 is described with reference to FIG. 2.

Figure 2:
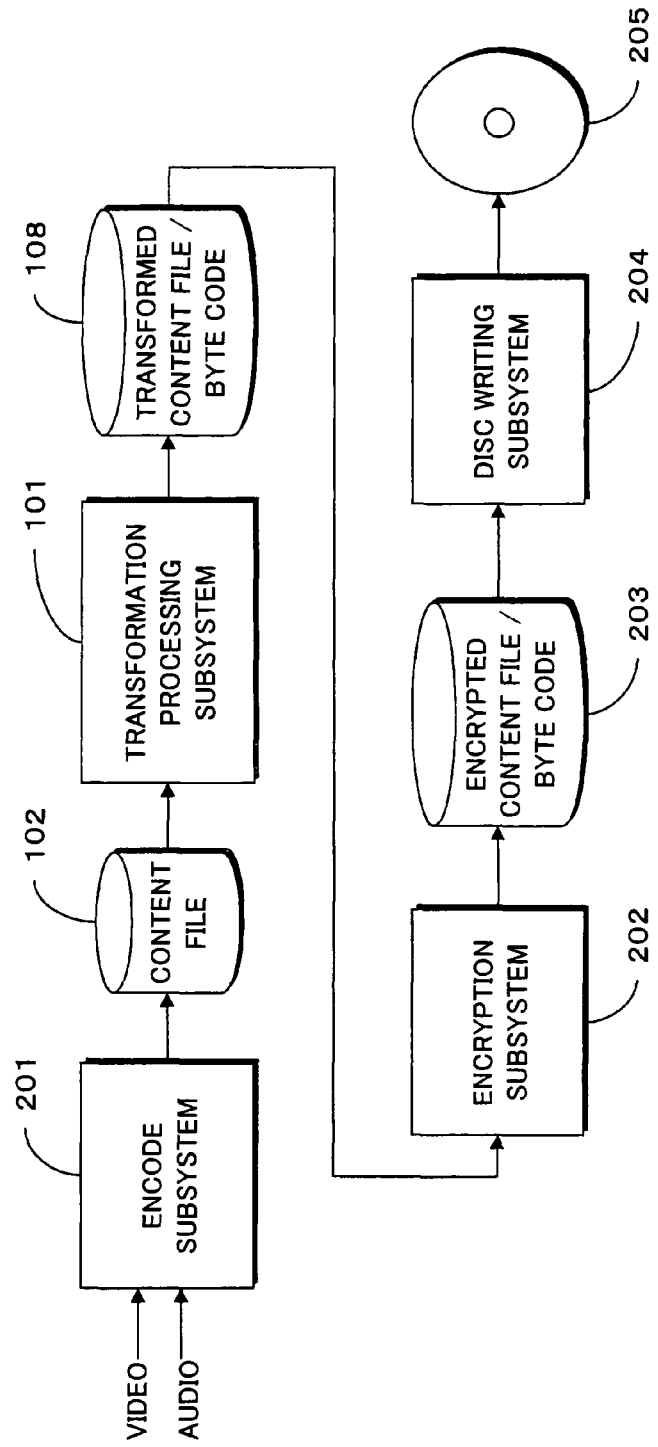
FIG. 2 is a block diagram showing a structure of a disc production system in the embodiment A1 of the present invention.

FIG. 2 is a block diagram showing main parts of a disc production system for producing a recording medium A205, such as an optical disc, in the embodiment A1 of the present invention. This disc production system includes an encode subsystem A201, the transformation processing subsystem A101, an encryption subsystem A202, and a disc writing subsystem A204. The encode subsystem A201 converts content data such as audio and video into a data format suitable for storing on the recording medium A205 such as the optical disc, and stores the result as a content file on the recording medium A102. The transformation processing subsystem A101 implements transformation processing on the content file stored in the recording medium A102, and stores a transformed content file together with the byte code data that corresponds to the transformation processing on the recording medium A108. The encryption subsystem A202 is connected to the recording medium A108, carries out encryption processing on the transformed content file to generate an encrypted content file, and stores at least the encrypted content file and the byte code data on a recording medium A203. The disc writing subsystem A204 is connected to the recording medium A203 and writes at least the encrypted content file and the byte code data to the recording medium A205. Thus at least the encrypted content file and the byte code data are stored in the recording medium A205. Further, a key for decrypting the encrypted content file may also be stored in the recording medium A205.

An operation of the transformation processing subsystem A101 having the kind of structure described above is described with reference to an operation flowchart of FIG. 3.

Figure 3:
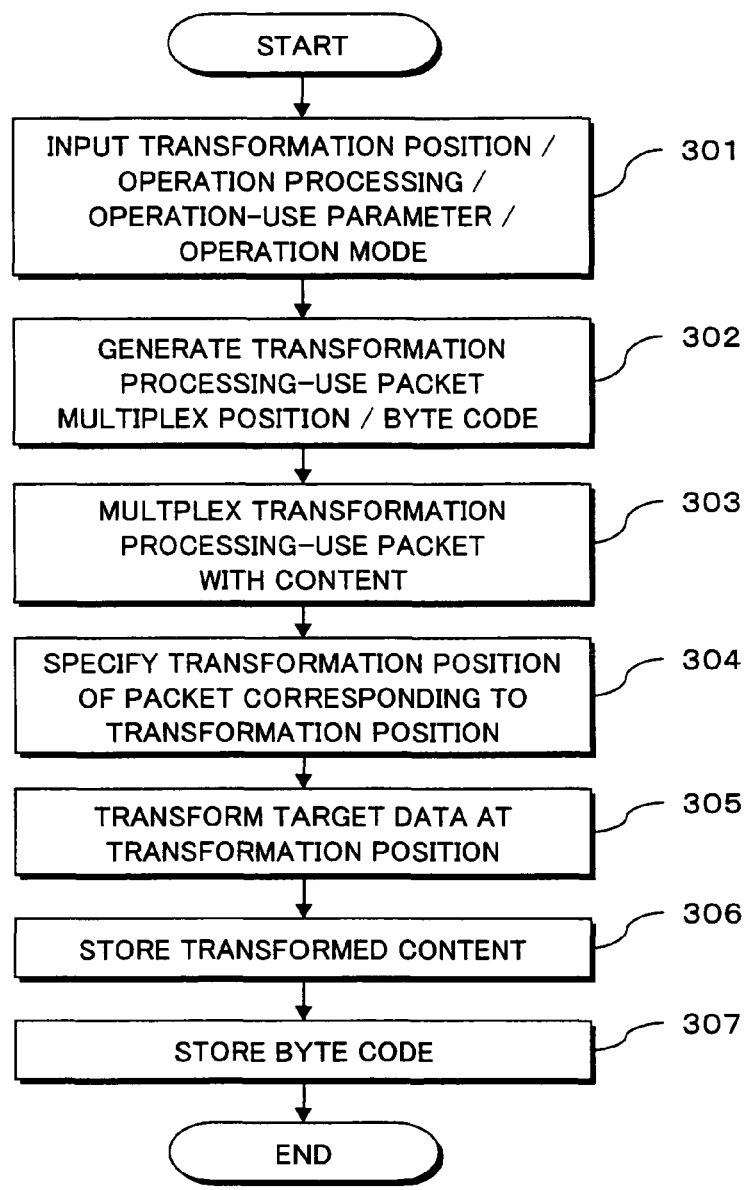
FIG. 3 is an operation flowchart showing an operation of the transformation processing subsystem in the embodiment A1 of the present invention.

FIG. 3 is an operation flowchart showing the operation of the transformation processing subsystem A101.

In step SA301, various information is input into the transformation control unit A106 from the input unit A107. This information includes: transformation position information indicating the ordinal number, counted from the head packet of a content file, of a packet and the ordinal numbers of the bytes within the packet that are to be transformed; operation processing information indicating which operation of a set of operations including logic operations such as XOR (Exclusive OR) and encryption methods such as AES (Advanced Encryption Standard) is to be performed; an operation-use parameter for use in operation processing; and an operation mode which is information for judging, on the basis of information such as a terminal ID that specifies a reproducing terminal, whether or not to perform restoration processing at a given reproducing terminal for reproducing the recording medium A205.

Next, in step SA302, based upon the information input in step SA301, the transformation control unit A106 generates multiplex information that includes restoration information, and generates a multiplex position and the byte code data. The multiplex position is information specifying the ordinal number from the head of the content file of the packet at which the generated multiplex information is multiplexed. The multiplex position is generated to allow for processing time at the reproducing terminal, so that the multiplex information is multiplexed a certain number of packets before the transformation position specified by the above transformation position information. The multiplex information and the byte code data are described at a later stage in this description. The transformation control unit A106 transmits the generated multiplex information and the multiplex position to the multiplexing unit A103, transmits the transformation position information, the operation processing information, and the operation-use parameter to the transformation processing unit A104, and transmits the generated byte code data to the storage unit A105.

Next, in step SA303, the multiplexing unit A103 multiplexes the multiplex information into a position in the content file specified by the multiplex position.

Next, in step SA304, the transformation processing unit A104 specifies the packet that is to be transformed and the transformation target data, the data that is to transformed within the packet, on the basis of the transformation position.

Next, in step SA305, the transformation processing unit A104 executes operation processing using the received operation-use parameter on the transformation target data in the specified transformation packet. For example, when the operation processing is an XOR operation, the transformation processing unit A104 takes the XOR sum of the transformation target data and the operation-use parameter, and overwrites (replaces) the transformation target data with the resulting value. Note that the operation processing is not limited to an XOR operation, but may consist of other logic operations or encryption processes. Alternatively, the transformation target data may simply be overwritten with the operation-use parameter. If this is the case, before overwriting the transformation target data, the transformation processing unit A104 stores the transformation target data in the multiplex information as a restoration-use parameter. To put this processing into practice, steps SA304 and SA305 may be executed before steps SA302 and SA303.

Next, in step SA306, the storage unit A105 stores the transformed content file that has finished undergoing transformation processing on the recording medium A108.

Next, in step SA307, the storage unit A105 stores the byte code data on the recording medium A108 in a different file from the transformed content file.

Note that a plurality of transformation positions can be specified within one content file, in which case, in step SA301, operation processing and an operation-use parameter are input for each of the plurality of transformation positions. Transformation can then be realized by repeating step SA302 to step SA305 for each of the plurality of transformation positions.

FIG. 4 shows a representation of the transformed content file generated via the kind of operation flow described above. In FIG. 4, the multiplex information is represented as a restoration processing-use TS (transport stream) packet that includes restoration information for restoring the content. A post-transformation processing content file A402, which is a content file after transformation processing, is generated by the multiplexing unit A103 multiplexing a restoration processing-use TS packet with a pre-transformation processing content file A401, and by the transformation processing unit A104 carrying out transformation processing. Here, the restoration processing-use packet has a packet identifier that is different from those of other packets in the content file.

The restoration information included in the multiplex information and the byte code data generated using the above operation flow, are described below. The restoration information and the byte code data are used at the reproducing terminal for reversing the transformation processing, and respectively include information indicated in FIG. 5 and FIG. 10. The byte code data is, for example, the type of code executable in a virtual operation unit, such as a JAVA virtual machine, and is the data describing a code executable at the reproducing terminal.

Figure 6:
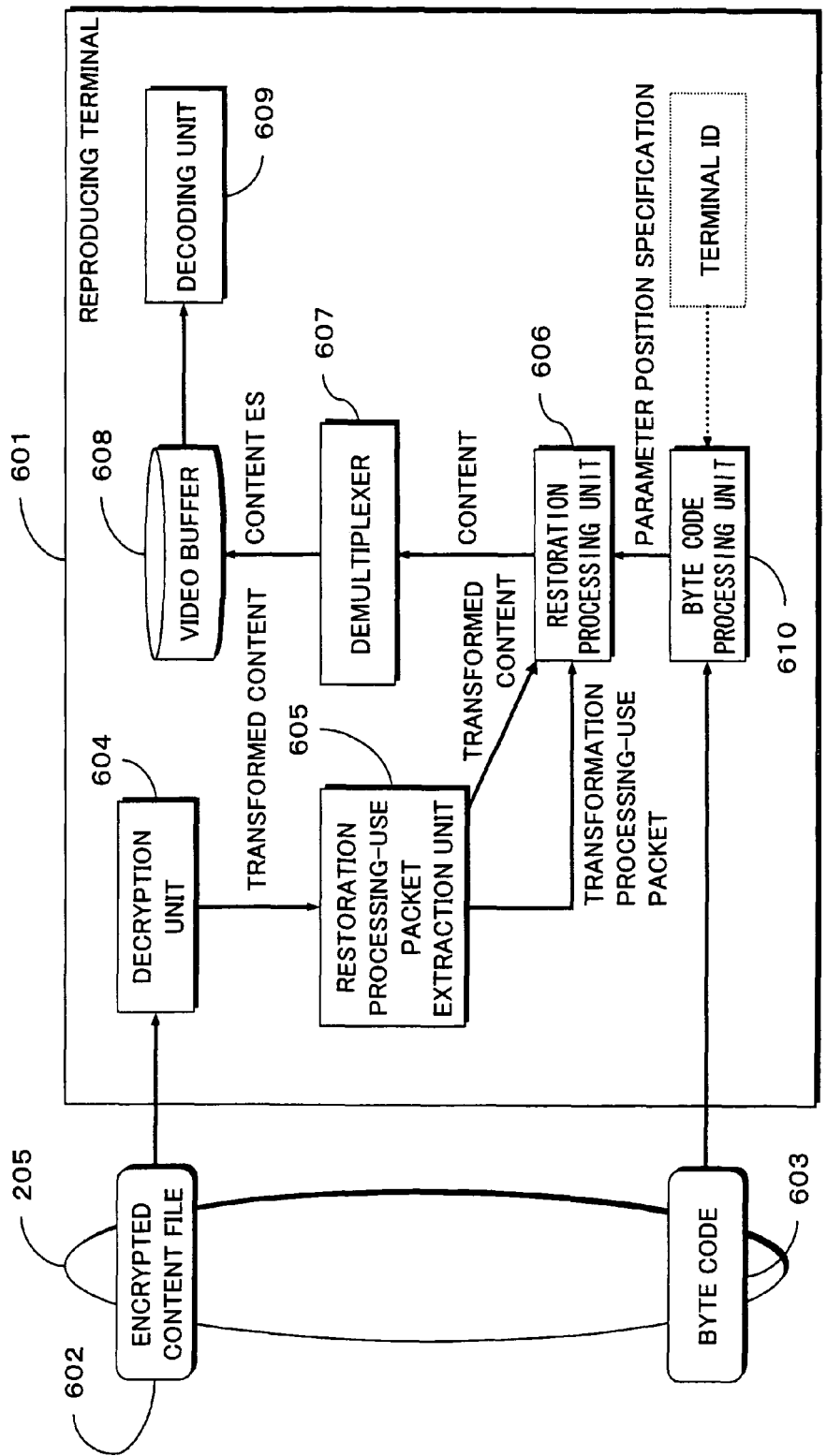
FIG. 6 shows meanings of a restoration instruction flag in the restoration information in the embodiment A1 of the present invention.

A piece of restoration information A501 of FIG. 5 includes a restoration instruction flag for judging whether or not to perform the restoration processing, or for judging whether or not to reference a terminal ID before carrying out restoration processing, as shown in FIG. 6. For the case when the restoration instruction flag indicates terminal ID reference, the restoration information further includes: a terminal ID reference position specifying which value of the terminal ID to reference; a relative packet count indicating the ordinal number, counted from the restoration processing-use packet, of the packet that is to be restored, and thereby acting as a restoration position; an in-packet position indicating a position of restoration target data within the packet to be restored; a byte size of restoration target data; and a restoration-use parameter to be employed in the restoration processing. For example, when the relative packet count is "5", the fifth packet from the restoration processing-use packet is the transformation target packet, when the in-packet position is "100", a restoration starting position is the hundredth byte from the first byte of the transformation target packet, and when the byte size of the restoration target data is "16", the restoration target data extends 16 bytes from the restoration starting position.

The piece of restoration information A501 is then encrypted via an operation such as an XOR operation using a secret parameter. After storing the piece of restoration information A501 in a descriptor format as a restoration instruction descriptor as shown in FIG. 7, and storing the restoration instruction descriptor in a private section as shown in FIG. 8, the private section is stored in a restoration processing-use TS packet in a TS packet format as shown in FIG. 9. Here, the descriptor, the section, and the TS packet conform to formats stipulated in specifications such as MPEG 2, and their description is omitted here.

The aforementioned secret parameters are managed in a secret parameter list A1001, such as the one of FIG. 10, each secret parameter being stored in correspondence with a packet count from a packet header that indicates which piece of restoration information it has been used with respect to. The transformation control unit A106 generates the byte code data so as to include this secret parameter list A1001.

Figure 11:
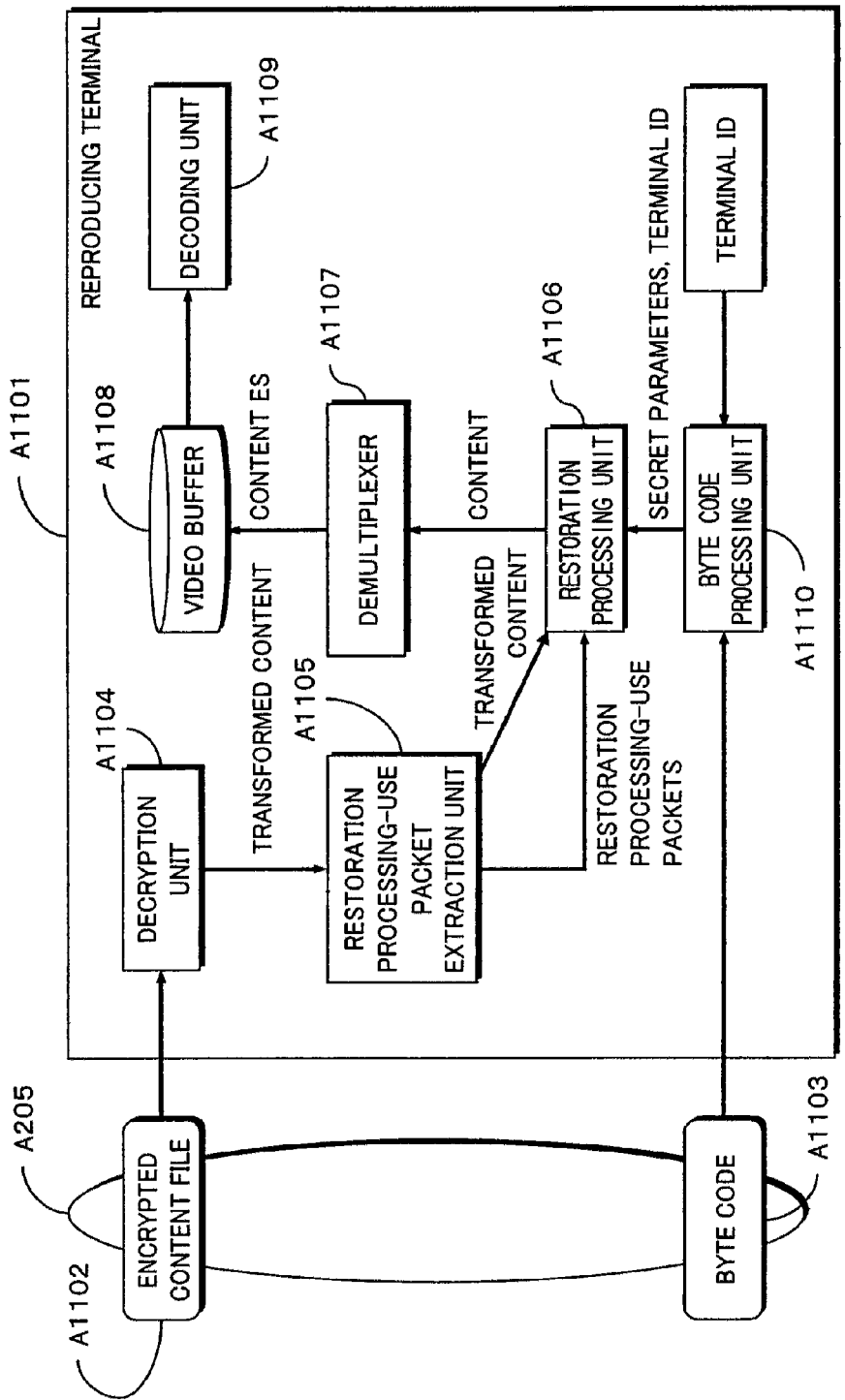
FIG. 11 shows a structure of a reproducing terminal and of data on a recording medium in the embodiment A1 of the present invention.

To assist in the comprehension of the effects of the present embodiment, an example operation of a reproducing terminal is described with reference to FIG. 11, which shows its main parts. A reproducing terminal A1101 reads byte code data A1103 from the recording medium A205. In the reproducing terminal A1101, in preparation for reproduction, a byte code processing unit A1110 then analyzes the byte code data A1103, acquires the secret parameters, and transmits the secret parameters together with the terminal ID to a restoration processing unit A1106.

Subsequently, at reproduction, the reproducing terminal A1101 reads an encrypted content file A1102. A decryption unit A1104 decrypts the encrypted content file and outputs the resultant decrypted content file A1102 to a restoration processing-use packet extraction unit A1105 as the transformed content. Upon detecting the restoration processing-use packets, the restoration processing-use packet extraction unit A1105 outputs the restoration processing-use packets and the remaining transformed content to the restoration processing unit A1106. The restoration processing unit A1106 decrypts the piece of restoration information A501 in each of the restoration processing-use packets, via an XOR operation or the like using the corresponding secret parameters, and carries out the following restoration processing on the basis of the decrypted piece of restoration information A501.

When the restoration instruction flag indicates that restoration is performed, or alternatively, when the restoration instruction flag indicates terminal ID reference and a part of the value of the terminal ID specified by the terminal ID reference position is 1, the restoration processing unit A1106 implements restoration processing. It achieves this by specifying the starting position of the restoration target data in the transformed content on the basis of the relative packet count and the in-packet position, and by overwriting, with the restoration-use parameter, a same number of bytes as indicated by the restoration target data byte size.

Subsequently, the restoration processing unit A1106 outputs the restored content to a demultiplexer A1107, and the demultiplexer A1107 converts the content information, which includes video and audio data, into a format that can be processed by a decoding unit A1109. The demultiplexer A1107 outputs the converted content information to a video buffer A1108, and the decoding unit A1109 carries out the processing associated with reproduction and output of the content.

In this way, in this embodiment, data in the content file relating to transformation processing can be specified using the restoration information in each restoration processing-use packet and the byte code data, and hence, transformation processing different from the encryption performed by the encryption subsystem A202 can be freely implemented for each content file.

Further, as a result of making instructions as to whether or not a terminal should implement restoration processing depend on the terminal ID, a part of the post-restoration content data will be different for every terminal ID, and it will be possible to specify a reproducing terminal that has taken an unauthorized copy or unauthorizedly distributed the content.

Further, in the transformation processing subsystem A101, if an unauthorized terminal ID list is input from the input unit A107, the unauthorized terminal ID list can be stored as part of the byte code data. In such a case, when a reproducing terminal references its terminal ID, if a terminal ID that matches its own is stored in the unauthorized terminal ID list contained in the byte code data, reproduction can be discontinued, analysis of the byte code data cancelled, or the like. Consequently, unauthorized terminals can be rendered incapable of reproducing content in a normal way.

Note that the byte code data need not be JAVA, but may be another type of execution code. Moreover, the byte code data can be a self-modifying type of execution code, making it possible to obtain an improvement in the degree of concealment of the byte code data.

Further, though the private section that includes the restoration processing was described as being stored in restoration processing-use TS packets which have a different PID from the other content packets, the private section may instead be stored in a payload of a PCR (Program Clock Reference) packet, in which case the number of restoration processing use TS packets can be reduced.

Further, the pieces of restoration information A501 may be stored in payloads of PCR packets.

Further, it goes without saying that a plurality of restoration instruction descriptors can be stored in a single section, and that a plurality of pieces of restoration information can be stored in a single restoration instruction descriptor.

Further, rather than including descriptors for the pieces of restoration information A501, the restoration processing-use packets may be generated by making the pieces of restoration information PES packets which are stipulated by MPEG 2 or the like.

Further, though in the reproducing terminal A1101, the restoration-use parameters were described as being used to overwrite the restoration target data, encryption processing such as XOR and AES can also be used.

Further, though in the secret parameter list A1001 of FIG. 10 positions at which the secret parameters are used are indicated by a number of packets from the head packet, the positions can be indicated by read-out time information that accompanies TS packets.

Figure 12:
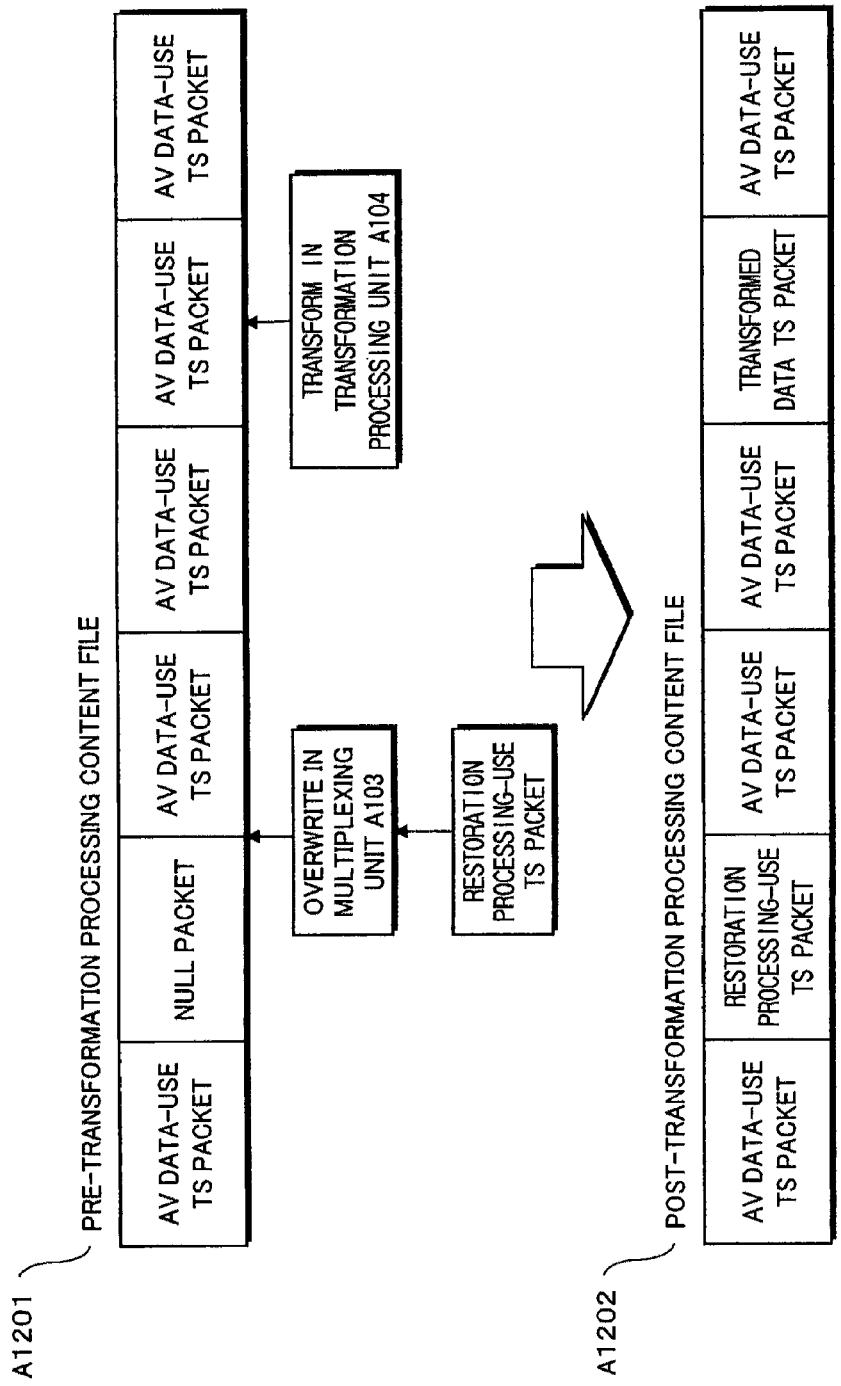
FIG. 12 shows a different example of multiplexing processing in the embodiment A1 of the present invention.

Further, though multiplexing processing was used to insert the restoration processing-use packet between AV data-use TS packets as shown in FIG. 7, the restoration processing-use packet may instead be inserted in place of a null packet as shown in FIG. 12. In such a case, while it is necessary to pre-insert null packets into the content file, the effect of the content file not increasing in size under transformation processing can be obtained.

(Embodiment A2)

Since a structure of a transformation processing subsystem of an embodiment A2 is the same as that of the transformation processing subsystem A101 of the embodiment A1, a specific description is omitted, and the embodiment A2 is described using the transformation processing subsystem A101.

Figure 13:
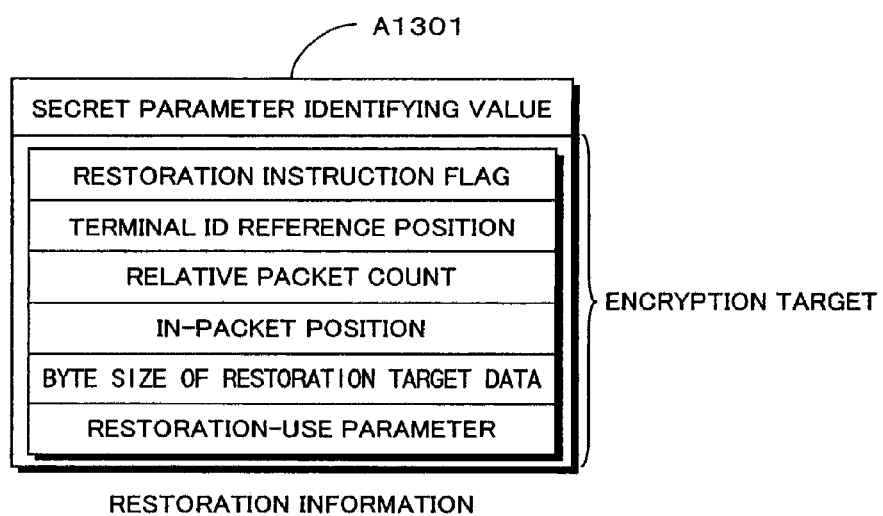
FIG. 13 shows a structure of restoration information in an embodiment A2 of the present invention.

In this embodiment, the transformation processing subsystem A101 generates a piece of restoration information A1301 shown in FIG. 13, and a secret parameter list A1801 shown in FIG. 18.

The piece of restoration information A1301 of FIG. 13 is the restoration information A501 of FIG. 5 with the addition of a secret parameter identifying value, the other information being the same as the piece of restoration information A501. The transformation control unit A106 uses a secret parameter corresponding to the secret parameter identifying value in the piece of restoration information A1301 to encrypt all or part of the information from the restoration instruction flag to the restoration-use parameter, via an XOR operation or the like. Subsequently, the transformation control unit A106 transmits the piece of restoration information A1301, as a restoration instruction descriptor in the descriptor format shown in FIG. 7, together with a multiplex position to the multiplexing unit A103.

Further, the transformation control unit A106 manages the secret parameter and secret parameter identifying value combinations used in the encryption as the secret parameter list A1801 of the type shown in FIG. 18, and generates the byte code data so as to include the secret parameter list A1801.

Figure 14:
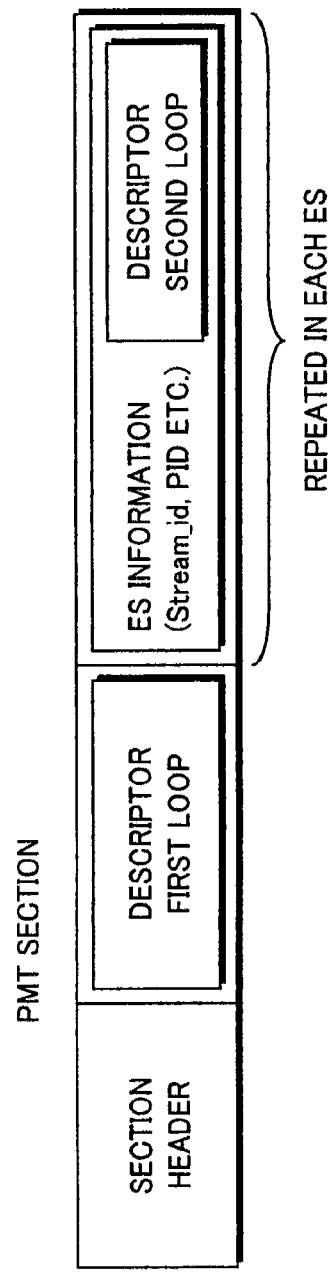
FIG. 14 shows a structure of a PMT section in the embodiment A2 of the present invention.
Figure 15:
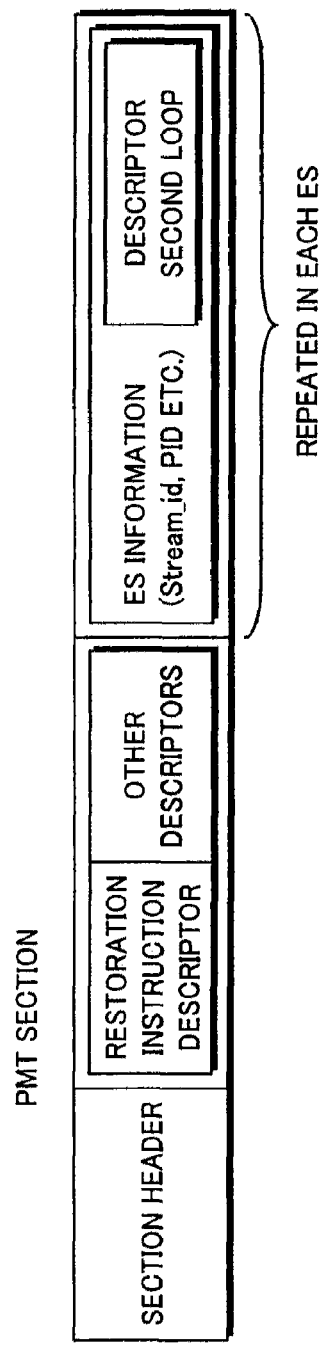
FIG. 15 shows a structure of a PMT section that includes a restoration instruction descriptor in the embodiment A2 of the present invention.
Figure 16:
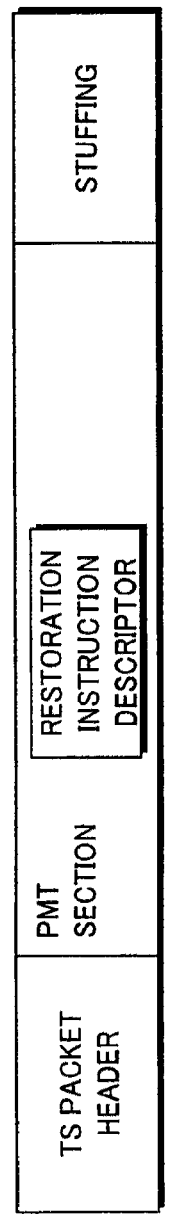
FIG. 16 shows a structure of a TS packet including a PMT section in the embodiment A2 of the present invention.
Figure 17:
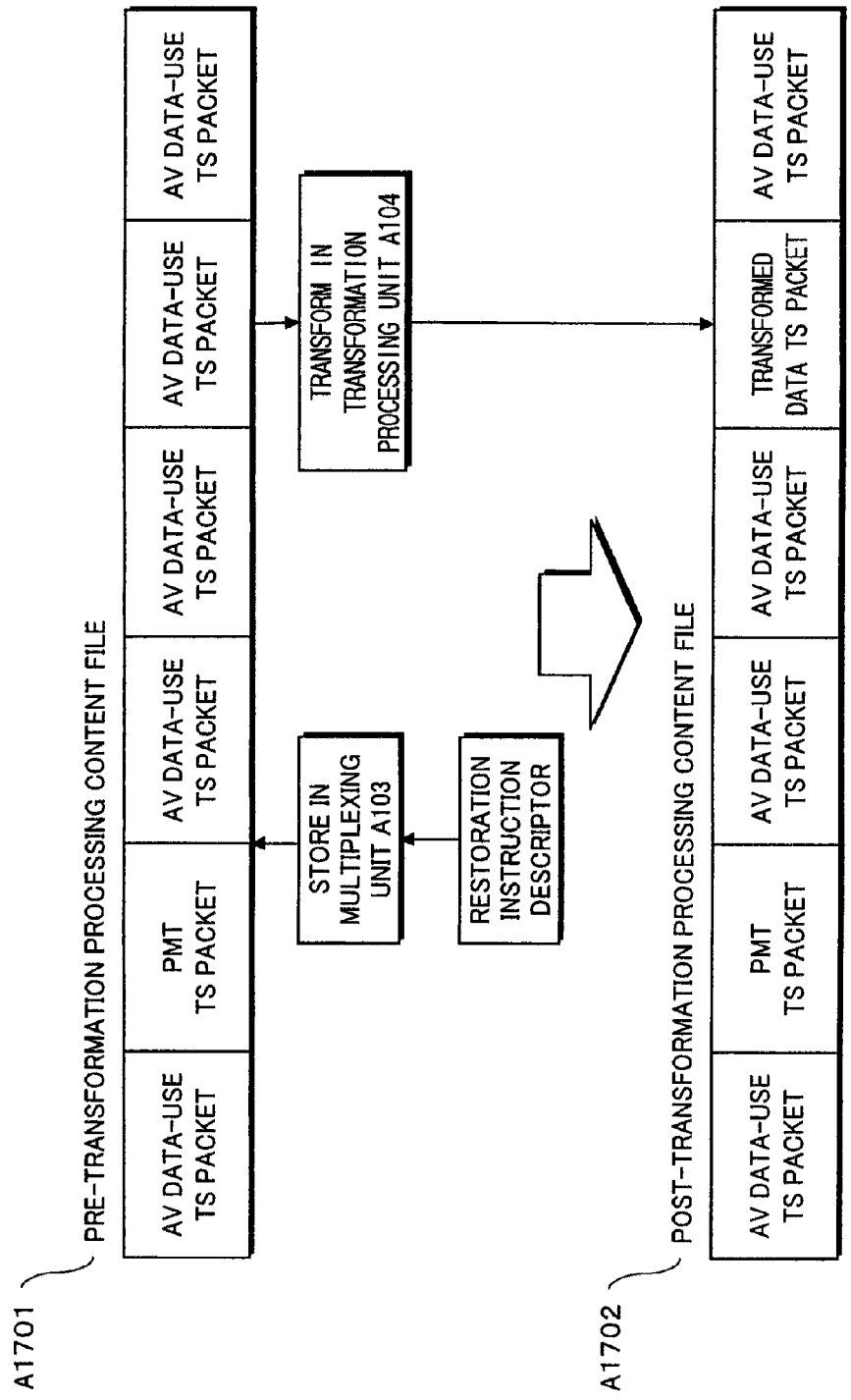
FIG. 17 shows multiplexing processing in the embodiment A2 of the present invention.

The multiplexing unit A103 multiplexes the restoration instruction descriptor into a PMT (program map table) existing in the multiplex position. The make-up of a PMT section is, as shown in FIG. 14, of a format prescribed by MPEG 2 or the like, and includes a descriptor first loop and a descriptor second loop for storing descriptors. The multiplexing unit A103 stores the restoration instruction descriptor in the descriptor first loop of the PMT section as shown in FIG. 15, and makes the TS packet that is storing the PMT into a TS packet of the type shown in FIG. 16. This multiplexing process is illustrated in FIG. 17. As shown in FIG. 17, the multiplexing unit A103 stores the restoration instruction descriptor in a PMT TS packet, which is part of a pre-transformation processing content file A1701. The transformation processing unit A104 then transforms the necessary TS packets to generate a post-transformation processing content file A1702.

The transformed content file, which has undergone transformation by the transformation processing subsystem A101 in the way described above, and the byte code data are stored in the recording medium A205 via the processes of the disc production system shown in FIG. 2.

Since the structure of the reproducing terminal of the embodiment A2 is the same as that of the embodiment A1, an example of its operation is also described with reference to FIG. 11.

The reproducing terminal A1101 reads the byte code data A1103 from the recording medium A205. In the reproducing terminal, in preparation for reproduction, the byte code processing unit A1110 analyses the byte code data A1103, acquires the secret parameters and the secret parameter identifying values, and transmits the secret parameters, the secret parameter identifying values, and the terminal ID to the restoration processing unit A1106.

Subsequently, at reproduction, the decryption unit A1104 reads and decrypts the encrypted content file A1102, and outputs the decrypted content file to the restoration processing-use packet extraction unit A1105 as the transformed content. Upon detection of the restoration processing-use packets, the restoration processing-use packet extraction unit A1105 outputs them, together with the remaining transformed content, to the restoration processing unit A1106. The restoration processing unit A1106 decrypts the piece of restoration information A501 in each of the restoration processing-use packets, via an XOR operation or the like using the secret parameters indicated by the secret parameter identifying values, and carries out the following restoration processing on the basis of the decrypted piece of restoration information A501.

When the restoration instruction flag indicates that restoration is performed, or alternatively, when the restoration instruction flag indicates terminal ID reference and a part of the value of the terminal ID specified by the terminal ID reference position is 1, the restoration processing unit A1106 implements restoration processing. It achieves this by specifying the position of the restoration target data in the transformed content on the basis of the relative packet count and the in-packet position, and by overwriting, with the restoration-use parameter, a same number of bytes as indicated by the restoration target data byte size.

When the restoration instruction flag indicates that restoration is not performed, the restoration information is not processed.

In this way, in this embodiment, data in the content file relating to transformation processing can be specified using the restoration information in each restoration processing-use packet and the byte code data, and transformation processing different from the encryption performed by the encryption subsystem A202 can be freely implemented for each content file.

Further, since the restoration instruction descriptors are stored in the PMTs, there is no need to provide TS packets having a new PID, and an increase in the quantity of data can be prevented.

Further, either a part or the whole of the PMT may store the restoration instruction descriptor.

Further, as a result of storing the restoration instruction descriptor in a predetermined fixed position, such as at the head or at the third bit of the descriptor first loop in the PMT, only the fixed position need be examined at restoration processing in the reproducing terminal, and a reduction in the number of processing operations is therefore possible.

Note also that, a region in the PMT for storing the restoration instruction descriptor may be emptied in advance of storing it. Doing this enables the restoration instruction descriptor to be stored without increasing the data size of the PMT.

Figure 19:
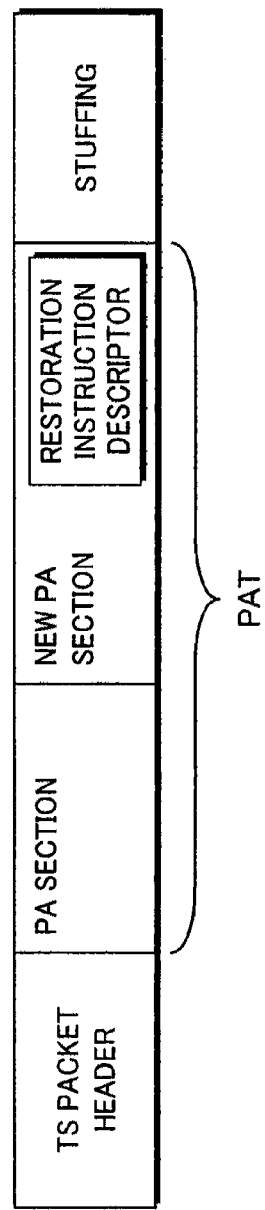
FIG. 19 shows multiplexing into a PAT in the embodiment A2 of the present invention.

Further, the storage position for the restoration information is not limited to the examples of the embodiments A1 and A2; a fresh PA section may be prescribed in a PAT (program association table) as shown in FIG. 19, and the restoration instruction descriptor stored therein. This method is not of course limited to the PAT and a fresh section may be prescribed in any other type of table.

Figure 20:
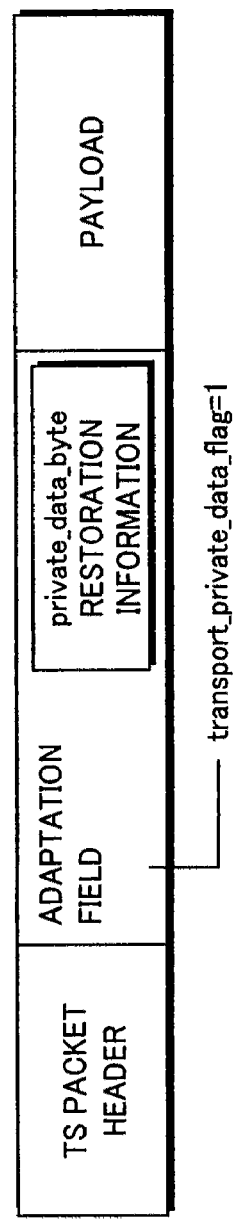
FIG. 20 shows multiplexing into an adaptation field in the embodiment A2 of the present invention.

Further, as shown in FIG. 20, the restoration information may be written into a private_data_byte region of an adaptation field stipulated by MPEG 2 or the like. The adaptation field for storing the restoration information may even be included in a TS packet that is to be transformed, in which case the fact that the TS packet is to be restored can be indicated by setting "relative packet count=0" in the restoration information. In addition, it is possible to make use of any of PCR, video, audio or other TS packets.

Figure 21:
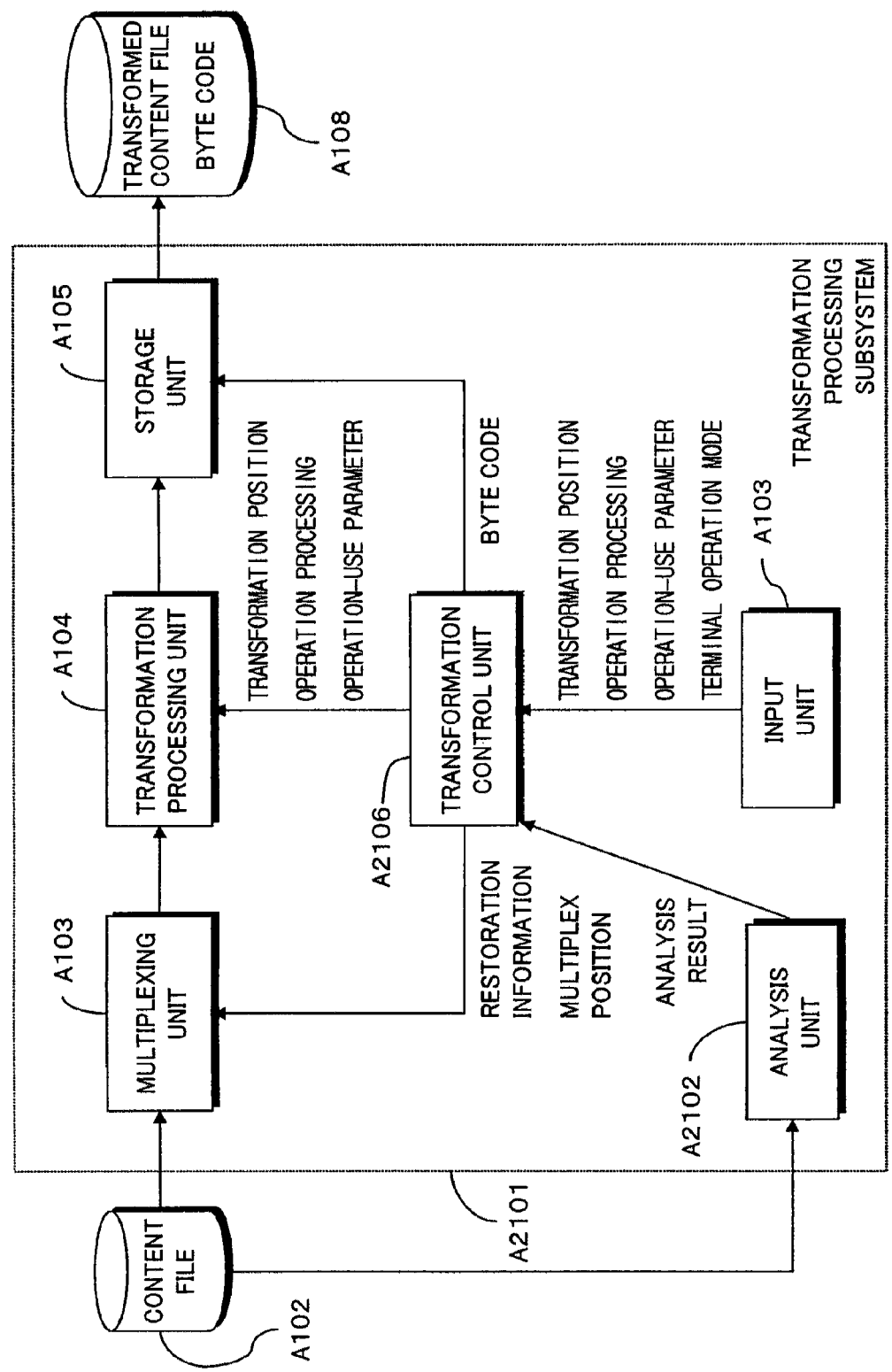
FIG. 21 shows a structure of another example of the transformation processing subsystem in the embodiment A2 of the present invention.

Further, at reproduction, circumstances in which restoration is not possible can be avoided by ensuring that the entry point, which is the starting point for reproducing the content file, is not between a TS packet storing the restoration information and a packet that is to be restored. As in the type of transformation processing subsystem A2101 shown in FIG. 21, for example, the content file can be analyzed in an analysis unit A2102, and the result of an analysis of the whereabouts of the entry point transmitted to a transformation control unit A2106. The transformation control unit A2106 can then set the transformation position and the multiplex position so that the entry point is not between the TS packet storing the restoration information and the packet that is to be restored.

(Embodiment A3)

Figure 22:
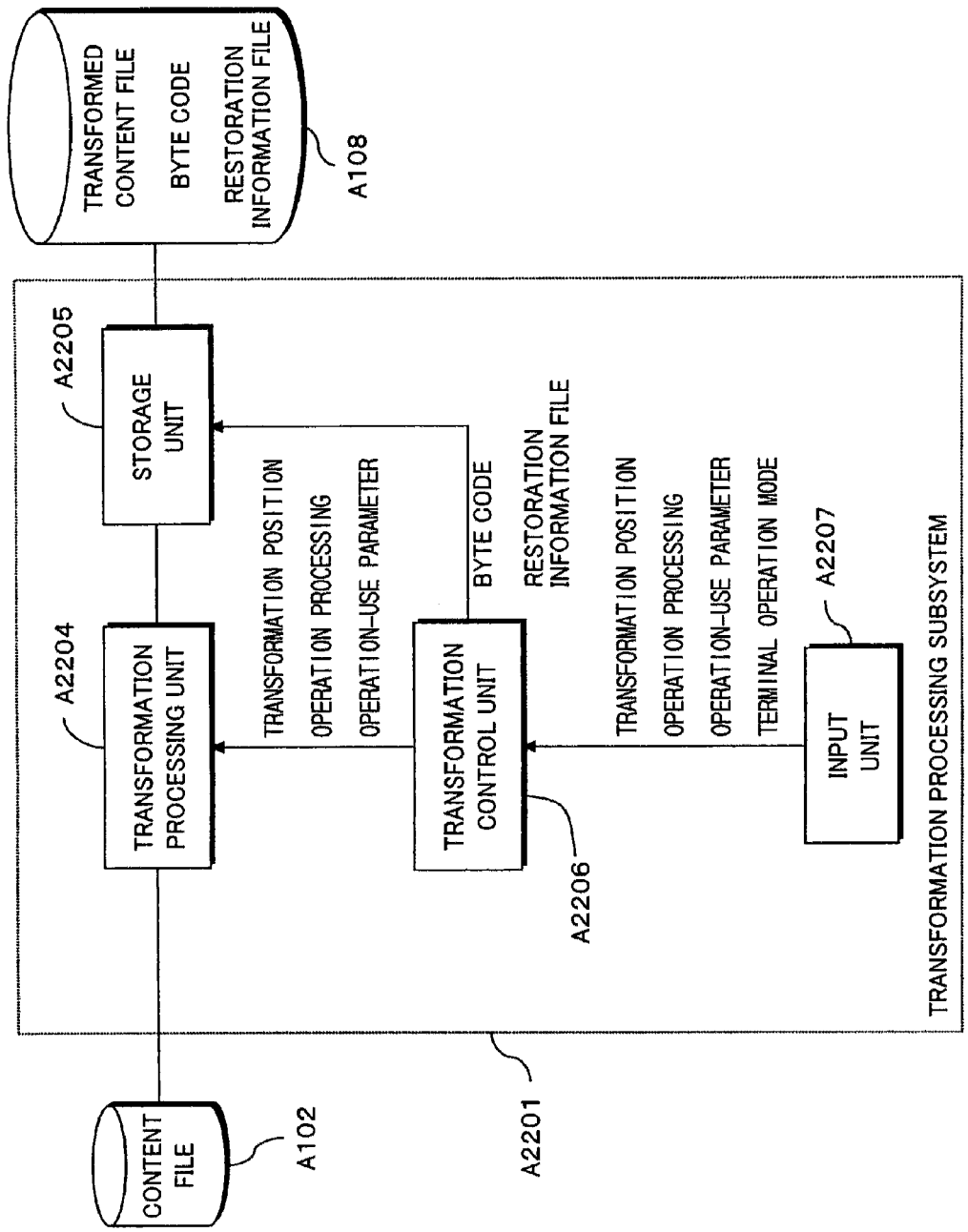
FIG. 22 shows a structure of another example of a transformation processing subsystem in an embodiment A3 of the present invention.

FIG. 22 is a block diagram showing main parts of a structure of a transformation processing subsystem A2201 for executing transformation processing in an embodiment A3 of the present invention. The transformation processing subsystem A2201 includes a transformation processing unit A2204, a storage unit A2205, a transformation control unit A2206, and an input unit A2207. The transformation processing unit A2204 is connected to the recording medium A102 and the transformation control unit A2206, and executes transformation processing on specified content packets in the content file according to instructions from the transformation control unit A2206. The storage unit A2205 is connected to the transformation processing unit A2204 and the transformation control unit A2206, and stores, on the recording medium A108, the post-transformation transformed content file, the byte code data and a restoration information file, the latter two being received from the transformation control unit A2206. The transformation control unit A2206 is connected to the input unit A2207, and, based on data received from the input unit A2207, issues instructions for transformation processing to the transformation processing unit A2204. The transformation control unit A2206 also generates the byte code data and the restoration information file and transmits them to the storage unit A2205, the restoration information file including pieces of restoration information and the byte code data including processes and parameters for reversing the transformation corresponding to the transformation processing. The input unit A2207 inputs data to specify the transformation processing.

Figure 23:
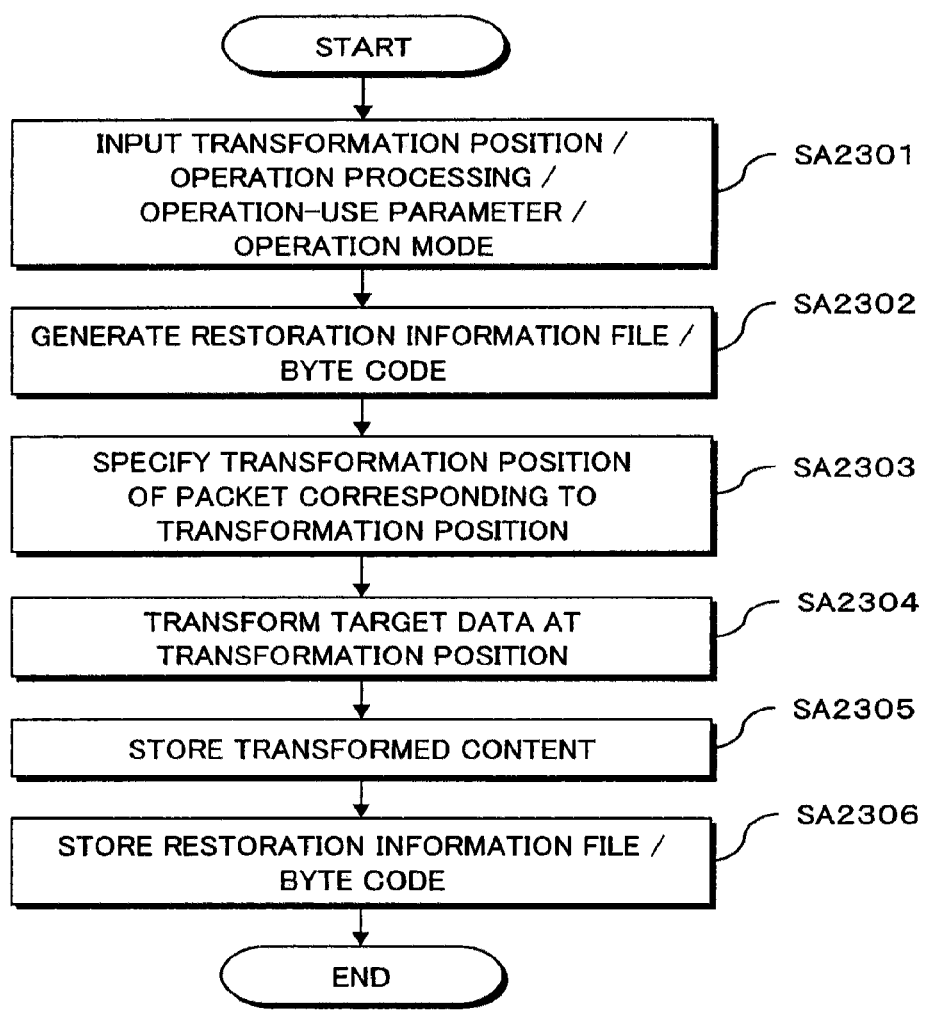
FIG. 23 is an operation flowchart showing an operation of the transformation processing subsystem in the embodiment A3 of the present invention.

An operation of the transformation processing subsystem A2201 having the kind of construction described above is described with reference to an operation flowchart of FIG. 23.

In step SA2301, various information is input into the transformation control unit A2206 from the input unit A2207. This information includes: transformation position, information indicating the ordinal number, counted from the head of the content file, of a packet and the ordinal numbers of the bytes within the packet that are to be transformed; operation processing information indicating which operation of a set of operations including logic operations such as XOR and encryption methods such as AES is to be performed; an operation-use parameter for use in the operation processing; and an operation mode that is information for judging, on the basis of information specifying a reproducing terminal such as a terminal ID or the like, whether or not to perform restoration processing at a given reproducing terminal for reproducing the recording medium A205.

Next, in step SA2302, on the basis of the information input in step SA2301, the transformation control unit A2206 generates the restoration information file that includes the restoration information and the byte code data. The transformation control unit A2206 transmits the transformation position information, the operation processing information, and the operation-use parameter to the transformation processing unit A2204.

Next, in step SA2303, the transformation processing unit A2204 specifies a packet that is to be transformed, and specifies the transformation target data within the packet, on the basis of the transformation position information.

Next, in step SA2304, the transformation processing unit A2204 executes operation processing using the operation-use parameter on the specified transformation target data. For example, when the operation processing is XOR, the transformation processing unit A2204 calculates the XOR sum of the transformation target data and the operation-use parameter, and overwrites the transformation target data with the resulting value. Note that the operation processing is not limited to using XOR, but may consist of another type of logic operation or encryption processing. Alternatively, the transformation target data may simply be overwritten with the operation-use parameter. If this is the case, the transformation processing unit A2204 stores the transformation target data in the restoration information as a restoration-use parameter, before it is overwritten. To put this processing into practice, steps SA2303 and SA2304 may be executed before step SA2302.

Next, in step SA2305, the storage unit A2205 stores the transformed content file, which has finished undergoing transformation processing, on the recording medium A108.

Next, in step SA2306, the transformation control unit A2206 transmits the restoration information file and the byte code data to the storage unit A2205, and the storage unit A2205 stores the received restoration information file and the byte code data on the recording medium A108 in individual files distinct from the transformed content file.

Note that a plurality of transformation positions can be specified within one content file. When this is the case, in step SA2301 operation processing and an operation-use parameter are input for each of the plurality of transformation positions, and transformation can be realized by repeating step SA2302 to step SA2304 for each of the plurality of transformation positions.

Hereafter, the restoration information generated by the above operation flow is described. The restoration information is information used by the reproducing terminal to reverse the transformation processing, and includes information of the type shown in FIG. 24. The byte code data, meanwhile, is the same as that described in the embodiment A1.

Figures 24, 25:
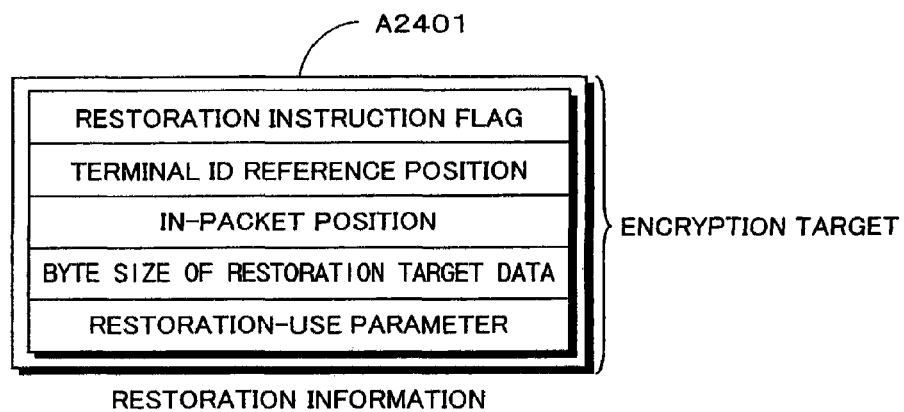
FIG. 24 shows a structure of restoration information in the embodiment A3 of the present invention.
FIG. 25 shows a structure of a restoration information file in the embodiment A3 of the present invention.

A piece of restoration information A2401 of FIG. 24 is the information of the piece of restoration information A501 with the "relative packet count" removed. Here, a description of the remaining information is omitted, as it would resemble that of the embodiment A1. The transformation control unit A2206 generates the restoration information file holding pieces of restoration information A2401 and corresponding packet ordinal numbers counted from the head of the content file, the packet ordinal numbers being for indicating which packet each piece of restoration information A2401 is to be used to restore.

According to the above description, the transformation processing subsystem A2201 must store at least three files on the recording medium A108, these being the transformed content file, the byte code data, and the restoration information file, and at least these three files are included in the recording medium A205 via the process of the disc production system of FIG. 2.

Figure 26:
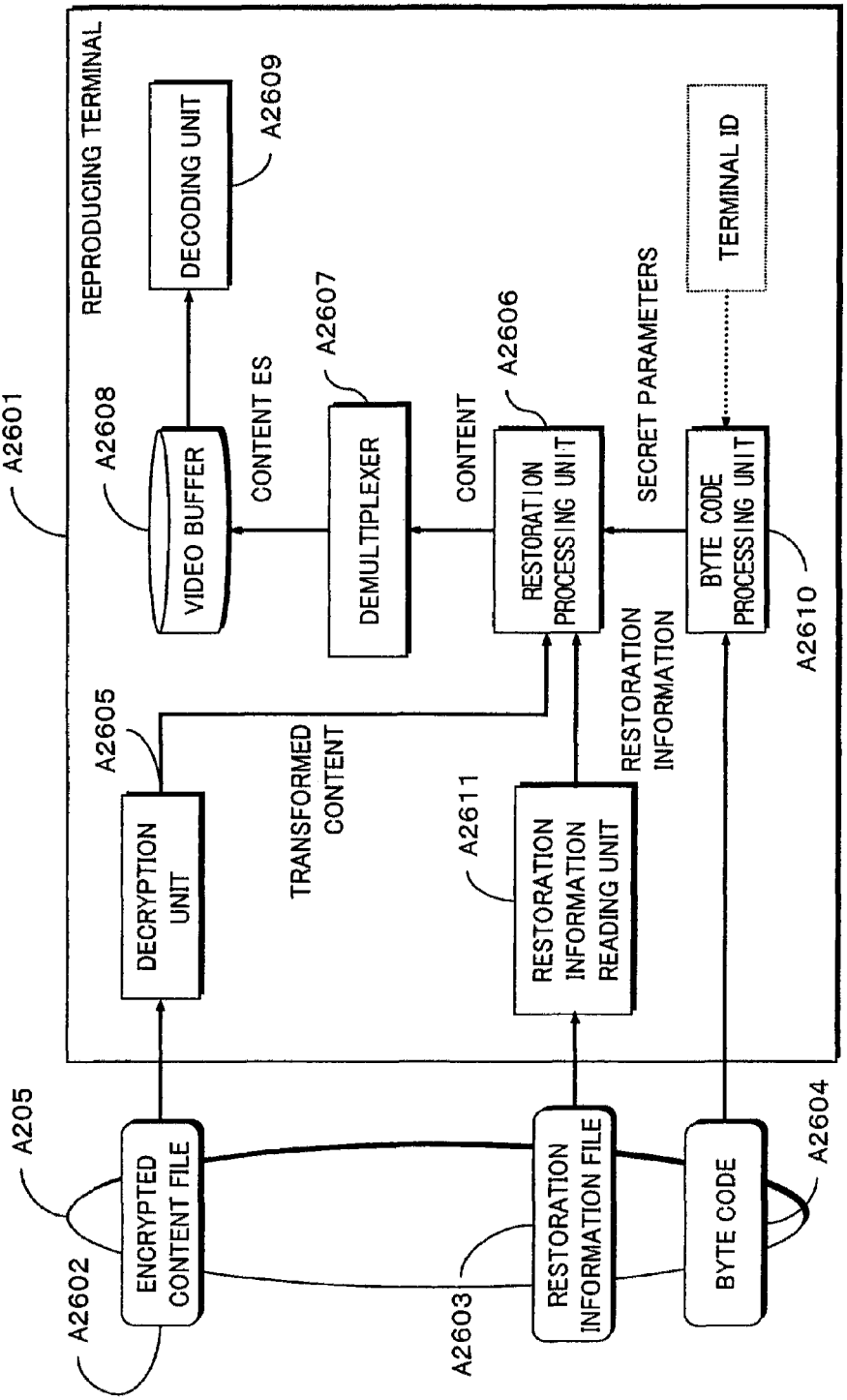
FIG. 26 shows a structure of a reproducing terminal and of data on a recording medium in the embodiment A3 of the present invention.

To assist in the comprehension of the effects of the present embodiment, an example of the operation of a reproducing terminal is described with reference to FIG. 26, which shows the main parts of its structure. A reproducing terminal A2601 reads byte code data A2604 from the recording medium A205. Then, in the reproducing terminal A2601 at reproduction, a byte code processing unit A2610 analyzes the byte code data A2604, acquires the secret parameters, and transmits the secret parameters and the terminal ID to a restoration processing unit A2606.

Next, at reproduction, the reproducing terminal A2601 reads an encrypted content file A2602. Then, in the reproducing terminal A2601, a decryption unit A2605 decrypts the encrypted content file A2602 and outputs the result to the restoration processing unit A2606 as transformed content. Further, a restoration information reading unit A2611 reads a restoration information file A2603 and successively outputs the pieces of restoration information A2401 corresponding to the read encrypted content file to the restoration processing unit A2606. The restoration processing unit A2606 decrypts the received pieces of restoration information A2401 using the corresponding secret parameters via an XOR operation or the like, and executes restoration processing based on each of the decrypted pieces of restoration information A2401.

Next, the restoration processing unit A2606 outputs the restored content to a demultiplexer A2607, which converts the video and audio data of the content into a format that can be processed by a decoding unit A2609, and outputs the converted content information to a video buffer A2608. The decoding unit A2609 then carries out the processing associated with reproduction and output of the content.

Thus, in the present embodiment, information relating to transformation processing implemented on the content file can be specified via the restoration information file and the byte code data, and transformation processing that differs from the encryption by the encryption subsystem A202 can be freely implemented on each content file.

Note that, though in the restoration information file of FIG. 25 positions of the packets that are to be restored were indicated by a packet count from the head of the content file, read-out time information that accompanies the TS packets may be used for this purpose.

Moreover, though the byte code data was the same as that of the embodiment A1, byte code data which is the same as that of the embodiment A2 may be used instead, in which case a secret parameter identifying value would be added to each piece of restoration information A2401.

Further, though each piece of restoration information A2401 was encrypted as shown in FIG. 24, rather than each piece of restoration information A2401 being encrypted individually, part or the whole of the restoration information file may be encrypted using a secret parameter.

Further, though the restoration information reading unit A2611 outputs the pieces of restoration information one at a time, it may instead output a plurality of pieces of restoration information together, with the ordinal numbers of the corresponding packets to be restored, each ordinal number being counted from the head packet. Here, rather than the ordinal numbers of the restoration target packets being counted from the head packet, the ordinal numbers may be converted to "relative packet counts" counted from the header packet in each read-off section of the content file.

Further, the transformation position information input by the input unit A2207 and the input unit A107 may be read-off time information that accompanies the TS packets. Further, there is no need to specify the operation processing information if the operations have been determined in advance.

Figure 27:
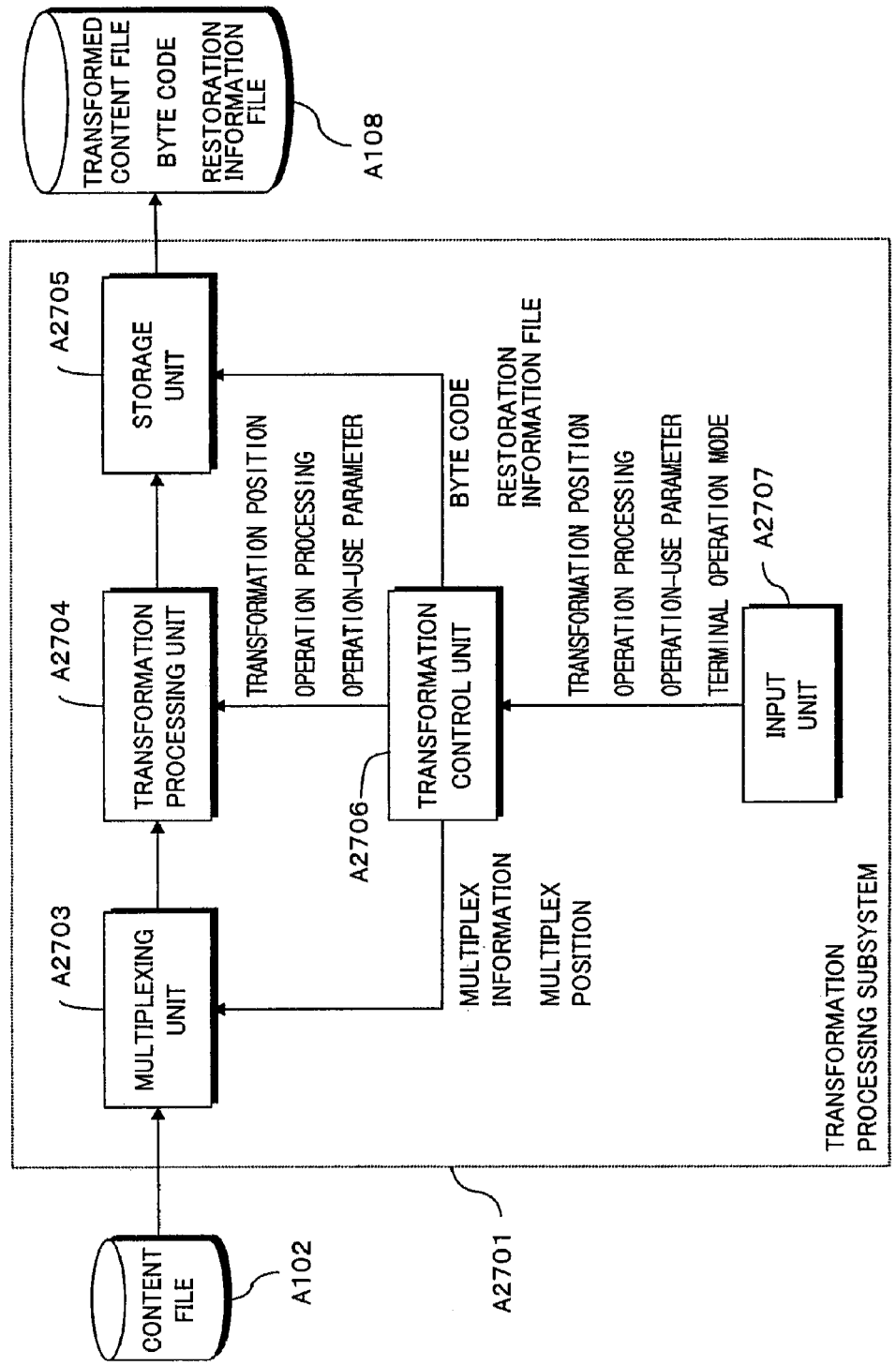
FIG. 27 shows a structure of another example of the transformation processing subsystem in the embodiment A3 of the present invention.

Further, the embodiments A1 and A3, or the embodiments A2 and A3, can be combined such that a transformed content file with multiplexed restoration information can be generated together with byte code data and a restoration information file. In such a case, as shown in FIG. 27, a transformation control unit A2706 transmits multiplex information and multiplex positions to a multiplexing unit A2703, and the multiplexing unit A2703 multiplexes the multiplex information with a content file. Further, the transformation control unit A2706 generates the byte code data and the restoration information file and transmits them to a storage unit A2705. The storage unit A2705 stores at least three files, including the transformed content file, the byte code data and the restoration information file, on the recording medium A108. With this method, a reproducing terminal can use either the restoration information multiplexed with the transformed content file or the restoration information of the restoration information file, and can therefore select the restoration information that is easier to use when executing reproduction.

Further, though all the embodiments have been described on the basis of MPEG 2 being used, they are not limited to using MPEG 2, and the same effects can be obtained using other encoding methods.

(Conclusion)

In recent years, as the capacity of storage media has increased, systems in which content that is a work such as a movie is converted into digital form and stored in media, such as digital optical discs or the like, have become widespread. In such systems, it is necessary that the copyright of the content is protected and that reproduction and copying of the content are practiced only within limits based on an agreement with the copyright holder. Regular systems to protect copyright material from being unauthorizedly copied or the like without permission from the copyright holder include arrangements in which the digital content is encrypted using a content key managed by the copyright holder. The encrypted digital content is then stored on a disc and can only be decrypted by terminals holding a corresponding content key. For a user to obtain the content key, rules established between the user and the copyright holder must be followed.

As an example of this kind of system, in patent document 2 a method is disclosed in which the content key for encrypting and decrypting the content data is protected by being generated based on a function of seed keys and time variable data.

When this technique is used, there is a requirement that the content key be strictly managed so as not to be exposed to an outside party. However, there may be times when, via some accident or incident, the content key is exposed to an unauthorized party. Once the content key has been exposed to the unauthorized party, there is a danger that the content keys for subsequent content will be discovered using the same method. Consequently, it can be presumed that unauthorized use of subsequent content could not be prevented. With conventional techniques, the content data is susceptible to attacks of this type because its sole protection is a content key protected via the specified method.

In view of this problem, an object of the present invention is to provide a recording medium for protecting content in such a way that even if, by some accident or incident, a method to break the content protection is discovered once, the same method cannot be used for unauthorizedly making use of other content, and further to provide a data generating method and a data generating device for generating this content.

A further object of the present invention is to provide a recording medium capable of specifying, from content whose content protection method has been broken and which is unauthorizedly circulating in a form that can be used by anyone, the unauthorized reproducing device that was able to break the content protection, and further to provide a data generating method and a data generating device for generating this content.

To solve the above problems, the present invention provides a recording medium having data recorded thereon, wherein the data is content data protected by data transformation and by encryption using a content key, the data transformation being an operation distinct from the encryption.

Further the present invention provides the recording medium further having at least a program recorded thereon, wherein the program is for calculating a parameter required for restoring the content data.

Further the present invention provides the recording medium further having restoration information recorded thereon, wherein the restoration information is required for restoring the content data, and is multiplexed with the content data.

Further, the present invention provides the recording medium further having restoration information recorded thereon, wherein the restoration information is required for restoring the content data, and is recorded as a different file from the content data.

Further, the present invention provides the recording medium further having restoration information recorded thereon, wherein the restoration information is required for restoring the content data, and is both multiplexed with the content data and recorded as a different file from the content data.

Further the present invention provides the recording medium, wherein part or all of the restoration information is encrypted using the parameter.

Further, the present invention provides a data generating method for implementing operations on content data, including a step of implementing, on part or all of the content data, a transformation operation distinct from encryption using a content key.

Further, the present invention provides the data generating method further including a step of generating a program for a data processing device to calculate a parameter required for restoring the content data.

Further, the present invention provides the data generating method further including the steps of: generating a program for a data processing device to calculate a parameter required for restoration processing of the content data; generating restoration information required for the restoration processing; encrypting the restoration information using the parameter; and multiplexing the encrypted restoration information with the content data.

Further, the present invention provides the data generating method further including the steps of: generating a program for a data processing device to calculate a parameter required for restoration processing of the content data; generating restoration information required for the restoration processing; encrypting the restoration information using the parameter; and generating the encrypted restoration information as a different file from the content data.

Further, the present invention provides the data generating method further including the steps of: generating a program for a data processing device to calculate a parameter required for restoration processing of the content data; generating restoration information required for the restoration processing; encrypting the restoration information using the parameter; multiplexing the encrypted restoration information with the content data; and generating the encrypted restoration information as a different file from the content data.

Further, the present invention provides a data generating device for implementing operations on content data, including a unit operable to implement, on part or all of the content data, a transformation operation distinct from encryption using a content key.

Further, the present invention provides the data generating device further including: a unit operable to generate a program for a data processing device to calculate a parameter required for restoration processing of the content data; a unit operable to generate restoration information required for the restoration processing; a unit operable to encrypt the restoration information using the parameter; and a unit operable to multiplex the encrypted restoration information with the content data.

Further, the present invention provides the data generating device further including: a unit operable to generate a program for a data processing device to calculate a parameter required for restoration processing of the content data; a unit operable to generate restoration information required for the restoration processing; a unit operable to encrypt the restoration information using the parameter; and a unit operable to generate the encrypted restoration information as a different file from the content data.

Further, the present invention provides the data generating device further including: a unit operable to generate a program for a data processing device to calculate a parameter required for restoration processing of the content data; a unit operable to generate restoration information required for the restoration processing; a unit operable to encrypt the restoration information using the parameter; a unit operable to multiplex the encrypted restoration information with the content data; and a unit operable to multiplex the encrypted restoration information as a different file from the content data.

Further, the present invention provides a program causing a computer to execute the one or more steps included in the data generating method.

Further, the present invention provides a computer readable recording medium having recorded thereon a program for causing a computer to execute the one or more steps in the data generating method.

As described above, the present invention has the effect of providing a recording medium on which content is protected from being reproduced unauthorizedly, even when by some accident or incident the content key has been divulged and circulated among an unspecified large number of devices, and further to provide a data protection method, a data generating method, and a data generating device for generating this content.

Further, content can be generated from which, if its content protection has been broken and it is unauthorizedly circulating in a form that can be used by anyone, the reproducing device that was able to break its content protection can be specified.

2. Embodiment B: Content Reproducing Device
(Embodiment B1)

Figure 28:
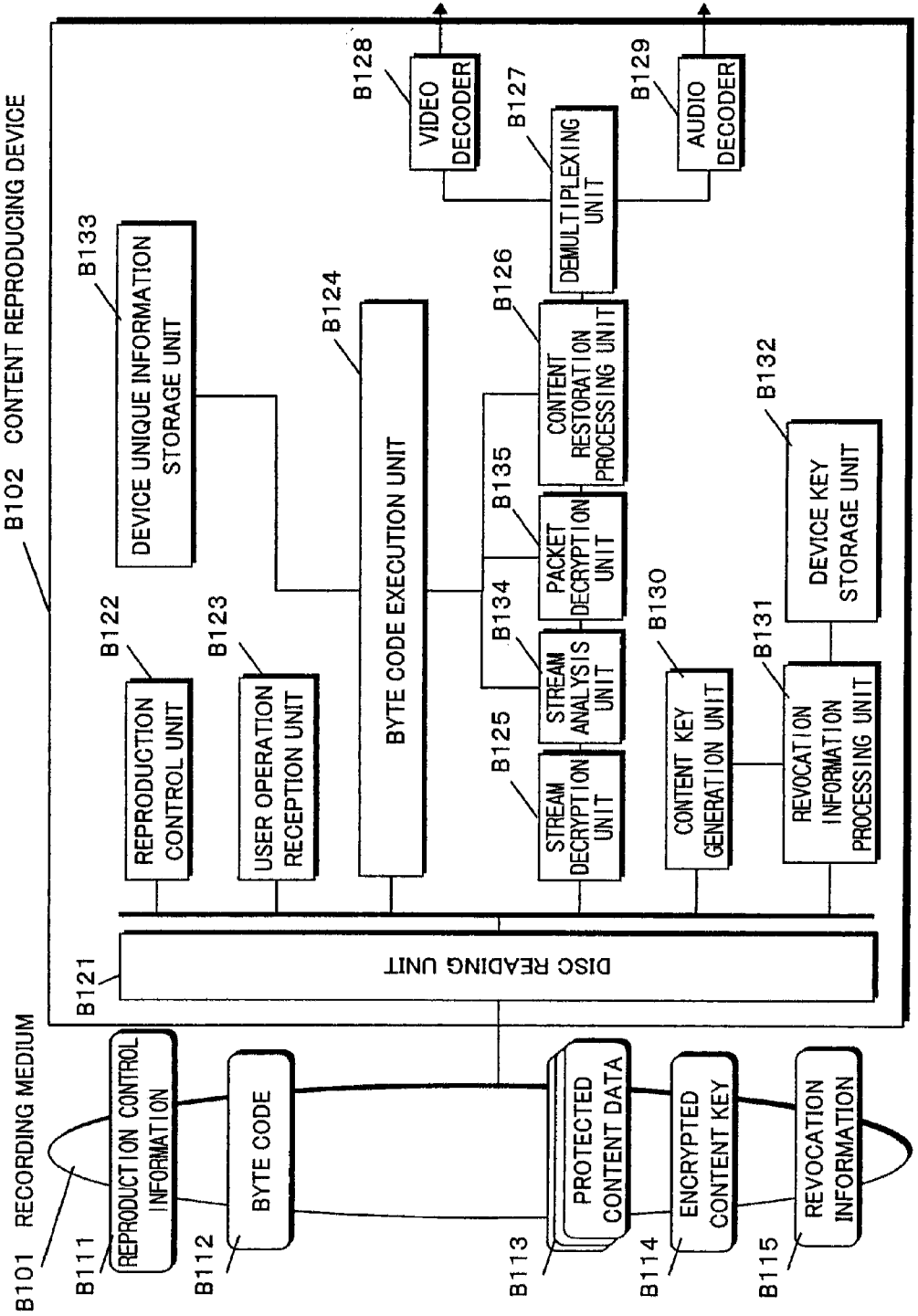
FIG. 28 shows a structure of a recording medium and a content reproducing device in an embodiment B1 of the present invention.

FIG. 28 shows a structure of a recording medium B101 and a content reproducing device B102 pertaining to one embodiment of the present invention.

Recorded on the recording medium B101 is reproduction control information B111, a byte code B112, protected content data B113, an encrypted content key B114, and revocation information B115. While the recording medium B101 is assumed to be a BD (Blu-ray Disc) as one example here, it is not limited to being so.

It is assumed in the present embodiment that one set of content is composed of a plurality of MPEG 2 TSs (Motion Picture Expert Group 2 Transport Streams). It is the reproduction control information B111 that stipulates the reproduction order of the protected content data B113 when the content is reproduced.

The byte code B112 is an execution code composed of an instruction set of a set length, such as a JAVA byte code.

The byte code B112 may have been subject; to processing such as obfuscation in order to prevent the secret information and processing content of the software from being ascertained by an act of analysis. In such a case, a byte code execution unit B124 has a function of removing processing such as obfuscation. Execution of the byte code B112 is described in detail later. Note that while an example of a JAVA byte code is given in the present embodiment, an execution program other than JAVA may be used.

The protected content data B113 is plaintext MPEG 2 TS data that can be output as video by a decoder, and has been subject to encryption processing with a content key, and further to data transformation processing, for example part of the data being substituted with a different value. For this reason, in order to reproduce the protected content data B113, in addition to decryption processing with the content key, it is necessary to subject the protected content data B113 to restoration processing to overwrite (replace) the substituted data with appropriate data, thereby restoring the protected content data B113 to plaintext MPEG 2 TS data.

The encrypted content key B114 is data of a content key that is for decrypting the protected content data and that has been encrypted with a media key. The media key is described later.

The following describes the revocation information B115. A key management organization has a collection of a plurality of device keys and a plurality of media keys. The key management organization assigns, to each content reproducing device B102, one device key and a key identification number of the device key, and gives the assigned device key and key identification number to the content reproducing device B102. Furthermore, the key management organization assigns one media key to the recording medium B101. Next, the key management organization encrypts the media key using each of the device keys assigned respectively to the content reproducing devices B102, thereby generating encrypted media keys, and creates a list of all of the encrypted media keys and the key identification numbers corresponding to the device keys. This list is the revocation information B115. Note that since a drawback of this simple method is that the data size of the revocation information B115 is unrealistically large when there is a large number of content reproducing devices B102, a method that compresses the data size of the revocation information B115 disclosed in "Key Management System for Digital Content Protection" (Nakano, Ohmori, and Tatebayashi, The 2001 Symposium on Cryptography and Information Security SCIS2001 5A-5, January 2001) may be used. However, the method is not limited to this method, and another method may be used to compress the data size of the revocation information B115.

The content reproducing device B102 is composed of a disc reading unit B121, a reproduction control unit B122, a user operation reception unit B123, a byte code execution unit B124, a stream decryption unit B125, a content restoration processing unit B126, a demultiplexing unit B127, a video decoder B128, an audio decoder B129, a content key generation unit B130, a revocation information processing unit B131, a device key storage unit B132, a device unique information storage unit B133, a stream analysis unit B134, and a packet decryption unit B135.

One example of implementation of the content reproducing device B102 is a computer system composed of a CPU, a work memory, a flash memory, a BD drive, and a remote control. Here, the disc reading unit B121 is the BD drive, the device key storage unit B132 and the device unique information storage unit B133 are the flash memory, the user operation reception unit B123 is the remote control, and the reproduction control unit B122, the byte code execution unit B124, the stream decryption unit B125, the content restoration processing unit B126, the demultiplexing unit B127, the video decoder B128, the audio decoder B129, the content key generation unit B130, the revocation information processing unit B131, the stream analysis unit B134, and the packet decryption unit B135 are software that operates using the CPU and the work memory as one example of a structure. However, these are not limited to being structured by software, and may be implemented in hardware or the like.

This completes the description of the structure of the recording medium and the content reproducing device of an embodiment of the present invention.

(Description of Content Reproduction Processing)

Figure 29:
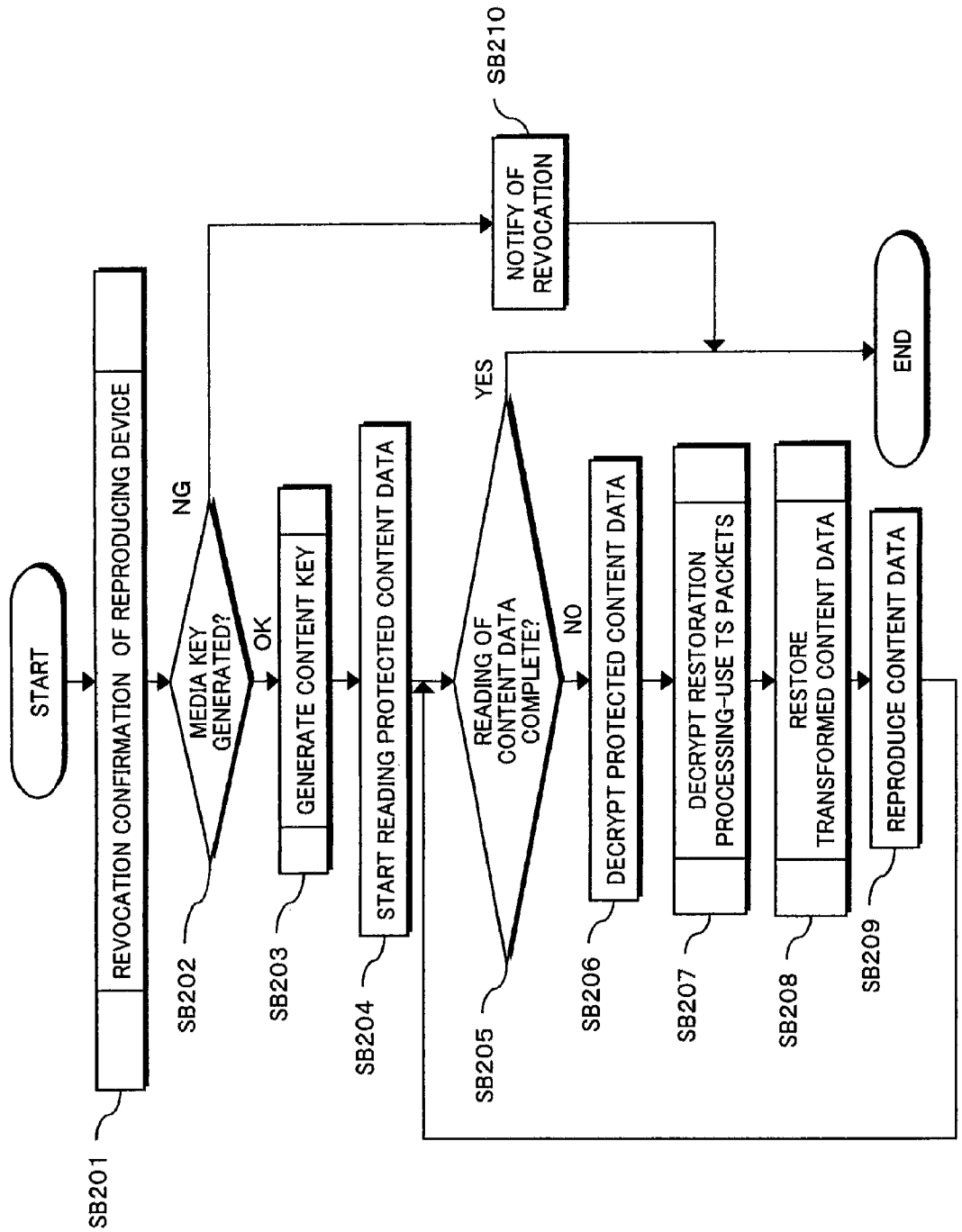
FIG. 29 is a flowchart of content reproduction processing in the embodiment B1.

The following describes content reproduction processing, with use of FIG. 29.

First, the content reproduction processing starts upon the user operation reception unit B123 receiving a content reproduction start request from a user.

When the content reproduction request is received, the revocation information processing unit B131 performs revocation confirmation processing with respect to the content reproducing device B102 (step SB201). Details of the revocation confirmation processing are given later.

Subsequently, the processing branches depending on whether or not generation of the media key succeeds in the revocation confirmation processing at step SB201 (step SB202).

When the generation of the media key succeeds in the revocation confirmation processing at step SB201, the encrypted content key B114 is read from the recording medium B101, and a content key is generated (step SB203). Details of the content key generation are given later.

When the generation of the media key fails in the revocation confirmation processing at step SB201, the user is notified that the content reproducing device B102 is revoked, and the processing ends (step SB210).

After step SB203, in order to reproduce the content requested by the user, the reproduction control unit B122 instructs starting of reading of the protected content data B113 that is the target of reproduction, in compliance with the reproduction control information B111 read from the recording medium B101 (step SB204).

When reading of the protected content data B113 has started, the stream decryption unit B125 performs decryption processing as necessary with respect to the protected content data B113 read from the recording medium B101, with use of the content key generated by the content key generation unit B130 (step SB206). Hereinafter, the data obtained as a result of decrypting the protected content data B113 is called transformed content data. The protected content data is encrypted using AES (Advanced Encryption Standard), but is not limited to being so. Since decryption processing is performed repeatedly during content reproduction until the protected content data B113 ends, decryption of TS packets for restoration processing (described later) (step SB207), restoration of transformed content (step SB208), and reproduction of content data (step SB209) are executed in parallel.

Next, the packet decryption unit B135 decrypts the restoration-use TS packets multiplexed with the transformed content data, in coordination with the stream analysis unit B134 and the byte code execution unit B124 (step SB207). Decryption of the protected content data B113 (step SB206), restoration of transformed content data (described later) (step SB208), and reproduction of content data (step SB209) are executed in parallel during content reproduction. Details of restoration processing-use TS packets and decryption processing are given later.

Next, the content restoration processing unit B126 performs restoration processing of the transformed content data (step SB208). During content reproduction, the restoration processing at step SB208 is executed in parallel with decryption processing of the protected content data B113 (step SB206), decryption of the restoration processing-use TS packets (step SB207), and reproduction of the content data (described later) (step SB209). Details of restoration processing of the transformed content data are given later.

The restored content data is plaintext MPEG 2 TS data, which is separated into a video stream and an audio stream in the demultiplexing unit B127, and the video stream and the audio stream are transmitted to the video decoder B128 and the audio decoder B129, respectively, and output to an audio/video device such as a television (step SB209). Decryption of the protected content data B113 (step SB206), decryption of the restoration processing-use TS packets (step SB207), and restoration of transformed content data (step SB208) are executed in parallel during content reproduction.

The processing ends when all the protected content data B113 corresponding to the content requested by the user has been read and reproduction is complete (step SB205).

This completes the description of the content reproduction processing.

(Revocation Confirmation Processing with Respect to the Content Reproducing Device B102)

Figure 30:
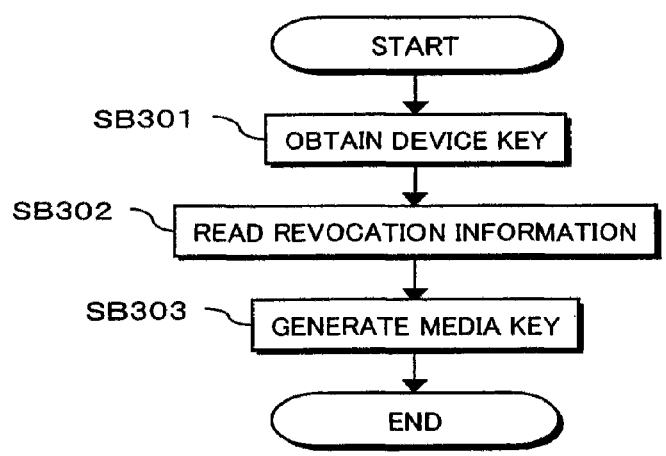
FIG. 30 is a flowchart of revocation confirmation processing of the content reproducing device in the embodiment B1.

The following describes revocation confirmation processing with respect to the content reproducing device B102, with use of FIG. 30. This processing is the details of the processing at step SB201.

Revocation confirmation processing is processing for, before content reproduction, confirming according to the revocation information B115 recorded on the recording medium B101 that the content reproducing device B102 has not been revoked.

The revocation information processing unit B131 reads the device key obtained from the device key storage unit B132 (step SB301).

Next, the revocation information processing unit B131 reads the revocation information B115 recorded on the recording medium B101 (step SB302), and generates a media key using the read device key and the revocation information B115 (step SB303). Note that in the case of the content reproducing device B102 being revoked, a media key is unable to be generated. Generation of the media key using the device key and the revocation information B115 is described in detail in "National Technical Report, Vol. 43, No. 3, p. 118-122" (Matsushita Techno Research, Jun. 18, 1997).

This completes the description of the revocation confirmation processing with respect to the content reproducing device B102.

(Content Key Generation Processing)

Figure 31:
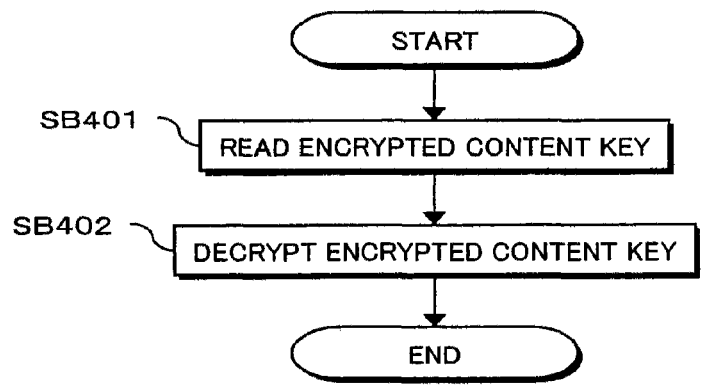
FIG. 31 is a flowchart of content key generation processing in the embodiment B1.

The following describes the content key generation processing with use of FIG. 31. This processing is the details of the processing at step SB203.

The content key generation unit B130 obtains the media key generated at step SB201 from the revocation information processing unit B131 (step SB401). Next, the content key generation unit B130 reads the encrypted content key B114 from the recording medium B101, and decrypts the encrypted content key B114 with the media key obtained at step SB401 (step SB402). In the present embodiment, encryption and decryption of the content key are performed using AES, but are not limited to being so.

This completes the description of the content key generation processing.

(Decryption of Restoration Processing-Use TS Packets)

Figure 32:
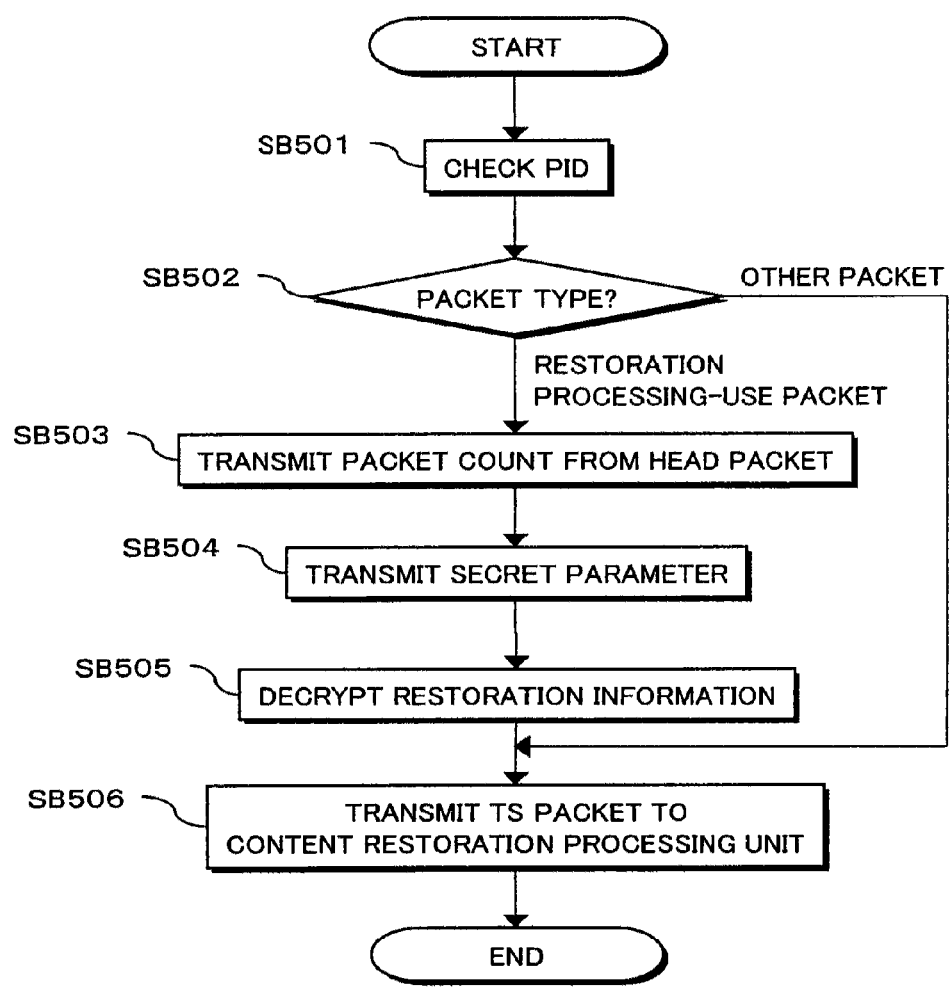
FIG. 32 is a flowchart of decryption processing of restoration processing-use TS packets in the embodiment B1.

The following describes details of the restoration processing-use TS packet decryption processing of step SB207, with use of FIG. 32.

Figure 34:
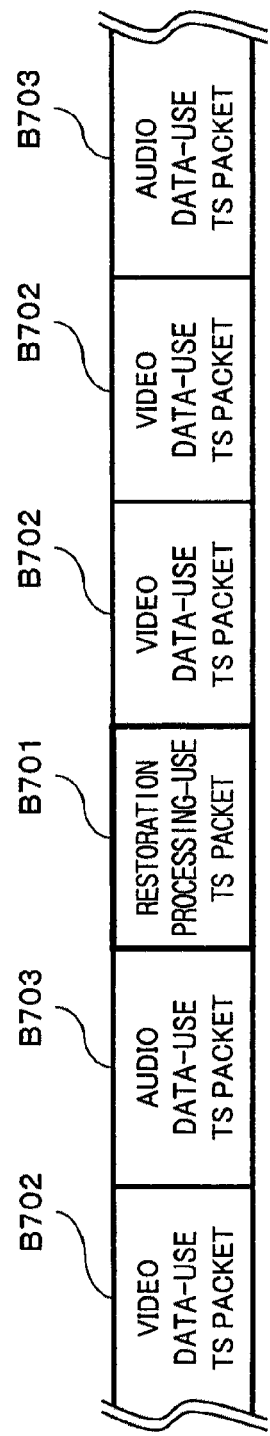
FIG. 34 is a data structure example of transformed content data in the embodiment B1.

Firstly, FIG. 34 shows an example of transformed content data output by the stream decryption unit B125. The transformed content data complies with transport streams as stipulated in the MPEG 2 system, and has restoration processing-use TS packets B701, video data-use TS packets B702, audio data-use TS packets B703 and the like multiplexed therewith. In the present embodiment, transformation processing is applied to the payload of the video data-use TS packets, but is not limited to being so.

The stream analysis unit B134 analyzes each TS packet of the transformed content data output by the stream decryption unit B125, and checks the PIDs of the TS packet headers in order to confirm the type of each TS packet (step SB501).

The processing branches to step SB503 when an analyzed TS packet is a restoration processing-use TS packet, and to step SB506 when the analyzed TS packet is any other type of TS packet (step SB502).

Figure 35:
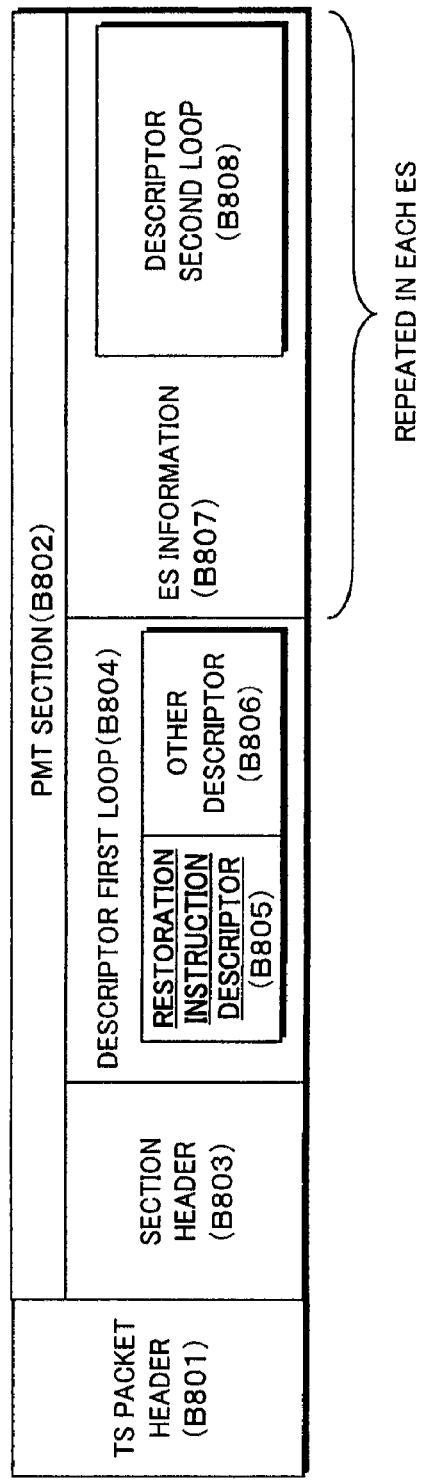
FIG. 35 is a data structure example of a restoration processing-use (TS packet in the embodiment B1.

The following describes a data structure of a restoration processing-use TS packet with use of FIG. 35. In the present embodiment, a PMT stipulated in the MPEG 2 system is used as a restoration processing-use TS packet. Specifically, a restoration instruction descriptor B805 is written at the head of a descriptor first loop B804 in a PMT section B802.

Figure 36:
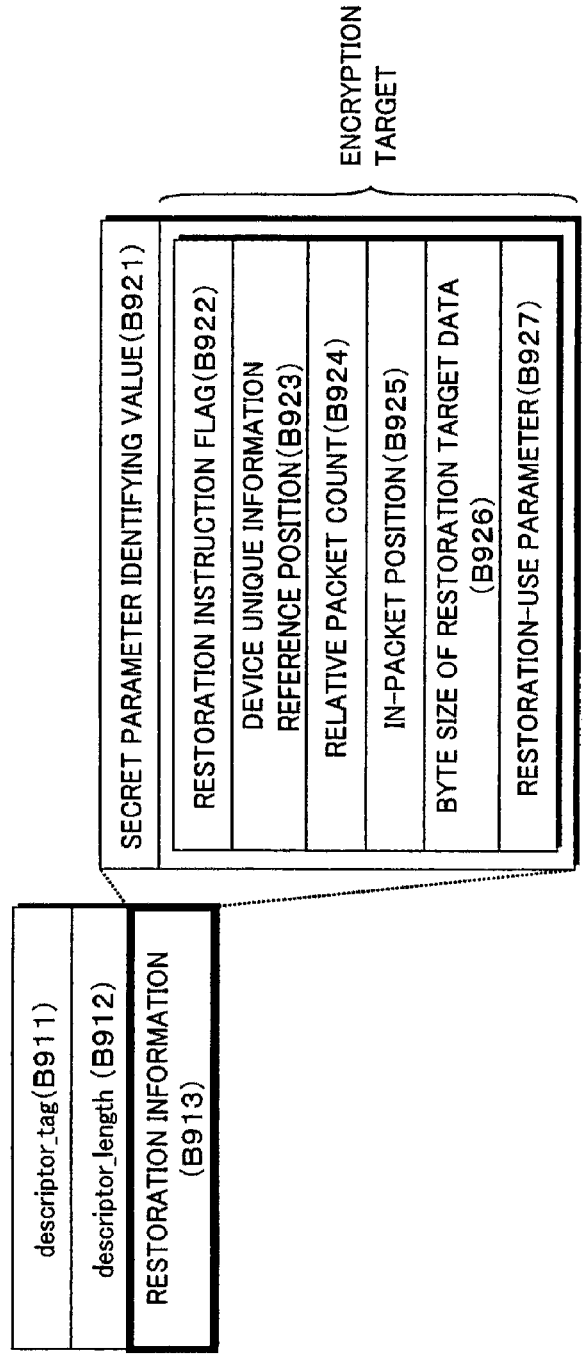
FIG. 36 is a data structure example of a restoration instruction descriptor in the embodiment B1.

FIG. 36 shows a data structure of the restoration instruction descriptor B805. The restoration instruction descriptor B805 includes restoration information B913. The restoration information B913 is composed of a secret parameter identifying value B921, a restoration instruction flag B922, a device unique information reference position B923, a relative packet count B924, an in-packet position B925, a byte size of restoration target data B926, and a restoration-use parameter B927. Except for the secret parameter identifying value B921, the restoration information B913 is encrypted according to AES using a secret parameter. Note that the restoration information B913, excluding the secret parameter identifying value B921, may be encrypted using a method other than AES, such as dividing the restoration information B913 into secret parameter units and finding an XOR of each with the secret parameter. The secret parameter is an encryption key of the restoration information B913 and is held by the byte code B112.

The following describes a data structure of the restoration information B913. The secret parameter identifying value B921 is a value that specifies a secret parameter that is used in subsequent encryption of the restoration information B913. The restoration instruction flag B922 is a flag that shows whether or not to perform restoration using this restoration processing-use packet, the possible values thereof having the meanings shown in FIG. 37. The restoration instruction flag B922 may be omitted. In the case of the restoration instruction flag B922 instructing "10 (device unique information embedment)", the device unique information reference position B923 shows a bit position to be referenced in the device unique information. The relative packet count B924 and the in-packet position B925 are information for specifying where the data is transformed, the position where the data is transformed being shown as a relative position to the restoration processing-use TS packet. The in-packet position B925 shows that a transformed TS packet is located, counting from the next TS packet after the restoration processing-use TS packet, the number of packets listed in the relative packet count B924. The in-packet position B925 additionally shows that transformation processing has been applied to data, the head of which is the number of bytes shown by the in-packet position B925 from the head of the TS packet payload of the TS packet. The byte size of restoration target data B926 shows the number of bytes of the transformed data. The restoration-use parameter B927 is data used in restoring the transformed data. This completes the description of the data structure of the restoration processing-use TS packets.

The description of the processing in FIG. 32 continues. When the TS packet is judged to be a restoration processing-use TS packet B701 at step SB502, the stream analysis unit B134 transmits a "number of packets from the head" that shows which number TS packet the restoration processing-use TS packet is from the head of the protected content data, to the byte code execution unit B124, and transmits the restoration-use TS packet to the packet decryption unit B135 (step SB503). In the present embodiment, the stream analysis unit B134 keeps count of the number of read packets from start of reading data of the protected content, to manage the "number of packets from the head".

At the start of reproduction, the byte code execution unit B124 reads, in advance, the byte code B112 from the recording medium B101 and the device unique information from the device unique information storage unit B133, and, having received the "number of packets from the head" from the stream analysis unit B134, executes the byte code B112, determines the secret parameter B1103 that corresponds to the "number of packets from the head", and transmits the determined secret parameter B1103 to the packet decryption unit B135 (step SB504). Specifically, the byte code B112 holds a secret parameter table shown in FIG. 38, and the byte code execution unit B124, by executing the byte code B112, transmits the several secret parameter identifying values B1102 that occur before and after the record corresponding to the "number of packets from the head" received from the stream analysis unit B134, the secret parameters B1103, and the device unique information, to the packet decryption unit B135. By transmitting a plurality of secret parameters B1103 at once, the number of times that the processing at steps SB503 and SB504 is executed can be reduced, and the processing load on the content reproducing device B102 can be reduced. Note that the device unique information is, for instance, 16-byte data composed of "device manufacturer ID+reproducing device model number+reproducing device manufacturing serial number", and is information that is unique to each content reproducing device B102.

Next, the packet decryption unit B135 selects, from among the plurality of secret parameters B1103 obtained from the byte code execution unit B124, a secret parameter B1103 that matches the secret parameter identifying value B921 in the restoration-use TS packet B701 received from the stream analysis unit B134, and decrypts the restoration information B913 (step SB505). Note that if the number of secret parameters 1103 that are obtained from the byte code execution unit B124 is restricted to being one, the secret parameter identifying value B921 of the restoration information B913 may be omitted.

Finally, the decrypted restoration processing-use TS packet B701, or the packet other than this, is transmitted to the content restoration processing unit B126 (step SB506), and the processing ends.

This completes the description of the restoration processing-use TS packet decryption processing of step SB207.

(Transformed Content Data Restoration)

Figure 33:
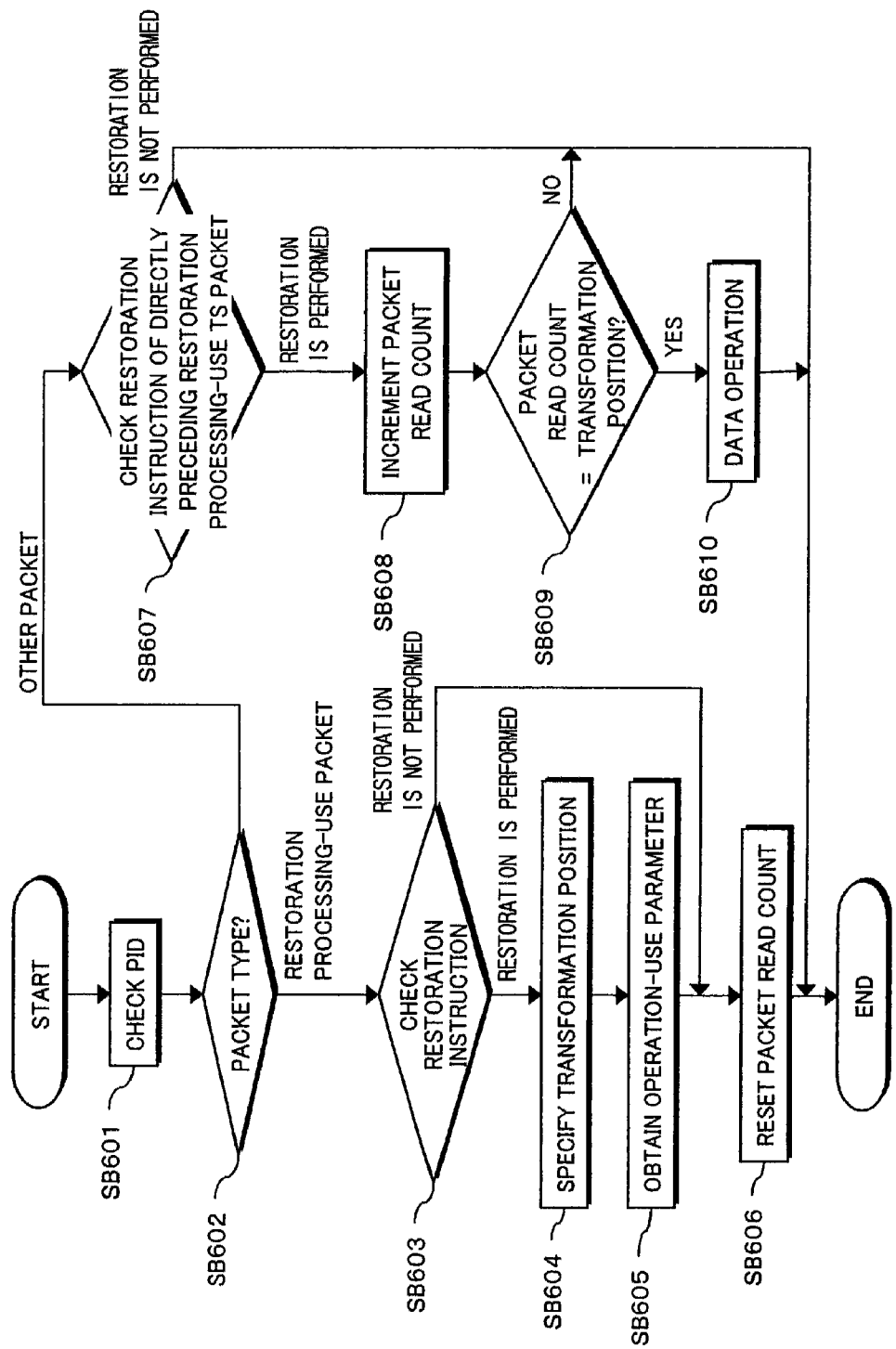
FIG. 33 is a flowchart of restoration processing of transformed content data in the embodiment B1.

The following describes details of the transformed content data restoration processing of step SB208 by the content restoration processing unit B126, with use of FIG. 33.

The content restoration processing unit B126 receives the transformed content data, and starts restoration processing of the transformed content data. The content restoration processing unit B126 checks the PID in the TS packet header of the input TS packet (step SB601), and determines the TS packet type (step SB602).

When the received TS packet is a restoration processing-use TS packet B701, the content restoration processing unit B126 checks and stores the restoration instruction flag B922 in the restoration instruction descriptor B805 (step SB603). In the case in which the restoration instruction flag B922 is omitted, it is assumed that restoration is to be performed.

When restoration is to be performed, the content restoration processing unit B126 specifies a transformation position of the data based on the relative packet count B924 and the in-packet position B925 in the restoration information B913 in the restoration processing-use TS packet (step SB604).

Next, the content restoration processing unit B126 obtains the restoration-use parameter from the restoration-use parameter B927 in the restoration information B913 in the restoration processing-use TS packet (step SB605).

The content restoration processing unit B126 resets a packet read count that is an internal variable held by the content restoration processing unit B126, in order to specify the transformation position in the succeeding TS packet (step SB606), and ends the processing.

When the packet type is a type other than a restoration processing-use packet at step SB602, the content restoration processing unit B126 checks the restoration instruction flag in the restoration processing-use TS packet held at step SB603 (step SB607).

When the result of step SB607 indicates that restoration is performed, the content restoration processing unit B126 increments the packet read count (step SB608), and checks whether or not the packet read count and the transformation position match (step SB609). When the result of step SB607 indicates that restoration is not performed, the content restoration processing unit B126 ends the processing.

When the packet read count and the transformation position match, the content restoration processing unit B126 specifies the transformed data based on the in-packet position B925 specified at step SB604, subjects the data to a data operation using the parameter obtained at step SB605 (step SB610), and ends the processing. When the packet read count and the transformation position do not match, the content restoration processing unit B126 ends the processing.

This completes the description of the transformed content data restoration processing of step SB208 by the content restoration processing unit B126.

Note that although a restoration instruction descriptor B805 is listed in all PMTs included in the protected content data in the present embodiment, it is not necessary to include a restoration instruction descriptor B805 in all PMTs. In such a case, processing is performed having judged in the restoration instruction checking at step SB603 that PMTs that do not include a restoration instruction descriptor B805 do not require restoration processing. Furthermore, in the present embodiment, the description position of the restoration instruction descriptor B805 is set as being first in the descriptor first loop in the PMT section in order to make analysis processing of restoration processing-use TS packets easy in hardware. However, the restoration instruction descriptor may be at another description position in the descriptor first loop, and may be variable.

Figure 39:
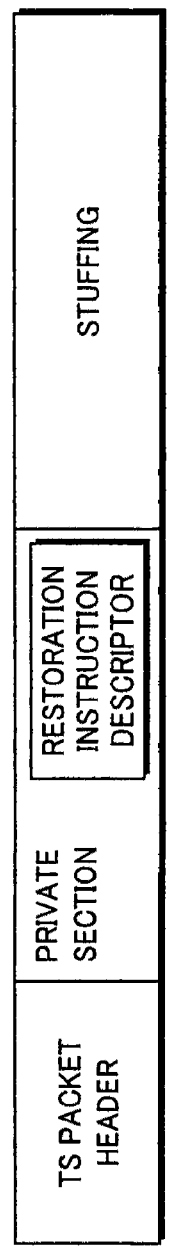
FIG. 39 shows a data structure example of a restoration processing-use TS packet in the embodiment B1.
Figure 40:
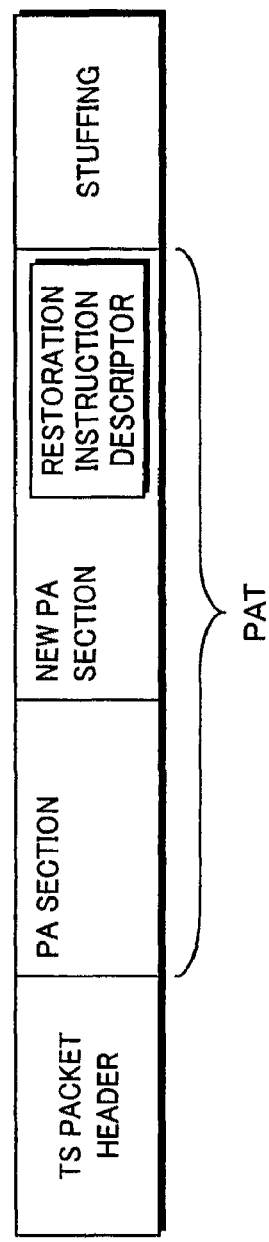
FIG. 40 shows a data structure example of a restoration processing-use TS packet in the embodiment B1.

Furthermore, although in the present embodiment the restoration processing-use TS packets are realized using PMTs stipulated by the MPEG 2 system, the TS packets may be realized according to another method. For instance, as shown in FIG. 39, a TS packet that is assigned a new PID, and that is not a problem in the MPEG system, may be provided, and the restoration instruction descriptor B805 may be described in a private section thereof. Alternatively, as shown in FIG. 40, PATs specified in the MPEG 2 system may be used as restoration processing-use TS packets. In such a case, a new section is added, and the restoration instruction descriptor B805 is described in the new section. As a further alternative, PCRs may be used as restoration processing-use TS packets.

Figure 41:
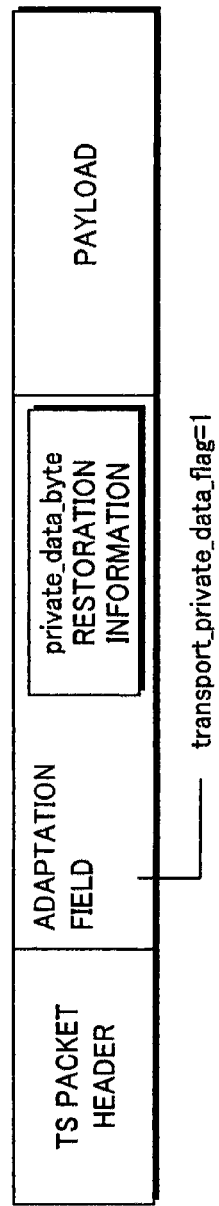
FIG. 41 shows a data structure example of a restoration processing-use TS packet in the embodiment B1.

Furthermore, as shown in FIG. 41, an adaptation field may be added to a PMT, a PAT, a PCR, or the like, and restoration information B913 may be described as private_data_byte. Note that in a case in which an adaptation field is added to the video data-use TS packet and the restoration information B913 is described therein, instead of using the PID for confirming the packet type in the PID check (steps SB501, SB601) and packet type judgment (steps SB502, SB602) in FIGS. 32 and 33, it is checked whether or not the restoration information B913 is described in the adaptation field of the TS packet. Here, packets in which the restoration information B913 is described are judged to be restoration processing-use TS packets.

Furthermore, in the present embodiment, at step SB504 in FIG. 32, a plurality of secret parameters B1103 for decrypting the restoration processing-use packet B701 are sent at once by the byte code execution unit B124 to the packet decryption unit B135. However, it is possible to transmit only one secret parameter B1103 that is of the record corresponding to the "number of packets from head" received from the stream analysis unit B134. A further alternative method is to omit the processing at steps SB503 and SB504 during reproduction, by transmitting all secret parameters B1103 in the secret parameter table to the packet decryption unit B135 at initialization of reproduction processing.

Furthermore, in the present embodiment, although a "number of packets from the head of the protected content data" (B1101) is used for specifying, in the secret parameter table held by the byte code, the secret parameter B1103 used in decryption of the restoration processing-use TS packet B701, any other type of information, such as a logical sector number at which the restoration processing-use TS packet B701 is recorded or read timing data attached to each TS packet, may be used instead, as long as a packet in the stream can be uniquely specified.

(Embodiment B2)

Figure 42:
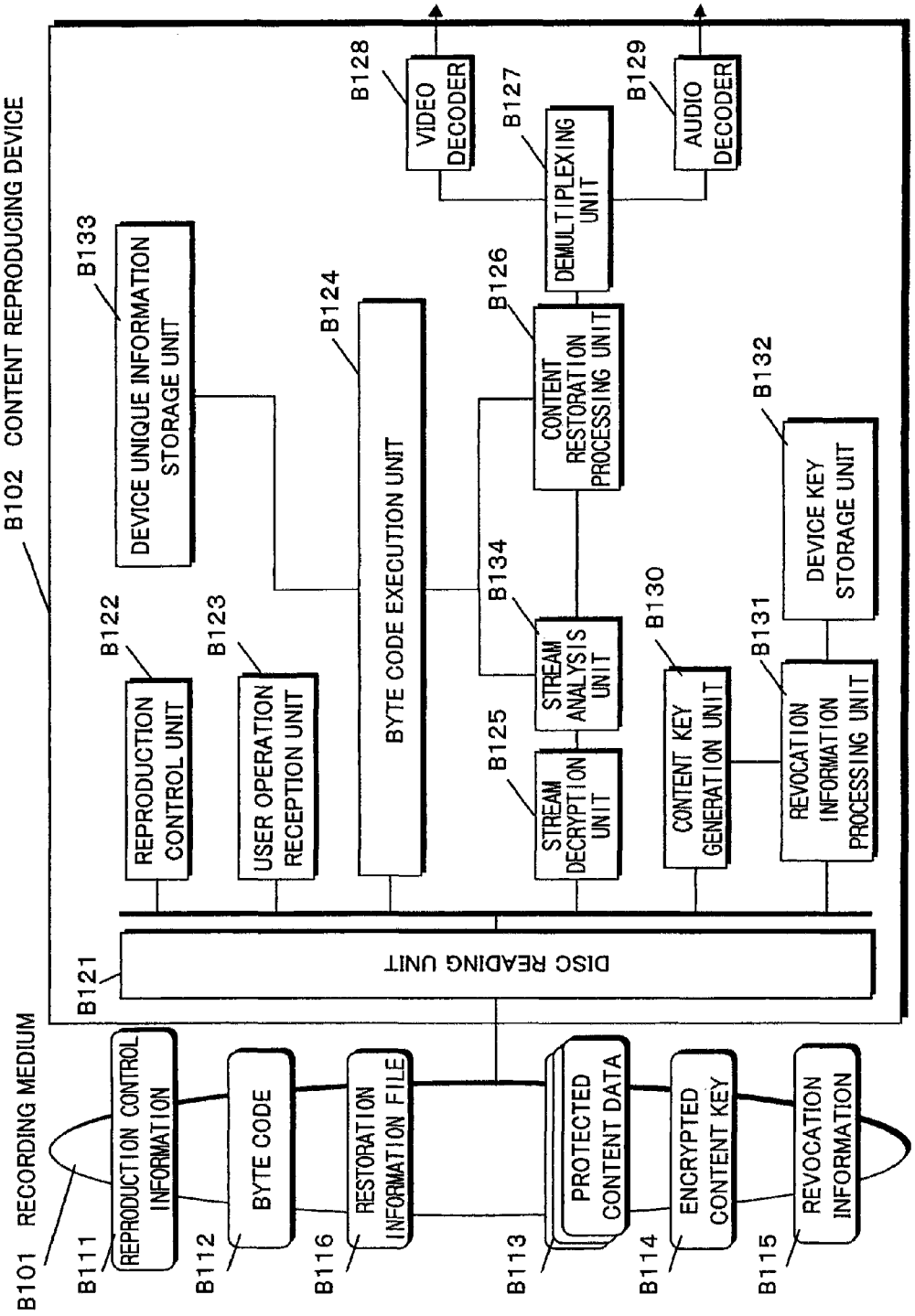
FIG. 42 shows a structure of a recording medium and a content reproducing device in an embodiment B2 of the present invention.

FIG. 42 shows a structure of a recording medium B101 and a content reproducing device B102 pertaining to an embodiment of the present invention.

Since the embodiment B2 is essentially the same as the embodiment B1, aspects that differ from the embodiment B1 are described.

The recording medium B101 is the same in that it subjects plaintext MPEG 2 TS data that is able to be output as video by a decoder to encryption processing using a content key, and that the data is data that has been subject to data transformation processing by replacing part of the data with a different value, for instance. However, restoration information for restoring the transformation is not multiplexed with the protected content data B113. Instead, restoration information that was multiplexed in the embodiment B1 is compiled into one file, and recorded as a restoration information file B116.

Figure 44:
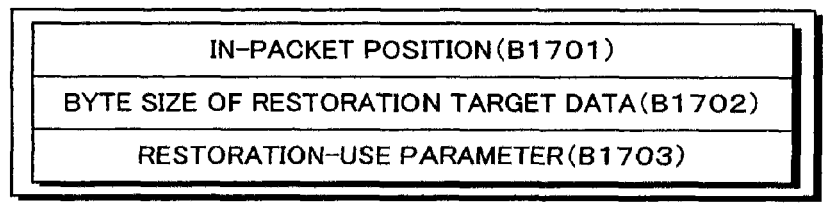
FIG. 44 shows a data structure example of restoration information in the embodiment B2.

FIG. 43 shows a data structure of the restoration information file B116. The restoration information file B116 is composed of a protected content data name B1601, packet position information B1602, a restoration information identifying value B1603, and restoration information B1604. The protected content data name B1601 is the file name of the protected content data B113 that is the restoration target. The packet position information B1602 is information that specifies TS packets in the protected content data that are a restoration target, and in the present embodiment the relative position from the head packet is expressed in terms of a number of packets. However any other information may be used if it enables the packet to be specified, an example being time information that shows a timing with which the TS packet is transmitted to the demultiplexing unit B127 in the content reproducing device B102. The restoration information identifying value B1603 is information for identifying the restoration information B1604. FIG. 44 shows a data structure of the restoration information B1604. An in-packet position B1701 is information for specifying the place where the data is transformed. The in-packet position B1701 shows that transformation processing has been applied to data at a position starting from the byte count shown in the in-packet position B1701 from the head of the TS packet payload. A byte size of restoration target data B1702 shows how many bytes of data are transformed. A restoration-use parameter B1703 is data used in restoring the transformed data. The restoration information file B116 is protected by being encrypted with the held secret parameter, but may be protected using another method.

The content reproducing device B102 is the same as in the embodiment B1, except for not having the packet decryption unit B135.

(Description of Content Reproduction Processing)

Figure 45:
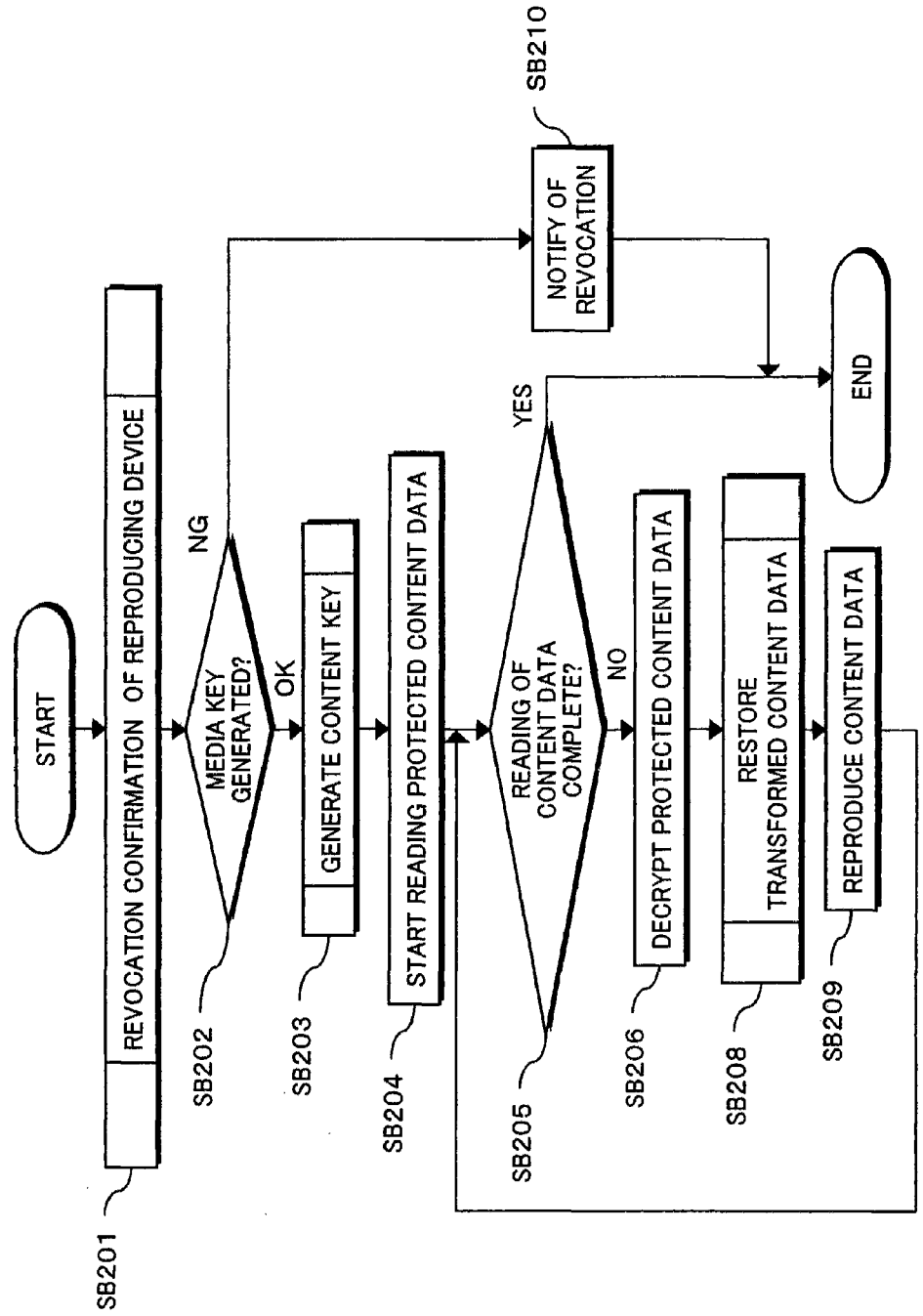
FIG. 45 is a flowchart of content reproduction processing in the embodiment B2.

Content reproduction processing is described with use of FIG. 45. Since the content reproduction processing is essentially the same as the embodiment B1, aspects that differ from the embodiment B1 are described. Other than the exclusion of the processing at step SB207, the processing is the same as in FIG. 29. However, the details of the transformed content data restoration at step SB208 are different.

(Transformed Content Data Restoration)

Figure 46:
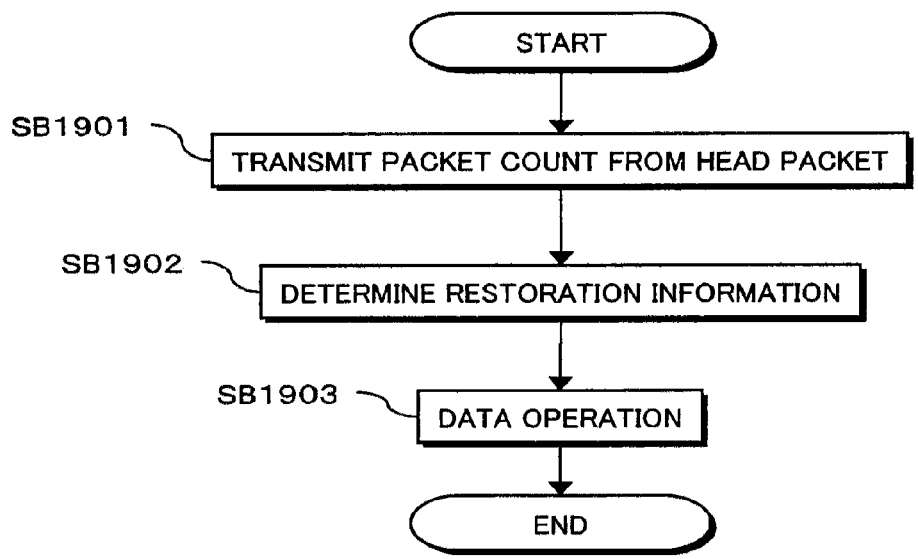
FIG. 46 is a flowchart of restoration processing of transformed content data in the embodiment B2.

The following describes details of the transformed content data restoration processing with use of FIG. 46. This processing is the details of step SB208 in the embodiment B2.

The stream analysis unit B134 analyzes each TS packet in the transformed content data output from the stream decryption unit B125, and transmits information specifying the TS packets, to the byte code execution unit B124 (step SB1901). Specifically, the stream analysis unit B134 transmits the file name of the protected content data being read, and the relative position information of the TS packets from the head packet of the protected content data. In the present embodiment, information that expresses the relative position from the head packet for specifying the TS packet as a number of packets is used. However, any other information, such as time information that shows the timing of transmission to the demultiplexing unit B127, may be used as long as it enables the TS packets to be specified.

Before the start of reproduction, the byte code execution unit B124 reads the byte code B112 and the restoration information file B116 from the recording medium B101 and the device unique information from the device unique information storage unit B133, executes the byte code B112 with a timing at which the information specifying the TS packets is received, and outputs a restoration-use parameter (step SB1902). Specifically, after decrypting the restoration information file B116 using the secret parameter stored by the byte code B112 itself, the byte code B112 retrieves, from the restoration information file B116, a piece of restoration information B1604 corresponding to the information that specifies the TS packet received from the stream analysis unit B134, and transmits the piece of restoration information B1604 to the content restoration processing unit B126.

Next, the content restoration processing unit B126 refers to the received piece of restoration information B1604, specifies the in-packet position B1701 of the restoration target data, restores the content data by replacing with the restoration-use parameter B1703 (step SB1903), and ends the processing.

Note that in the present embodiment, during reproduction the processing at steps SB1901 and SB1902 is performed, and pieces of restoration information B1604 are transmitted one at a time to the content restoration processing unit B126. However, a plurality of pieces of restoration information B1604 may be transmitted at once together with the packet position information B1602 and the restoration information identifying value B1603. As a further alternative method, the byte code execution unit B124 may execute the byte code B112 at the time of initialization of reproduction processing, and transmit all the data in the decrypted restoration information file B116 to the content restoration processing unit B126. In the aforementioned two methods, the content restoration processing unit B126 performs processing to select one piece of restoration information B1604 to be used in restoration of the content data, from among the plurality of pieces of restoration information B1604.

This completes the description of the transformed content data restoration processing by the content restoration processing unit B126.

Note that so that content can be reproduced by the content reproducing device of the embodiment B1 or the content reproducing device of the embodiment B2 using one recording medium, the information recorded on the recording medium of the embodiment B1 and the information recorded on the recording medium of the embodiment B2 may be recorded on the same one recording medium. In such a case, the content reproducing device performs content reproduction using the information corresponding to the particular reproducing method used by the content reproducing device itself.

(Conclusion)

In recent years, accompanying increases in capacity of storage media, systems have become widespread in which content that is a work such as a movie is digitized, and stored and distributed on a medium such as a digital optical disc. In such a system, it is necessary to protect the copyright of the content and to enable reproduction, copying, and the like of the content to be performed only under restrictions that comply with an agreement with the copyright holder. A general system for protecting works from being unauthorizedly copied by a party without the permission of the copyright holder has a structure in which digital content is encrypted with a content key managed by the copyright holder, recorded on a disc, and is only able to be decrypted by a terminal that has a corresponding content key. Furthermore, regulations regarding copyright protection established with the copyright holder must be followed in order to obtain the content key.

As one example of such a system, patent document 2 discloses a method by which the content key for encrypting and decrypting content data is generated based on a function of a seed key and time variable data.

In this case, it is necessary to manage the content key strictly so that it is not exposed. However, it is possible that the content key will be exposed to an unauthorized party due so some kind of accident or occurrence. Once the content key has been exposed to an unauthorized party, there is a risk that the content key of subsequent content will be exposed using the same method. It is expected that this will lead to subsequent unauthorized use of content being unable to be prevented. With a conventional technique, since the content data is protected only by the content key that is protected according to a stipulated method, it is susceptible to this kind of attack.

In view of the aforementioned problem, the present invention has an object of providing a recording medium, a data processing method, and a data processing device that protect content so that even if a way to crack content protection is discovered according to some kind of accident or occurrence, other content is unable to be used unauthorizedly with the same method.

Furthermore, the present invention has an object of providing a recording medium, a data processing method, and a data processing device that enable specification of an unauthorized reproducing device that was able to crack content protection, based on content whose protection method has been cracked and is being unauthorizedly distributed in a format usable by anyone.

In order to solve the aforementioned problem, the present invention provides a recording medium on which content data is recorded, wherein the content data is protected by encryption with a content key, and data transformation according to an operation that is different to the encryption. Furthermore, the present invention provides the recording medium, wherein in addition to the content data, the content key and a program for calculating a parameter necessary for restoration of the content data are recorded on the recording medium.

Moreover, the present invention provides the recording medium, wherein the program enables calculation of the parameter only by a valid data processing device that is permitted to use the content data. Moreover, the present invention provides the recording medium, wherein the parameter includes terminal unique information. Moreover, the present invention provides the recording medium, wherein the parameter includes information for distinguishing whether restoration processing is unique to the content or is unique to a data processing device.

Furthermore, the present invention provides a recording medium on which content data is recorded, wherein the content data is protected by encryption with a content key, and data transformation according to an operation that is different to the encryption, and part or all of the parameter is recorded multiplexed with the content data. Moreover, the present invention provides the recording medium, wherein the part or all of the parameter that is recorded multiplexed with the content data includes information that specifies a data transformation position.

Furthermore, the present invention provides a recording medium on which content data is recorded, wherein the content data is protected by encryption with a content key, and data transformation according to an operation that is different to the encryption, and part or all of the parameter is recorded as a file that is separate to the content data.

Moreover, the present invention provides a data processing method for reproducing content data that is recorded on a recording medium, the content data being protected by encryption with a content key, and data transformation according to an operation that is different to the encryption, the data processing method including: a step of decrypting with the content key; and a step of performing restoration of the content data.

Moreover, the present invention provides the data processing method, wherein the step of performing restoration of the content data includes: a step of, before reproduction commences, calculating a parameter necessary for restoration processing; and a step of, during reproduction, performing the restoration processing of the content data using the parameter, the steps being separate. Moreover, the present invention provides the data processing method, wherein in the step of performing parameter calculation, device unique information is used.

Furthermore, the present invention provides the data processing method, wherein in the step of performing the restoration processing of the content data, device unique information is used.

Furthermore, the present invention provides the data processing method, wherein in the step of performing the restoration processing of the content data, content unique information is used.

Furthermore, the present invention provides the data processing method, wherein the step of performing restoration of the content data during reproduction performs the restoration processing in accordance with restoration processing-use data that is multiplexed with the content data. Moreover, the present invention provides the data processing method wherein the step of performing restoration of the content data during reproduction specifies the data transformation position according to the restoration processing-use data multiplexed with the content data, and performs restoration processing.

Furthermore, the present invention provides the data processing method, wherein the step of performing restoration of the content data during reproduction performs the restoration processing in accordance with restoration processing-use data that is recorded as a separate file to the content data.

Furthermore, the present invention provides a data processing device for reproducing content data that is recorded on a recording medium, the content data being protected by encryption with a content key, and data transformation according to an operation that is different to the encryption, the data processing device including: an information reading unit operable to read information from the recording medium; a unit operable to decrypt with the content key; a unit operable to store terminal unique information; a unit operable to execute a program for calculating a parameter necessary for restoration of the content data; a unit operable to perform restoration processing of the content data using the calculated information necessary for restoration; and a decoding unit operable to decode the content data.

As has been described, the present invention has the effect of being able to provide a recording medium, a data processing method, and a data processing device by which content is protected such that the content is not reproduced unauthorizedly, even if the content key is leaked due to some kind of accident or occurrence, and circulated among the general public.

Furthermore, the present invention enables specification of an unauthorized reproducing device that was able to crack content protection, based on content whose protection method has been cracked and is being unauthorizedly distributed in a format usable by anyone.

3. Embodiment C: Disc Production System (Embodiment C1)

Figure 47:
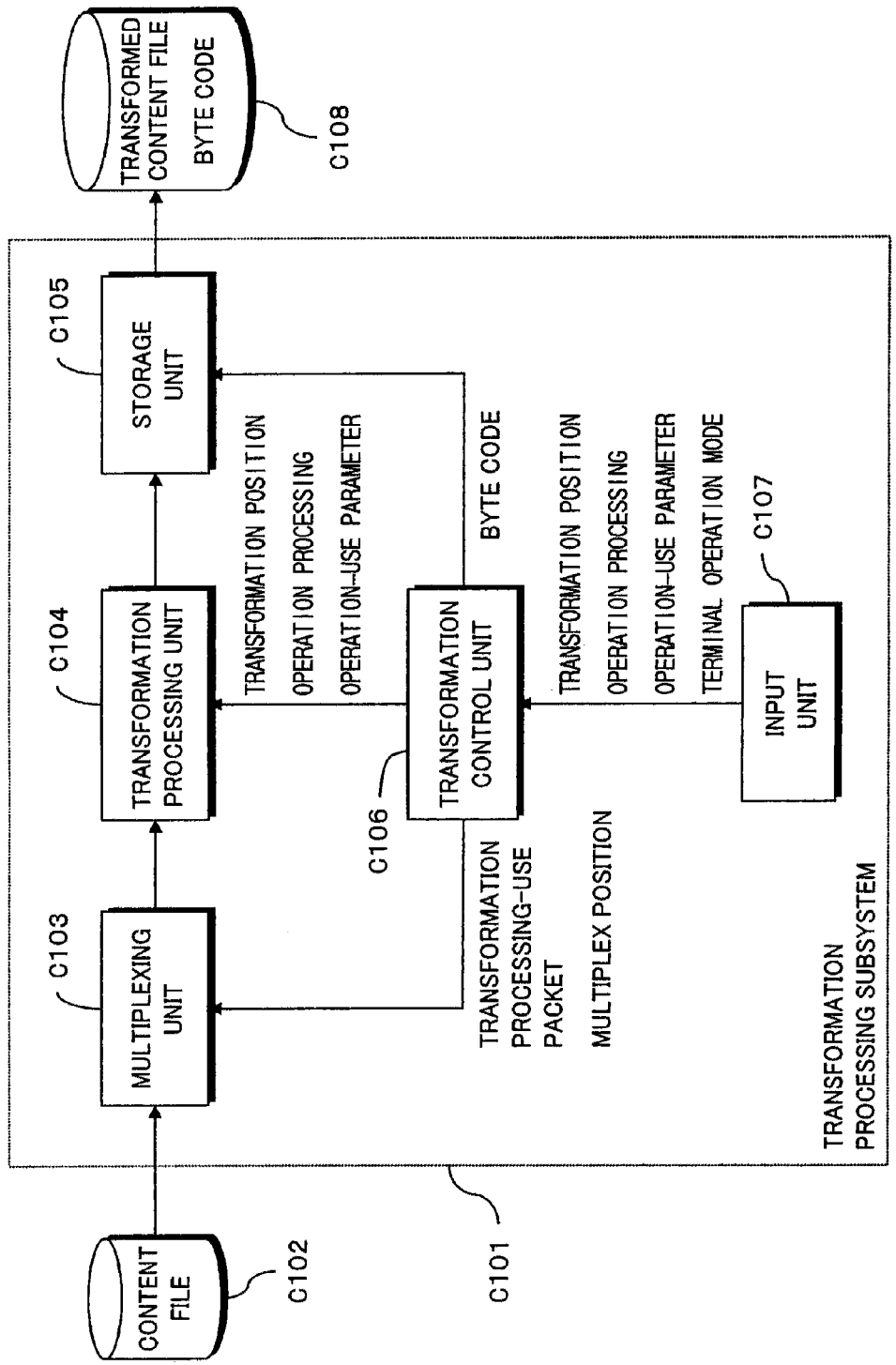
FIG. 47 is a block diagram showing a structure of a transformation processing subsystem in an embodiment C1 of the present invention.

FIG. 47 is a block diagram showing main parts of a structure of a transformation processing subsystem C101 for executing transformation processing in an embodiment C1 of the present invention. The transformation processing subsystem C101 includes a multiplexing unit C103, a transformation processing unit C104, a storage unit C105, a transformation control unit C106, and an input unit C107. The multiplexing unit C103 is connected to a recording medium C102 and the transformation control unit C106, and multiplexes, with a content file, transformation processing-use packets according to instructions from the transformation control unit C106, and outputs the resultant content file. The transformation processing unit C104 is connected to the multiplexing unit C103 and the transformation control unit C106, and executes transformation processing on specified content packets in the content file according to instructions from the transformation control unit C106. The storage unit C105 is connected to the transformation processing unit C104 and the transformation control unit C106, and stores, on a recording medium C108, a post-transformation, transformed content file and byte code data that has been received from the transformation control unit C106. The transformation control unit C106 is connected to the input unit C107, and, based on data received from the input unit C107, issues transformation processing instructions to the multiplexing unit C103 and to the transformation processing unit C104. The transformation control unit C106 also generates the byte code data including processes and parameters for reversing the transformation corresponding to the transformation processing, and transmits the byte code data to the storage unit C105. The input unit C107 inputs data to specify the transformation processing.

An operation of the transformation processing subsystem C101 having the kind of construction described above is described with reference to an operation flowchart of FIG. 49.

Figure 49:
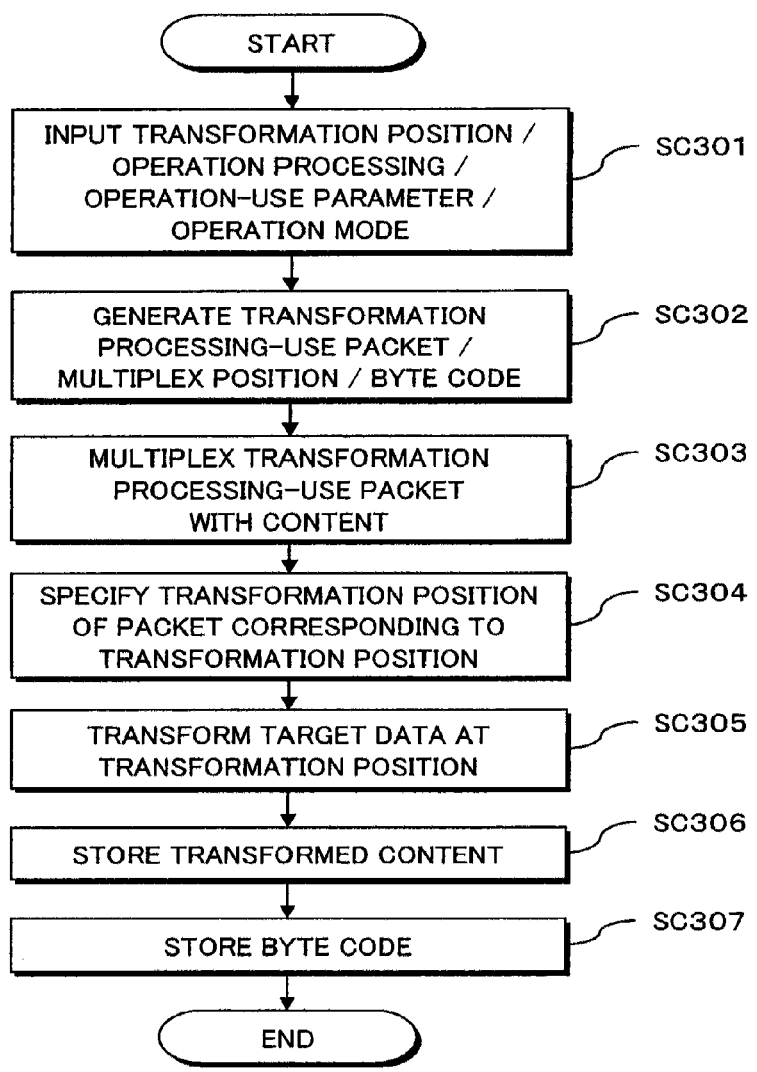
FIG. 49 is an operation flowchart showing an operation of the transformation processing subsystem in the embodiment C1 of the present invention.

FIG. 49 is an operation flowchart showing the operation of the transformation processing subsystem C101.

In step SC301, various information is input into the transformation control unit C106 from the input unit C107. This information includes: transformation position information indicating the ordinal number, counted from the head packet of a content file, of a packet and the ordinal numbers of the bytes within the packet that are to be transformed; operation processing information indicating which operation of a set of operations including logic operations such as XOR and encryption methods is to be performed; an operation-use parameter for use in the operation processing; and a terminal operation mode which is information indicating whether to include information specifying a reproducing terminal, at a given reproducing terminal for reproducing the recording medium C205.

Next, in step SC302, based upon the information input in step SC301, the transformation control unit C106 generates a transformation processing-use packet, a multiplex position, and the byte code data. The multiplex position is information specifying the ordinal number from the head of the content file of the packet at which the generated transformation processing-use packet is multiplexed. The multiplex position is generated to allow for processing time at the reproducing terminal, so that the transformation processing-use packet is multiplexed a certain number of packets before the transformation position specified by the above transformation position information. The transformation processing-use packet and the byte code data are described at a later stage in this description. The transformation control unit C106 transmits the generated transformation processing-use packet and the multiplex position to the multiplexing unit C103, transmits the transformation position information, the operation processing information, and the operation-use parameter to the transformation processing unit C104, and transmits the generated byte code data to the storage unit C105.

Next, in step SC303, the multiplexing unit C103 multiplexes the transformation processing-use packet into a position in the content file specified by the multiplex position.

Next, in step SC304, the transformation processing unit C104 specifies the packet that is to be transformed and the transformation target data, the data that is to transformed within the packet, on the basis of the transformation position.

Next, in step SC305, the transformation processing unit C104 executes operation processing using the operation-use parameter on the transformation target data in the specified transformation packet. For example, when the operation processing is an XOR operation, the transformation processing unit 104 takes the XOR sum of the transformation target data and the operation-use parameter, and overwrites (replaces) the transformation target data with the resulting value. Note that the operation processing is not limited to an XOR operation, but may consist of other logic operations or encryption processes.

Next, in step SC306, the storage unit C105 stores the transformed content file that has finished undergoing transformation processing on the recording medium C108.

Next, in step SC307, the storage unit C105 stores the byte code data on the recording medium C108 in a different file from the transformed content file.

Note that a plurality of transformation positions can be specified within one content file, in which case, in step SC301, operation processing and an operation-use parameter are input for each of a plurality of transformation positions. Transformation can then be realized by repeating step SC302 to step SC305 for each of the plurality of transformation positions.

Figure 53:
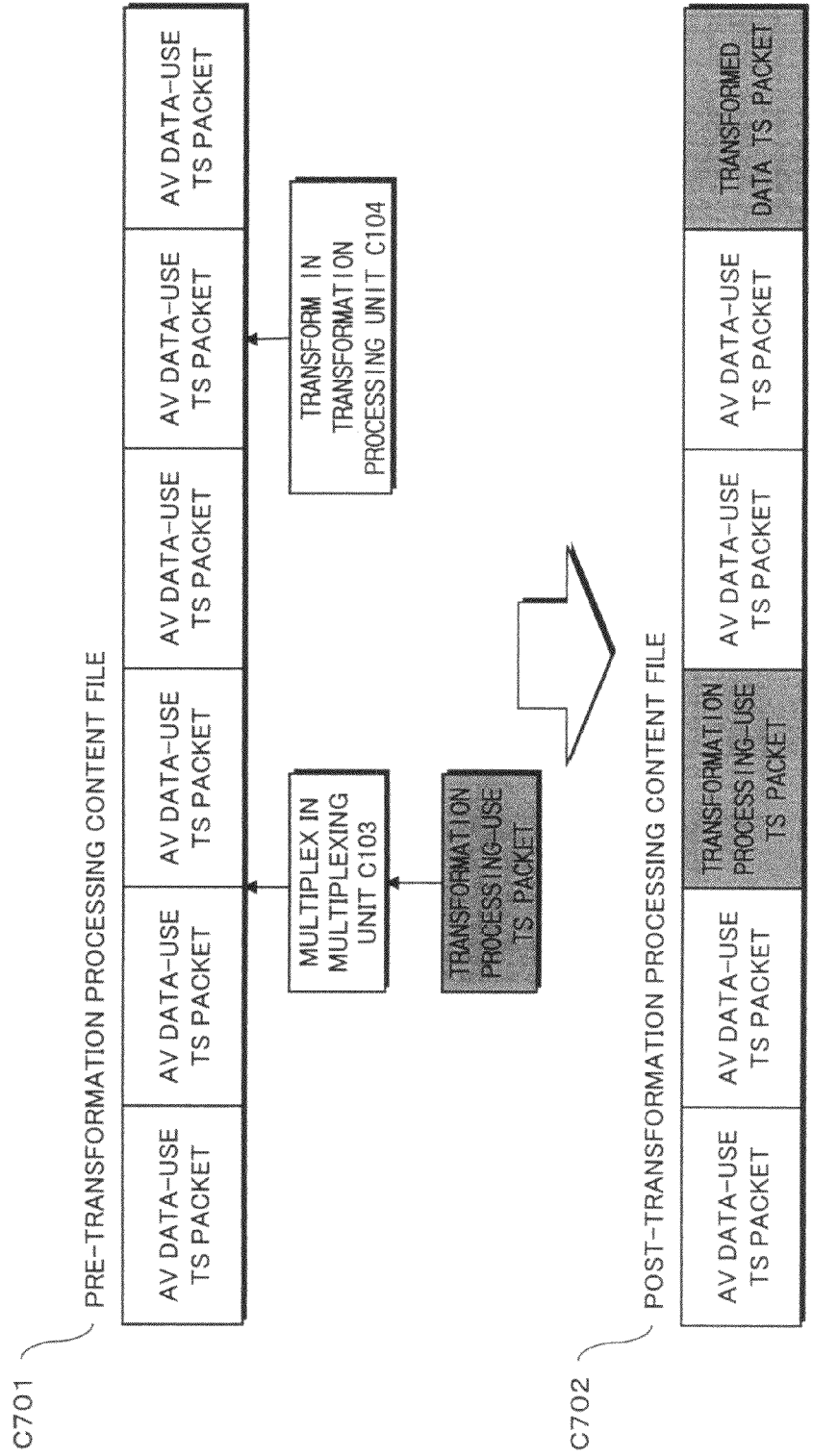
FIG. 53 shows a structure of a transformed content file in the embodiment C1 of the present invention.

FIG. 53 shows a representation of the transformed content file generated via the kind of operation flow described above. In FIG. 53, a post-transformation processing content file C702, which is a content file after transformation processing, is generated by the multiplexing unit C103 multiplexing a transformation processing-use TS packet with a pre-transformation processing content file C701, and by the transformation processing unit C104 carrying out transformation processing. Here, the transformation processing-use packet has a packet identifier that is different from those of other packets in the content file.

Below, a disc production system including the transformation processing subsystem C101 is described with reference to FIG. 48.

Figure 48:
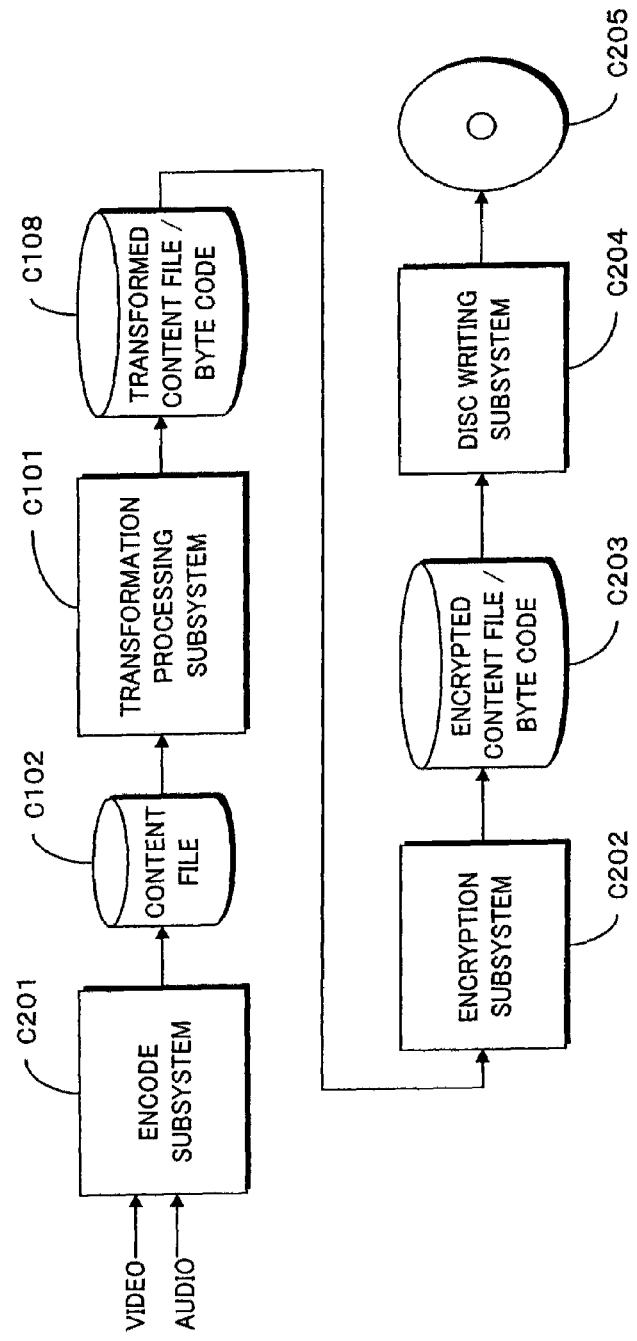
FIG. 48 is a block diagram showing a structure of a disc production system in the embodiment C1 of the present invention.

FIG. 48 is a block diagram showing main parts of a disc production system for producing the recording medium C205, such as an optical disc, of the embodiment C1 of the present invention. This disc production system includes an encode subsystem C201, the transformation processing subsystem C101, an encryption subsystem C202, and a disc writing subsystem C204. The encode subsystem C201 converts content data such as audio and video into a data format suitable for storing on the recording medium C205, such as the optical disc or the like, and stores the result as a contents file on the recording medium C102. The transformation processing subsystem C101 implements transformation processing on the content file stored on the recording medium C102, and stores a transformed content file together with the byte code data that corresponds to the transformation processing on the recording medium C108. The encryption subsystem C202 is connected to the recording medium C108, carries out encryption processing on the transformed content file to generate an encrypted content file, and stores at least the encrypted content file and the byte code data on a recording medium C203. The disc writing subsystem C204 is connected to the recording medium C203 and writes at least the encrypted content file and the byte code data to the recording medium C205. Thus at least the encrypted content file and the byte code data are stored on the recording medium C205. Further, a key for decrypting the encrypted content file may also be stored on the recording medium C205.

The transformation processing-use packet and the byte code data, which are generated using the above operation flow, are described below. The transformation processing-use packet and the byte code data are used at the reproducing terminal for reversing the transformation processing, and respectively include the information indicated in FIG. 50 and FIG. 51. The byte code data is, for example, the type of code executable in a virtual operations unit, such as a JAVA virtual machine, and is the data describing a code executable at the reproducing terminal.

In the case of FIG. 50A, the transformation processing-use packet includes data transformation operation processing specifying operation processing for transforming data, a transformation position that contains a packet count indicating the ordinal number of the transformed packet counted from the transformation processing-use packet and an in-packet position indicating the transformation target data in that packet, and a data transformation operation-use parameter that contains a parameter used in the transformation processing and dummy data. The byte code data including the data of FIG. 51A is generated together with this transformation processing-use packet. The byte code data of FIG. 51A includes an operation mode of a reproducing terminal (indicating that information specifying a reproducing terminal is not used in the case of FIG. 51A), and a data transformation operation-use parameter position specification indicating which value in the data transformation operation-use parameter in the transformation processing-use packet is to be used.

Figure 52:
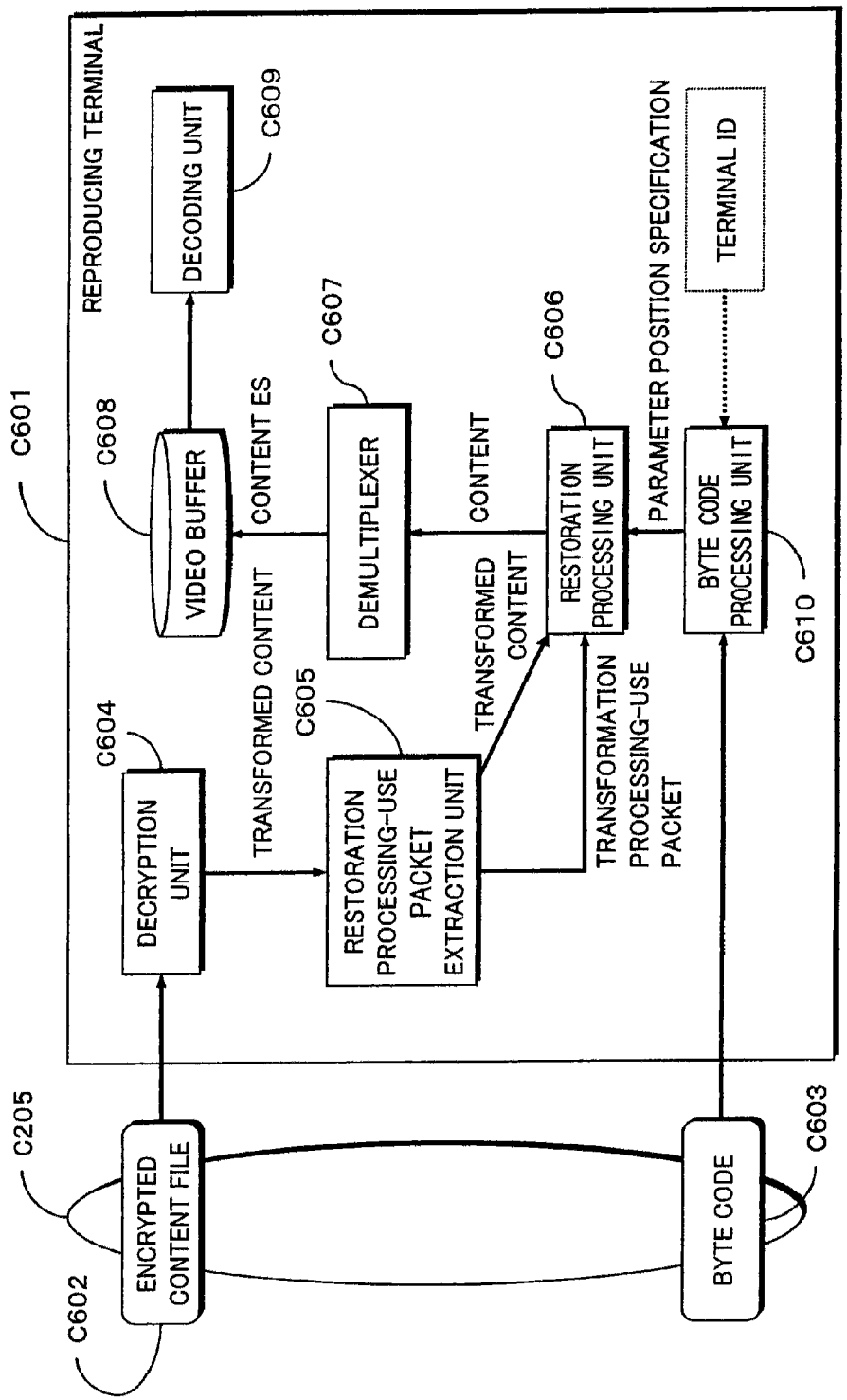
FIG. 52 is a block diagram showing main parts of a reproducing terminal in the embodiment C1 of the present invention.

An example operation of a reproducing terminal in this case is described with reference to FIG. 52, which shows its main parts. A reproducing terminal C601 reads byte code data C603 from the recording medium C205. In the reproducing terminal C601, in preparation for reproduction, a byte code processing unit C610 then analyzes the byte code data C603, and acquires the operation mode and the data transformation operation-use parameter position specification. If the operation mode is a mode of not including information specifying a reproducing terminal, the byte code processing unit C610 transmits the data transformation operation-use parameter position specification and the operation mode to a restoration processing unit C606. Subsequently, at reproduction, the reproducing terminal C601 reads an encrypted content file C602. A decryption unit C604 decrypts the encrypted content file C602 and outputs the resultant decrypted content file C602 to a transformation processing-use packet extraction unit C605 as the transformed content. Upon detection of the transformation processing-use packets, the transformation processing-use packet extraction unit C605 outputs the transformation processing-use packets and the remaining transformed content to the restoration processing unit C606. The restoration processing unit C606 executes operation processing corresponding to the specified data transformation operation processing on the transformation target data in the transformed content specified by the transformation position in the transformation processing-use packet, using the data in the data transformation operation-use parameter specified by the data transformation operation-use parameter position specification. The restoration processing unit C606 then outputs the result to a demultiplexer C607 as content. The demultiplexer C607 converts the content information, which includes video and audio data, into a format that can be processed by a decoding unit C609. The demultiplexer C607 outputs the converted content information to a video buffer C608, and the decoding unit C609 carries out the processing associated with reproduction and output of the content.

In the case of FIG. 50B, on the other hand, the transformation processing-use packet includes a packet count and an in-packet position. In such a case, the corresponding byte code data is generated as shown in FIG. 51B, which includes an operation mode (indicating that information specifying a reproducing terminal is used in the case of FIG. 51B), data transformation operation processing, and a data transformation operation-use parameter.

In this case, in the reproducing terminal C601, the byte code processing unit C610 analyzes the byte code data C603. Since the operation mode is a mode of specifying a reproducing terminal, for example the byte code processing unit C610 obtains the terminal ID, generates a parameter by combining the terminal ID with the data transformation operation-use parameter, and transmits the generated parameter to the restoration processing unit C606 together with the data transformation operation processing and the operation mode. The restoration processing unit C606 executes the operation processing corresponding to the data transformation operation processing on the transformation target data specified by the transformation position in the transformation processing-use packet, using the received parameter.

In this way, in this embodiment, information relating to the transformation processing applied to the content file can be specified in each transformation processing-use packet and the byte code data, and hence, transformation processing can be freely changed for each content file.

Also, by setting the operation mode of the reproducing terminal to the mode of using information specifying a reproducing terminal, information that varies for each terminal ID can be included in content at the time of reproduction. In this way, it is possible to specify a reproducing terminal that has taken an unauthorized copy or unauthorizedly distributed the content.

Further, in the transformation processing subsystem C101, if an unauthorized terminal list is input from the input unit C107, the unauthorized terminal list can be stored as part of the byte code data. In such a case, when a reproducing terminal references its terminal ID, if a terminal ID that matches its own is stored in the unauthorized terminal ID list contained in the byte code data, extraction of data transformation parameters can be suppressed, analysis of the byte code data cancelled, or the like. Consequently, unauthorized terminals can be rendered incapable of reproducing content in a normal way.

Note that the transformation position in the content file is indicated by the packet ordinal number, but another method such as using a time stamp is equally applicable.

Note that the byte code data need not be JAVA, but may be another type of execution code. Moreover, the byte code data can be a self-modifying type of execution code, making it possible to obtain an improvement in the degree of concealment of the byte code data.

Also, though the data transformation operation processing, the transformation position, the data transformation-use parameter, the data transformation operation-use parameter position specification, and the operation mode are shown in FIGS. 50 and 51, the present invention is not limited to these combinations, as various other combinations are equally applicable including the representative pattern shown in FIG. 54. Also, the packet identification number may be stored in the transformation processing-use packet, so that the data transformation operation-use parameter and the data transformation operation processing are varied for each packet identification number in the byte code data.

Also, though the operation mode is included in the byte code data, the operation mode may instead be included in the transformation processing-use packet. In such a case, the same effects can be achieved by making the operation mode judgment in the restoration processing unit C606 in the reproducing terminal C601.

Also, though the transformation position is stored in the transformation processing-use packet, a transformation starting packet for indicating that the next packet is the transformation target packet may be multiplexed directly before the transformation target packet. This makes it unnecessary for the reproducing terminal C601 to count the number of packets, with it being possible to reduce the processing load.

(Embodiment C2)

Figure 55:
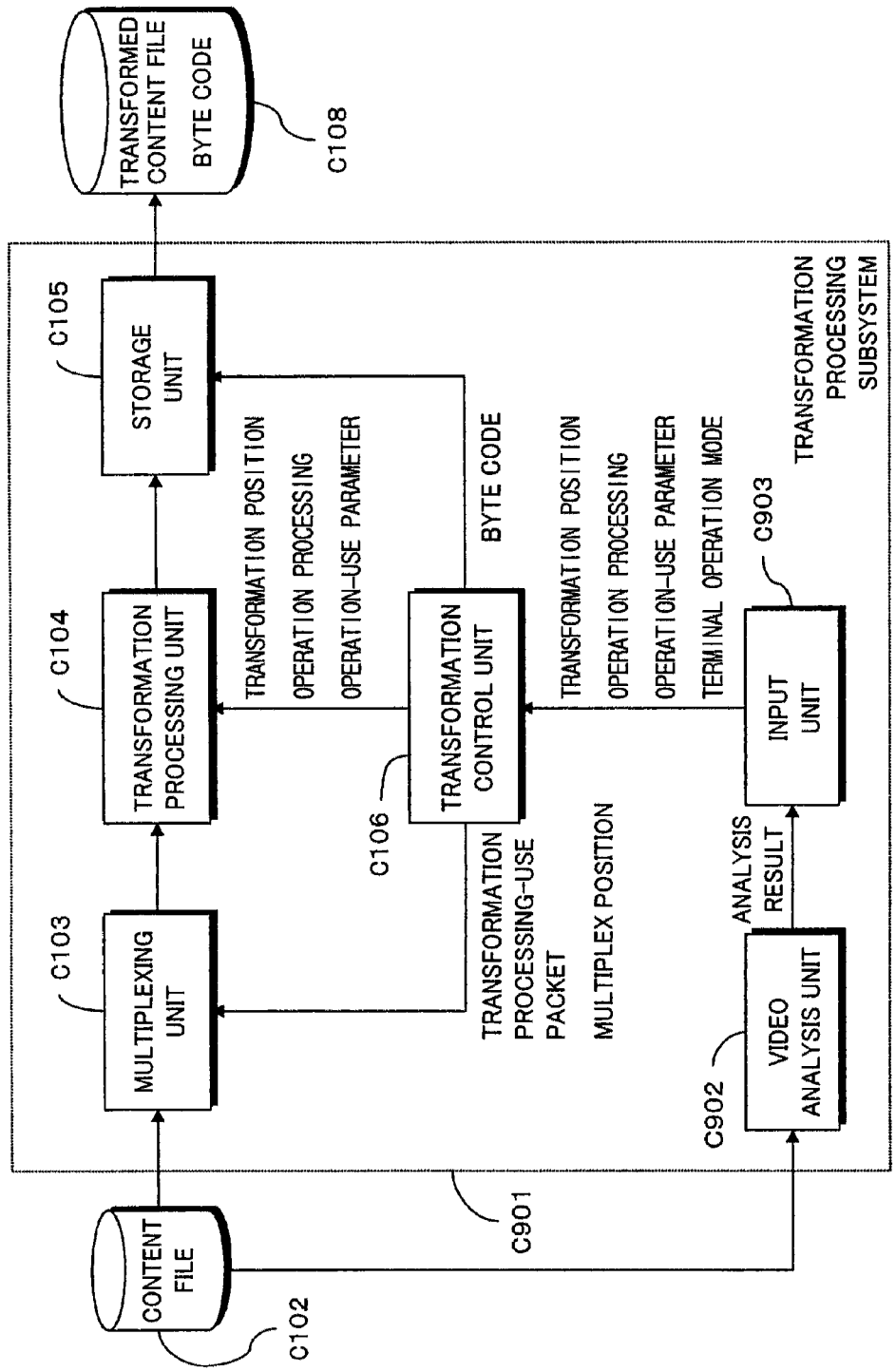
FIG. 55 is a block diagram showing a structure of a transformation processing subsystem in an embodiment C2 of the present invention.

FIG. 55 is a block diagram showing main parts of a structure of a transformation processing subsystem C901 for executing transformation processing in an embodiment C2 of the present invention.

The transformation processing subsystem C901 includes a video analysis unit C902 and an input unit C903. The video analysis unit C902 is connected to the recording medium C102, and analyzes video information of a content file and transmits an analysis result to the input unit C903. The input unit C903 determines, based on the analysis result, which information of the video is subjected to transformation, and transmits transformation position information, operation processing information, an operation-use parameter, and a terminal operation mode to the transformation control unit C106. The other elements are the same as those in the transformation processing subsystem C101 and so their explanation has been omitted here.

An operation of the transformation processing subsystem C901 having this kind of construction described above is described below.

The video analysis unit C902 reads a content file from the recording medium C102, and analyzes video packets in the content file. The analysis referred to here is performed by detecting which of I (intra), P (forward predicted), and B (bidirectionally predicted) pictures the video belonging to each video packet is, and which frequency component or position of the picture the video corresponds to. The video analysis unit C902 transmits an obtained analysis result of each video packet to the input unit C903.

Based on the received analysis result, the input unit C903 determines which packet of the I, P, or B picture is subjected to transformation according to a predetermined transformation operation setting, and transmits information such as the transformation position to the transformation control unit C106.

According to the present embodiment, the transformation processing position can be specified based on the video analysis unit. For example, when the transformation operation setting is made to subject a packet in a low frequency region of an I picture to transformation, the position of the corresponding packet is extracted from the analysis result and transmitted to the transformation control unit C106. In this case, the transformation processing has significant influence on image clarity. An unauthorized reproducing terminal cannot perform transformation processing in a normal way, with it being possible to prevent reproduction of clear video.

When the transformation operation setting is made to subject a packet in a high frequency region of a B picture to transformation, on the other hand, the transformation processing does not have significant influence on image clarity.

Accordingly, even if information about the terminal ID is embedded in the transformation position in the reproducing terminal, clear video that can be viewed without problem can be reproduced.

Note here that in-picture position information may be used instead of a frequency component.

Also, the transformation processing subsystems C101 and C901 can be realized as one device.

(Conclusion)

In recent years, as the capacity of storage media has increased, systems in which content that is a work such as a movie is converted into digital form and stored in media, such as digital optical discs or the like, have become widespread. In such systems, it is necessary that the copyright of the content is protected and that reproduction and copying of the content are practiced only within limits based on an agreement with the copyright holder. Regular systems to protect copyright material from being unauthorizedly copied or the like without permission from the copyright holder include arrangements in which the digital content is encrypted using a content key managed by the copyright holder. The encrypted digital content is then stored on a disc and can only be decrypted by terminals holding a corresponding content key. For a user to obtain the content key, rules for copyright protection established between the user and the copyright holder must be followed.

As an example of this kind of system, in Japanese Patent Application Publication No. 2000-100069, a method is revealed in which the content key for encrypting and decrypting the content data is protected by being generated based on a function of seed keys and time variable data.

When this technique is used, there is a requirement that the content key be strictly managed so as not to be exposed to an outside party. However, there may be times when, via some accident or incident, the content key is exposed to an unauthorized party. Once the content key has been exposed to the unauthorized party, there is a danger that the content keys for subsequent content will be discovered using the same method. Consequently, it can be presumed that unauthorized use of subsequent content could not be prevented. With conventional techniques, the content data is susceptible to attacks of this type because its sole protection is a content key protected via the specified method.

In view of this problem, an object of the present invention is to provide a recording medium for protecting content in such a way that even if, by some accident or incident, a method to break the content protection is discovered once, the same method cannot be used for unauthorizedly making use of other content, and further to provide a data generating method and a data generating device for generating this content.

A further object of the present invention is to provide a recording medium capable of specifying, from content whose content protection method has been broken and which is unauthorizedly circulating in a form that can be used by anyone, the unauthorized reproducing device that was able to break the content protection, and further to provide a data generating method and a data generating device for generating this content.

To solve the above problems, the present invention provides a recording medium having data recorded thereon, wherein the data is content data protected by transformation and by encryption using a content key, the transformation being an operation distinct from the encryption.

Further, the present invention provides the recording medium further having at least a program recorded thereon, wherein the program is for calculating a parameter required for restoring the content data.

Further, the present invention provides the recording medium, wherein the program enables only an authorized data processing device permitted to use the content data to calculate the parameter.

Further, the present invention provides the recording medium, wherein the parameter includes unique information of the data processing device.

Further, the present invention provides the recording medium, wherein the parameter includes information for distinguishing whether restoration processing is unique to the data processing device.

Further, the present invention provides the recording medium, wherein part or all of the parameter is recorded multiplexed with the content data.

Further, the present invention provides the recording medium, wherein the parameter recorded multiplexed with the content data includes information for specifying a data transformation portion.

Further, the present invention provides a data generating method for implementing operations on content data, including a step of implementing, on part or all of the content data, a transformation operation distinct from encryption using a content key.

Further, the present invention provides the data generating method, wherein the step of implementing the transformation operation includes a step of generating a program for a data processing device to calculate a parameter required for restoration processing before starting reproduction of the content data.

Further, the present invention provides the data generation method, wherein the step of implementing the transformation operation includes: a step of generating a program for a data processing device to calculate information about part of the parameter required for the restoration processing before starting reproduction of the content data; a step of generating restoration information data including information about the rest of the parameter required for the restoration processing; and a step of multiplexing the restoration information data with the content data.

Further, the present invention provides the data generating method, wherein the step of generating the program includes, into the program, information indicating whether to use information unique to the data processing device at the reproduction by the data processing device.

Further, the present invention provides the data generating method, wherein the step of generating the program includes, into the program, unique information of the data processing device that is not permitted to perform reproduction.

Further, the present invention provides the data generating method, wherein the step of implementing the transformation operation includes: a step of analyzing video information of the content data; and a step of specifying a position of data transformed, based on an analysis result of the video information.

Further, the present invention provides a data generating device for implementing operations on content data, including a unit operable to implement, on part or all of the content data, a transformation operation distinct from encryption using a content key.

Further, the present invention provides the data generating device further including: a unit operable to generate a program for a data processing device to calculate a parameter required for restoration processing before starting reproduction of the content data.

Further, the present invention provides the data generating device further including: a unit operable to generate a program for a data processing device to calculate information about part of the parameter required for the restoration processing before starting reproduction of the content data; a unit operable to generate restoration information data including information about the rest of the parameter required for the restoration processing; and a unit operable to multiplex the restoration information data with the content data.

As described above, the present invention has the effect of providing a recording medium on which content is protected from being reproduced unauthorizedly even when by some accident or incident the content key has been divulged and circulated among an unspecified large number of devices, and further to provide a data protection method, a data generating method, and a data generating device for generating this content.

Further, content can be generated from which, if its content protection has been broken and it is unauthorizedly circulating in a form that can be used by anyone, the reproducing device that was able to break its content protection can be specified.

4. Embodiment D: Content Reproducing Device

The following describes an embodiment for implementing the present invention, with reference to the drawings.

Figure 56:
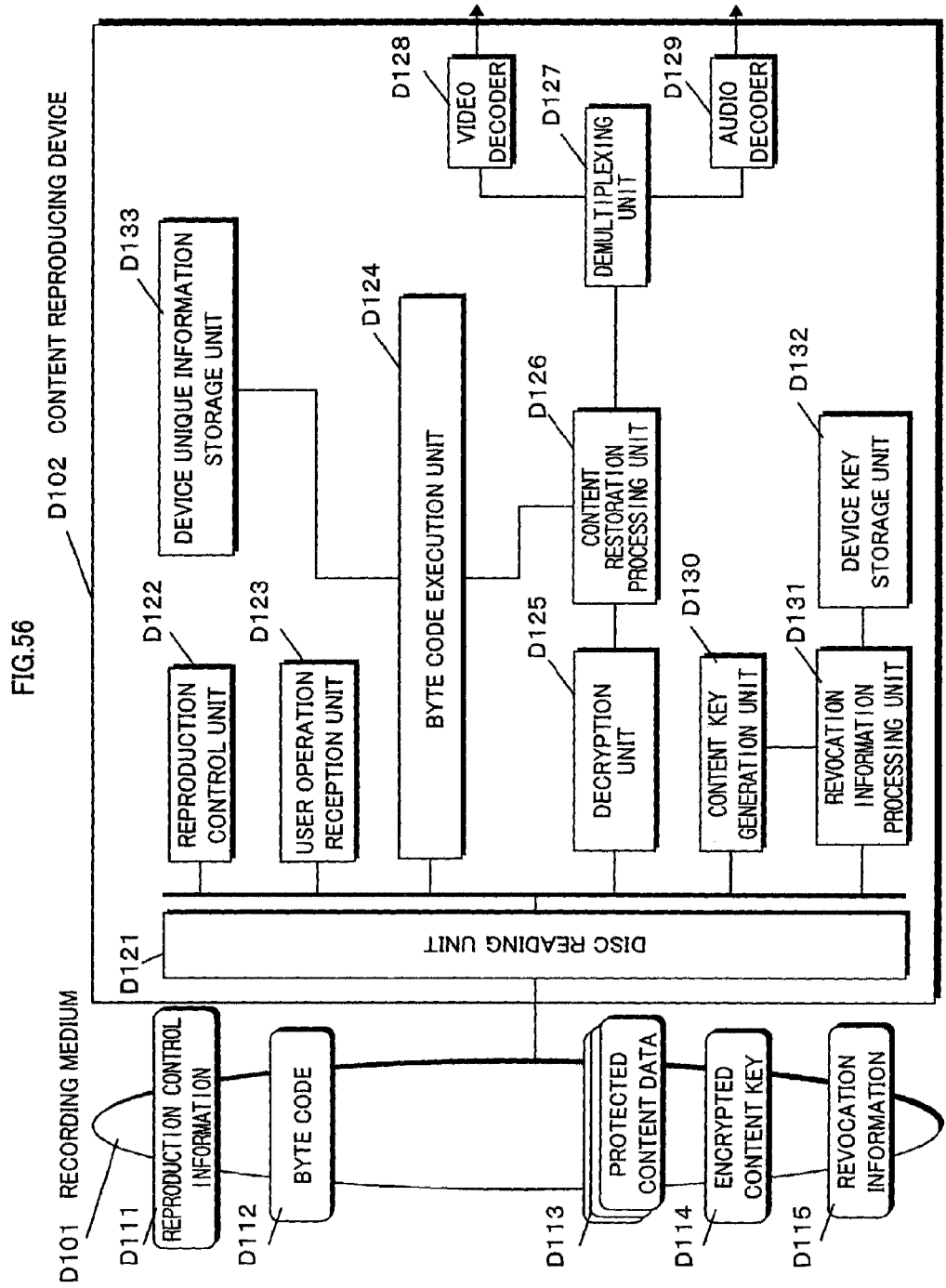
FIG. 56 shows a structure of a recording medium and a content reproducing device in an embodiment D of the present invention.

FIG. 56 shows a structure of a recording medium D101 and a content reproducing device D102 pertaining to one embodiment of the present invention.

Recorded on the recording medium D101 is a byte code D112, protected content data D113, an encrypted content key D114, and revocation information D115. While the recording medium D101 is assumed to be a BD (Blu-ray Disc) as one example here, it is not limited to being so.

In this embodiment, it is assumed that one set of content is composed of data of a plurality of MPEG 2 TSs (Motion Picture Expert Group 2 Transport Streams). It is reproduction control information D111 that stipulates the reproduction order of the protected content data D113 when the content is reproduced.

The byte code D112 is an execution code composed of an instruction set of a set length, such as a JAVA byte code. The byte code D112 may have been subject to processing such as obfuscation in order to prevent the secret information and processing content of the software from being ascertained by an act of analysis. In such a case, a byte code execution unit D124 has a function of removing processing such as obfuscation. Execution of the byte code D112 is described in detail later. Note that while an example of a JAVA byte code is given in this embodiment, an execution program other than JAVA may instead be used.

The protected content data D113 is plaintext MPEG 2 TS data that can be output as video by a decoder, and has been subject to encryption processing with a content key, and further to data transformation processing, for example an XOR operation with some value. For this reason, in order to reproduce the protected content data D113, in addition to decryption processing with the content key, it is necessary to subject the protected content data D113 to processing for reversing the transformation processing, and restore the protected content data D113 to plaintext MPEG 2 TS data.

The encrypted content key D114 is data of a content key that is for decrypting the protected content data and that has been encrypted with a media key. The media key is described later.

The following describes the revocation information D115. A key management organization has a collection of a plurality of device keys and a plurality of media keys. The key management organization assigns, to each content reproducing device D102, one device key and a key identification number of the device key, and gives the assigned device key and key identification number to the content reproducing device D102. Furthermore, the key management organization assigns one media key to the recording medium D101. Next, the key management organization encrypts the media key using each of the device keys assigned respectively to the content reproducing devices D102, thereby generating encrypted media keys, and creates a list of all of the encrypted media keys and the key identification numbers corresponding to the device keys. This list is the revocation information D115. Note that since a drawback of this simple method is that the data size of the revocation information D115 is unrealistically large when there is a large number of content reproducing devices D102, a method that compresses the data size of the revocation information D115 disclosed in "Key Management System for Digital Content Protection" (Nakano, Ohmori, and Tatebayashi, The 2001 Symposium on Cryptography and Information Security SCIS2001 5A-5, Jan. 2.001) may be used. However, the method is not limited to this method, and another method may be used to compress the data size of the revocation information D115.

The content reproducing device D102 is composed of a disc reading unit D121, a reproduction control unit D122, a user operation reception unit D123, a byte code execution unit D124, a decryption unit D125, a content restoration processing unit D126, a demultiplexing unit D127, a video decoder D128, an audio decoder D129, a content key generation unit D130, a revocation information processing unit D131, a device key storage unit D132, and a device unique information storage unit D133.

One example of implementation of the content reproducing device D102 is a computer system composed of a CPU, a work memory, a flash memory, a BD drive, and a remote control. Here, the disc reading unit D121 is the BD drive, the device key storage unit D132 and the device unique information storage unit D133 are the flash memory, the user operation reception unit D123 is the remote control, and the reproduction control unit D122, the byte code execution unit D124, the decryption unit D125, the content restoration processing unit D126, the demultiplexing unit D127, the video decoder D128, the audio decoder D129, the content key generation unit D130, and the revocation information processing unit D131 are software that operates using the CPU and the work memory as one example of a structure. However, these are not limited to being structured by software, and may be implemented in hardware or the like.

This completes the description of the structure of the recording medium and the content reproducing device of an embodiment of the present invention.

(Description of Content Reproduction Processing)

Figure 57:
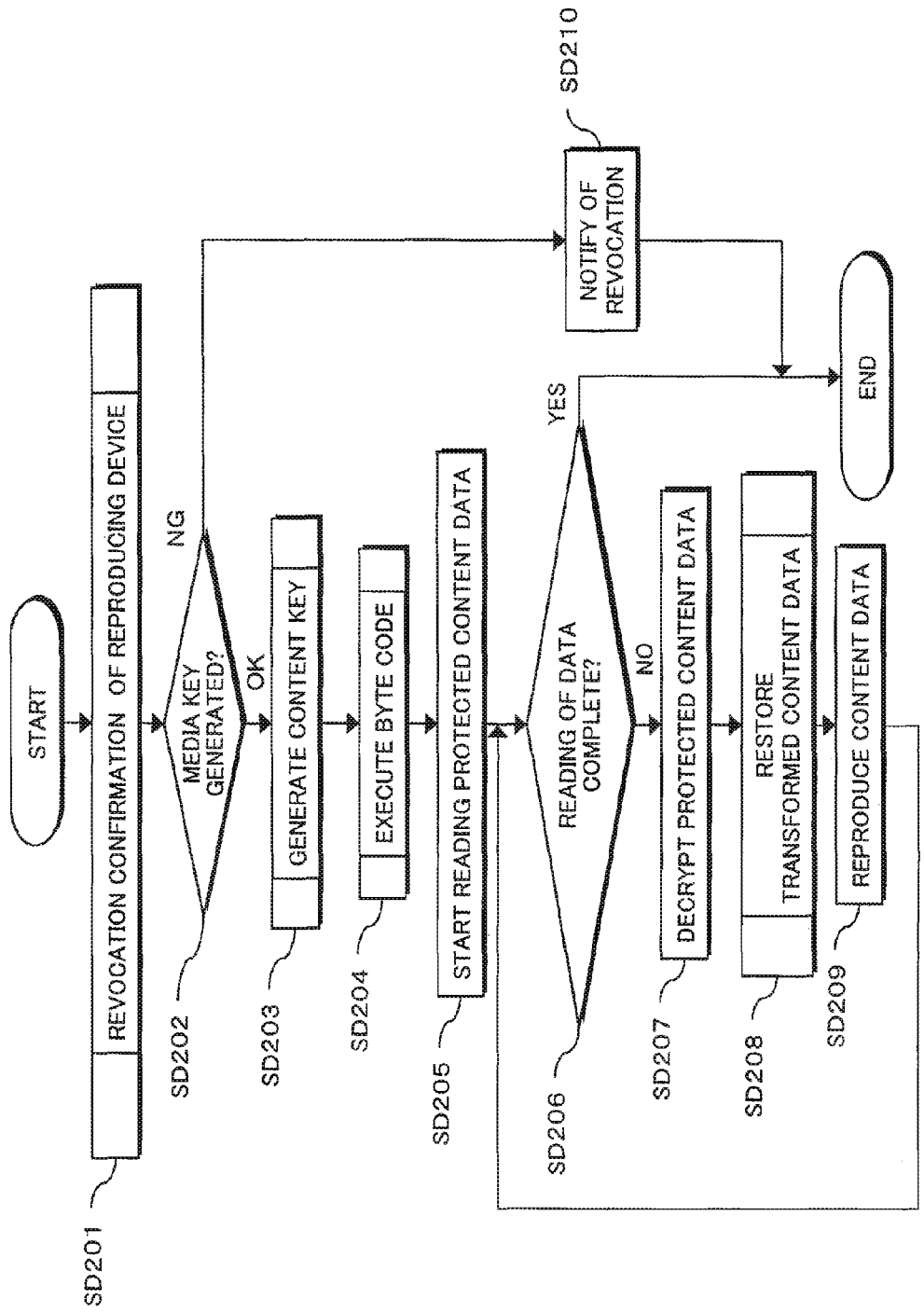
FIG. 57 is a flowchart showing content reproduction processing in the embodiment D of the present invention.

The following describes content reproduction processing, with use of FIG. 57.

First, the content reproduction processing starts upon the user operation reception unit D123 receiving a content reproduction start request from a user.

When the content reproduction request is received, the revocation information processing unit D131 performs revocation confirmation processing with respect to the content reproducing device D102 (step SD201). Details of the revocation confirmation processing are given later.

Subsequently, the processing branches depending on whether or not generation of the media key succeeds in the revocation confirmation processing at step SD201 (step SD202).

When the generation of the media key succeeds in the revocation confirmation processing at step SD201, the encrypted content key D114 is read from the recording medium D101, and a content key is generated (step SD203). Details of the content key generation are given later.

When the generation of the media key fails in the revocation confirmation processing at step SD201, the user is notified that the content reproducing device D102 is revoked, and the processing ends (step SD210).

After step SD203, in order to calculate data necessary for the restoration processing of the protected content data, the byte code D112 is read from the recording medium D101 and executed in the byte code execution unit D124 (step SD204). Details of the byte code execution are given later.

After step SD204, in order to reproduce the content requested by the user, the reproduction control unit D122 instructs to start reading the protected content data D113 that is the target of reproduction, in accordance with the reproduction control information D111 (step SD205).

The decryption unit D125 performs decryption processing as necessary with respect to the protected content data D113 read from the recording medium D101, with use of the content key generated by the content key generation unit D130 (step SD207). Hereinafter, the data obtained as a result of decrypting the protected content data D113 is called transformed content data. The protected content data is encrypted using AES (Advanced Encryption Standard), but is not limited to being so. Since decryption processing is performed repeatedly during content reproduction until the protected content data D113 ends, restoration of transformed content (step SD208) and reproduction of content data (step SD209) are executed in parallel.

Next, the content restoration processing unit D126 performs restoration processing on the transformed content data output from the decryption unit D125 (step SD208). During content reproduction, the restoration processing at step SD208 is executed in parallel with decryption processing of the protected content data D113 (step SD207) and reproduction of the content data (described later) (step SD209). Details of restoration processing of the transformed content data are given later.

The restored content data is plaintext MPEG 2 TS data, which is separated into a video stream and an audio stream in the demultiplexing unit D127, and the video stream and the audio stream are transmitted to the video decoder D128 and the audio decoder D129, respectively, and output to an audio/video device such as a television (step SD209). Decryption of the protected content data D113 (step SD207) and restoration of transformed content data (step SD208) are executed in parallel during content reproduction.

The processing ends when all the protected content data D113 corresponding to the content requested by the user has been read (step SD206).

This completes the description of the content reproduction processing.

(Revocation Confirmation Processing with Respect to the Content Reproducing Device D102)

Figure 58:
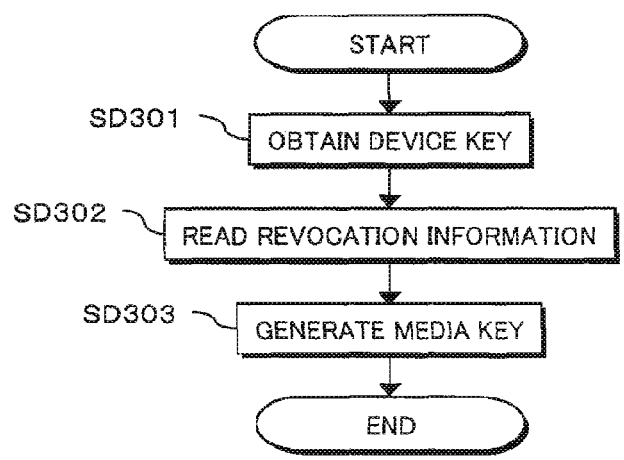
FIG. 58 is a flowchart showing revocation confirmation processing of the content reproducing device in the embodiment D of the present invention.

The following describes revocation confirmation processing with respect to the content reproducing device D102, with use of FIG. 58.

Revocation confirmation processing is processing for, before content reproduction, confirming according to the revocation information D115 recorded on the recording medium D101 that the content reproducing device D102 has not been revoked.

The revocation information processing unit D131 reads the device key obtained from the device key storage unit D132 (step SD301). The device key is information for specifying the content reproducing device D102, and is unique to each content reproducing device D102.

Next, the revocation information processing unit D131 reads the revocation information D115 recorded on the recording medium D101 (step SD302), and generates a media key using the read device key and the revocation information D115 (step SD303).

Note that in the case of the content reproducing device D102 being revoked, a media key is unable to be generated. Generation of the media key using the device key and the revocation information D115 is described in detail in "National Technical Report, Vol. 43, No. 3, p. 118-122" (Matsushita Techno Research, Jun. 18, 1997).

This completes the description of the revocation confirmation processing with respect to the content reproducing device D102.

(Content Key Generation Processing)

Figure 59:
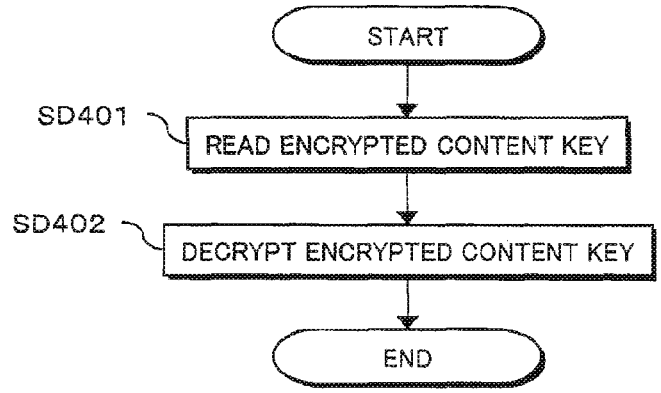
FIG. 59 is a flowchart showing content key generation processing in the embodiment D of the present invention.

The following describes the content key generation processing with use of FIG. 59.

The content key generation unit D130 obtains the media key generated at step SD201 from the revocation information processing unit D131 (step SD401). Next, the encrypted content key D114 is read from the recording medium D101, and decrypted with the media key obtained at step SD401 (step. SD402). Encryption and decryption of the content key are performed using AES, but are not limited to being so.

This completes the description of the content key generation processing.

(Byte Code Execution Processing)

Figure 60:
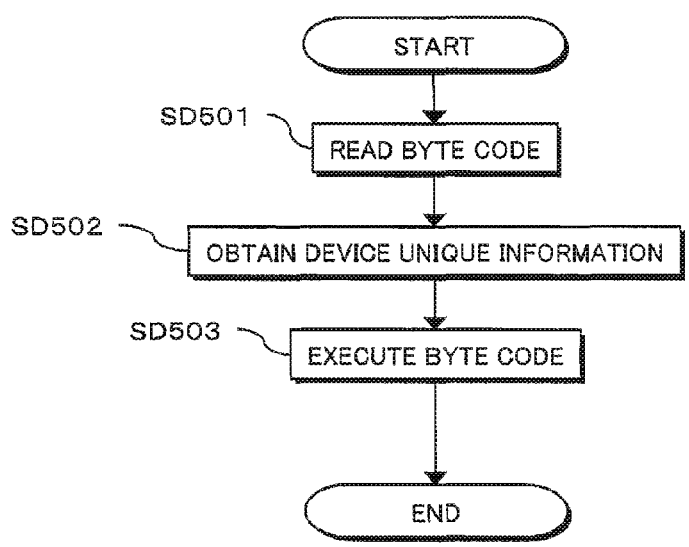
FIG. 60 is a flowchart showing byte code execution processing in the embodiment D of the present invention.

The following describes details of the byte code execution processing, with use of FIG. 60.

The byte code execution unit D124 reads the byte code D112 necessary for reproducing the specified content, from the recording medium D101 (step SD501).

Next, the byte code execution unit D124 obtains the device unique information necessary for the execution of the byte code, from the device unique information storage unit D133 (step SD502). The device unique information is information unique to each content reproducing device D102. The device unique information is composed of, for example, "device manufacturer ID+reproducing device model number+reproducing device manufacturing serial number", and assigned to each content reproducing device D102. That is, the content reproducing device D102 can be uniquely identified by the device unique information.

By executing the obtained byte code D112, the byte code execution unit D124 generates restoration setting information and transmits the restoration setting information to the content restoration processing unit D126 (step SD503). The restoration setting information is information necessary for the reverse operation of the transformation processing performed on the transformed content data. One example of the restoration setting information is shown in FIG. 62. the restoration setting information includes an operation mode D701, restoration operation processing D702, a restoration operation-use parameter specification D703, and device unique information D706. The operation mode D701 is information specifying an operation in the restoration processing of the transformed content data. The operation mode D701 is any of "device unique mode (0x00)" in which processing differs for each reproducing device using the device unique information D706, "content unique mode (0x01)" in which processing differs for each set of content recorded on the recording medium D101, "device unique mode+content unique mode (0x11)" that implements both the device unique mode and the content unique mode, and "non-transformation mode (0x00)" in which restoration processing is not performed. However, the operation mode D701 is not limited to these, as other modes may be defined and submitted to use. The restoration operation processing D702 is an operation method for restoring the content data, and uses "XOR operation (0x00)" and "DES (Data Encryption Standard) encryption (0x01)". However, the restoration operation processing D702 is not limited to these, as other operations such as ROT may be defined and submitted to use. The restoration operation-use parameter specification D703 specifies a parameter used for the restoration operation of the content data, and is made up of a head position D704 and a data length D705. Binary data that actually serves as a parameter is written in the restoration processing-use TS packet multiplexed in the protected content data. Data of the length specified by the data length D705, beginning with the data specified by the head position D704 from the start of the payload data of the restoration processing-use packet, is used as the parameter for the restoration processing. In detail, 4-byte data beginning with the 10th byte from the start of the payload of the restoration processing-use TS packet is used as the parameter.

The device unique information D706 is data used when the operation mode is "device unique mode" or "device unique mode+content unique mode", and is information unique to the content reproducing device D102. For example, the device unique information D706 may be the value stored in the device unique information storage unit D133, or may be a value newly generated by the byte code using the data stored in the device unique information storage unit D133.

Further, when executing the byte code in the content reproducing device D102 having particular device unique information, an operation of prohibiting generation of data necessary for the restoration processing of the protected content data may be implemented in the byte code. The content holder selects the byte code D112 recorded on the recording medium D101. Hence the content holder itself can prohibit content reproduction in the particular content reproducing device D102, independently of the revocation of the particular content reproducing device D102 by the revocation information D115.

This completes the description of the byte code execution processing.

(Restoration of Transformed Content Data)

Figure 61:
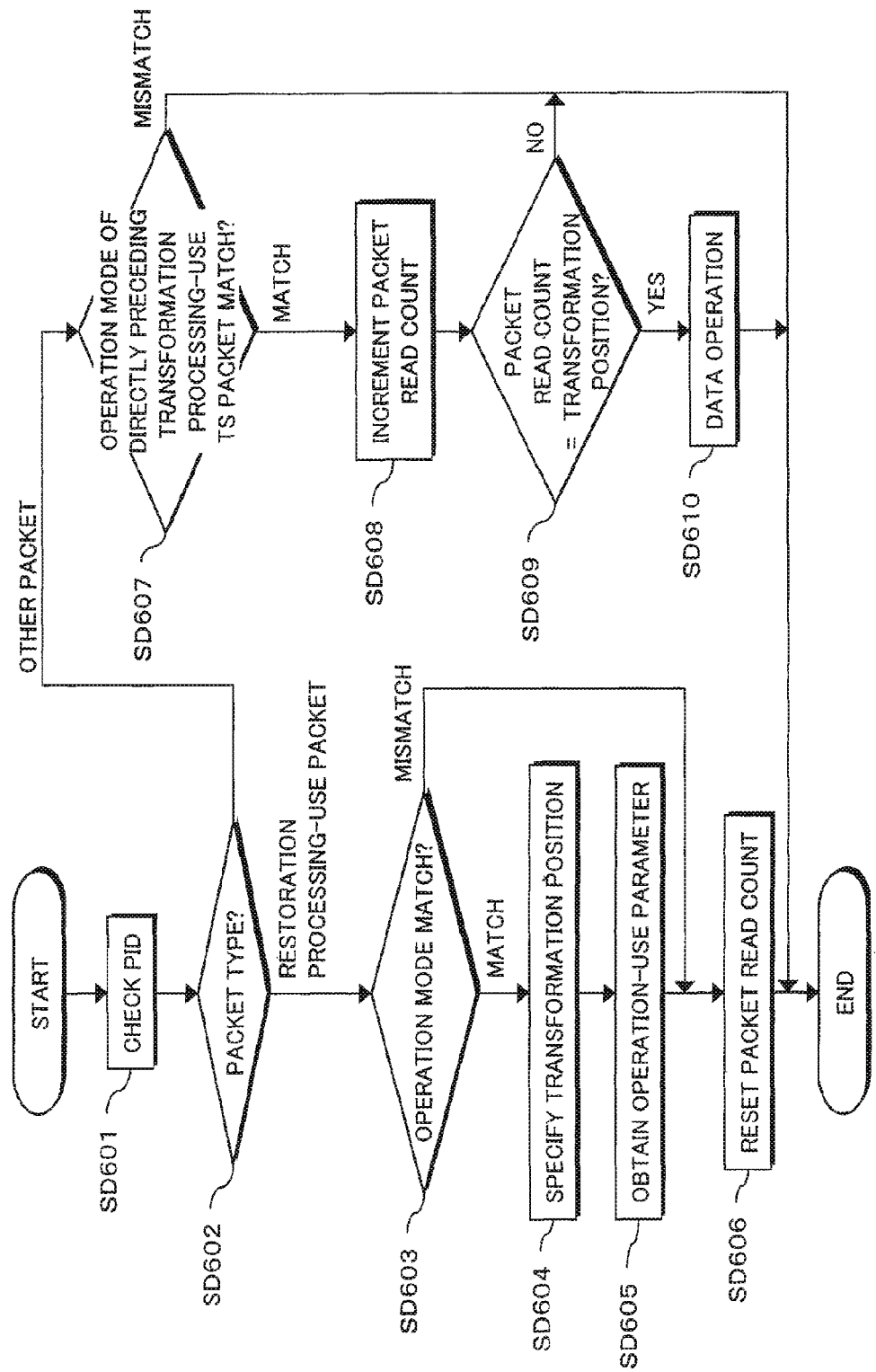
FIG. 61 is a flowchart showing restoration processing of transformed content data in the embodiment D of the present invention.

The following describes details of the restoration processing SD208 of the transformed content data in the content restoration processing unit D126, with use of FIG. 61.

Figure 63:
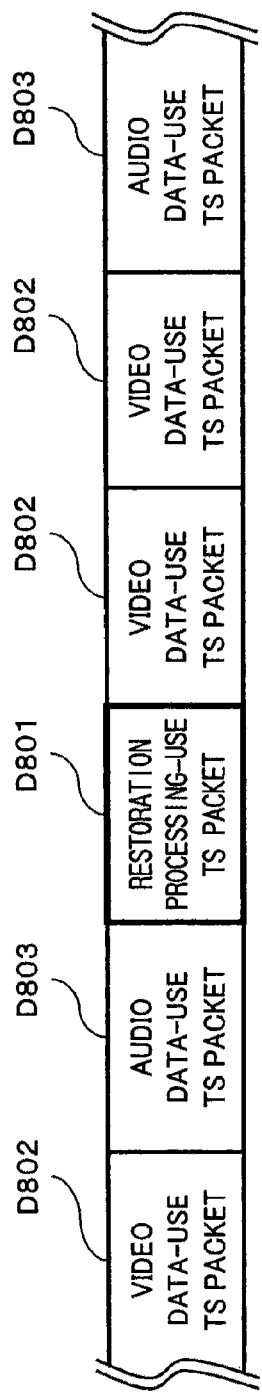
FIG. 63 shows a data structure example of transformed content data in the embodiment D of the present invention.

Transformed content data, which is the result of decrypting the protected content data D113 in the decryption unit D125, is input to the content restoration processing unit D126. FIG. 63 shows a structure of the transformed content data. The transformed content data complies with transport streams as stipulated in the MPEG 2 system, and is formed by multiplexing a restoration processing-use TS packet D801, video data-use TS packets D802, audio data-use TS packets D803, and the like. Transformation processing is applied to the payload of the video data-use TS packets, but is not limited to being so.

The content restoration processing unit D126 checks the PIDs of the TS packet headers of TS packets input from the decryption unit D125, in order to confirm the type of each TS packet (step SD601).

The content restoration processing unit D126 obtains the payload of the TS packet, when the input TS packet is a restoration processing-use TS packet.

The following describes a data structure of a restoration processing-use TS packet with use of FIG. 64.

The restoration processing-use TS packet is made up of a TS packet header D901 and a TS packet payload D902 which are stipulated as MPEG 2 system transport streams.

The TS packet payload D902 is composed of an operation mode D903, restoration operation processing D904, a transformation position D905, and a restoration operation-use parameter D908.

The operation mode D903 is information for specifying the operation in the restoration processing. The operation mode D903 is any of "device unique mode (0x00)" and "content unique mode (0x01)". However, these are not a limit for the present invention, as other modes may be defined and submitted to use.

The restoration operation processing D904 is an operation method for restoring the content data. The restoration operation processing D904 is any of "XOR operation (0x00)" and "DES encryption (0x01)". However, these are not a limit for the present invention, as other operations such as ROT may be defined and submitted to use.

The transformation position D905 is information for specifying the position where the data is transformed, and is composed of a packet D906 and an in-packet position D907. The data transformation position is specified by a relative position from the restoration processing-use TS packet, and indicates that a TS packet which matches the number written in the packet D906, counted from the next TS packet of the restoration processing-use TS packet D906, has been transformed. Further, the transformation position D905 indicates that transformation processing has been applied beginning with data corresponding to the byte count shown in the in-packet position D907, from the head of the TS packet payload of that TS packet. In detail, in FIG. 64A, transformation processing has been applied to data beginning with the 100th (0x64) byte from the head of the TS packet payload of the second TS packet from the next packet of the restoration processing-use TS packet. The restoration operation-use parameter D908 is binary data that serves as the parameter used in the data restoration processing.

There are two types of restoration processing-use TS packet D801, namely, the device unique mode (FIG. 64A) and the content unique mode (FIG. 64B). Though they have the same data structure, the restoration processing-use TS packet D801 of the device unique mode (FIG. 64A) does not need the restoration operation processing D904 and the restoration operation-use parameter D908, so that 0 is embedded in these data. Although 0 is embedded in these data in the present embodiment, another value may be written instead.

Returning to FIG. 61, after step SD602, the content restoration processing unit D126 checks whether the restoration setting information obtained from the byte code execution unit D124 beforehand matches the operation mode of the restoration processing-use TS packet (step SD603). A specific matching criterion is shown in a table of FIG. 65. As one example, when the value of the operation mode D701 of the restoration setting information obtained from the byte code execution unit D124 shows the content unique mode (0x01), the content restoration processing unit D126 judges a match for a TS packet written with the content unique mode (0x01), and a mismatch for a TS packet written with the device unique mode (0x10).

If the operation modes match in step SD603, the data transformation position is specified using the transformation position D905 in the restoration processing-use TS packet (step SD604).

Next, the operation-use parameter is determined from the restoration operation-use parameter D908 in the restoration processing-use TS packet and the restoration operation-use parameter specification D703 in the restoration setting information obtained from the byte code execution unit D124 beforehand, and the determined operation-use parameter is acquired (step SD605).

The content restoration processing unit D126 resets a packet read count that is an internal variable held by the content restoration processing unit D126, in order to specify the data transformation position in the succeeding TS packets (step SD606), and ends the processing.

When the packet type is other than a restoration processing-use packet at step SD602, the content restoration processing unit D126 checks whether the operation mode of the last read restoration processing-us TS packet matches the restoration setting information obtained from the byte code execution unit D124 beforehand (step SD607).

When the result of step SD607 is a match, the content restoration processing unit D126 increments the packet read count (step SD608), and checks whether or not the packet read count and the transformation position match (step SD609).

When the packet read count and the transformation position match, the content restoration processing unit D126 specifies the transformed data based on the in-packet position D907 specified at step SD604, performs a data operation using the restoration setting information obtained from the byte code execution unit D124 before hand and the parameter acquired at step SD605 (step SD610), and ends the processing.

This completes the description of the transformed content data restoration processing of step SD208 by the content restoration processing unit D126.

Note that in the present embodiment the specification of the transformed data restoration processing is obtained as the execution result of the byte code D112, but the specification may be written in the restoration processing-use TS packet.

Also, the present embodiment describes the case where the restoration operation-use parameter specification D703, which is the information for specifying the parameter used for the restoration processing, is obtained as the execution result of the byte code D112. Alternatively, the restoration operation-use parameter specification may be written in the restoration processing-use TS packet.

Also, the resent embodiment describes the case where the content restoration processing unit D126 performs the restoration processing in accordance with the operation mode D701 in the restoration setting information which is the execution result of the byte code D112. Alternatively, the restoration processing may be performed in accordance with only the operation mode D903 in the restoration processing-use TS packet multiplexed in the transformed content data, without using the operation mode D701 specified by the restoration setting information.

Also, the present embodiment describes the case where, in the restoration processing TS packet, the transformation position D905 of the content data is specified using the packet D906 showing the relative position from the restoration processing-use TS packet and the in-packet position D907 showing the data position within that packet. However, other information may instead be used so long as it can specify the transformation position of the content data, such as the byte count from the head of the transformed content data.

(Conclusion)

In recent years, accompanying increases in capacity of storage media, systems have become widespread in which content that is a work such as a movie is digitized, and stored and distributed on a medium such as a digital optical disc. In such a system, it is necessary to protect the copyright of the content and to enable reproduction, copying, and the like of the content to be performed only under restrictions that comply with an agreement with the copyright holder. A general system for protecting works from being unauthorizedly copied by a party without the permission of the copyright holder has a structure in which digital content is encrypted with a content key managed by the copyright holder, recorded on a disc, and is only able to be decrypted by a terminal that has a corresponding content key. Furthermore, regulations regarding copyright protection established with the copyright holder must be followed in order to obtain the content key.

As one example of such a system, Japanese Patent Application Publication No. 2000-100069 discloses a method by which the content key for encrypting and decrypting content data is generated based on a function of a seed key and time variable data.

In this case, it is necessary to manage the content key strictly so that it is not exposed. However, it is possible that the content key will be exposed to an unauthorized party due so some kind of accident or occurrence. Once the content key has been exposed to an unauthorized party, there is a risk that the content key of subsequent content will be exposed using the same method. It is expected that this will lead to subsequent unauthorized use of content being unable to be prevented. With a conventional technique, since the content data is protected only by the content key that is protected according to a stipulated method, it is susceptible to this kind of attack.

In view of the aforementioned problem, the present invention has an object of providing a recording medium, a data processing method, and a data processing device that protect content so that even if a way to crack content protection is discovered according to some kind of accident or occurrence, other content is unable to be used unauthorizedly with the same method.

Furthermore, the present invention has an object of providing a recording medium, a data processing method, and a data processing device that enable specification of an unauthorized reproducing device that was able to crack content protection, based on content whose protection method has been cracked and is being unauthorizedly distributed in a format usable by anyone.

In order to solve the aforementioned problem, the present invention provides a recording medium on which content data is recorded, wherein the content data is protected by encryption with a content key, and data transformation according to an operation that is different to the encryption. Furthermore, the present invention provides the recording medium, wherein in addition to the content data, the content key and a program for calculating a parameter necessary for restoration of the content data are recorded on the recording medium.

Moreover, the present invention provides the recording medium, wherein the program enables the calculation of the parameter only by an authorized data processing device that is permitted to use the content data. Moreover, the present invention provides the recording medium, wherein the parameter includes terminal unique information. Moreover, the present invention provides the recording medium, wherein the parameter includes information for distinguishing whether restoration processing is unique to the content or is unique to a data processing device.

Furthermore, the present invention provides a recording medium on which content data is recorded, wherein the content data is protected by encryption with a content key, and data transformation according to an operation that is different to the encryption, and part or all of the parameter is recorded multiplexed with the content data. Moreover, the present invention provides the recording medium, wherein the part or all of the parameter that is recorded multiplexed with the content data includes information that specifies a data transformation position.

Moreover, the present invention provides a data processing method for reproducing content data that is recorded on a recording medium, the content data being protected by encryption with a content key, and data transformation according to an operation that is different to the encryption, the data processing method including: a step of decrypting with the content key; and a step of performing restoration of the content data.

Moreover, the present invention provides the data processing method, wherein the step of performing restoration of the content data includes: a step of, before reproduction commences, calculating a parameter necessary for restoration processing; and a step of, during reproduction, performing the restoration processing of the content data using the parameter, the steps being separate. Moreover, the present invention provides the data processing method, wherein in the step of performing parameter calculation, device unique information is used.

Furthermore, the present invention provides the data processing method, wherein in the step of performing the restoration processing of the content data, device unique information is used.

Furthermore, the present invention provides the data processing method, wherein in the step of performing the restoration processing of the content data, content unique information is used.

Furthermore, the present invention provides the data processing method, wherein the step of performing restoration of the content data during reproduction performs the restoration processing in accordance with restoration processing-use data that is multiplexed with the content data. Moreover, the present invention provides the data processing method wherein the step of performing restoration of the content data during reproduction specifies the data transformation position according to the restoration processing-use data, and performs restoration processing.

Furthermore, the present invention provides a data processing device for reproducing content data that is recorded on a recording medium, the content data being protected by encryption with a content key, and data transformation according to an operation that is different to the encryption, the data processing device including: an information reading unit operable to read information from the recording medium; a unit operable to decrypt with the content key; a unit operable to store terminal unique information; a unit operable to execute a program for calculating a parameter necessary for restoration of the content data; a unit operable to perform restoration processing of the content data using the calculated information necessary for restoration; and a decoding unit operable to decode the content data.

As has been described, the present invention has the effect of being able to provide a recording medium, a data protection method, a data processing method, and a data processing device by which content is protected such that the content is not reproduced unauthorizedly, even if the content key is leaked due to some kind of accident or occurrence, and circulated among the general public.

Furthermore, the present invention enables specification of an unauthorized reproducing device that was able to crack content protection, based on content whose protection method has been cracked and is being unauthorizedly distributed in a format usable by anyone.

5. General Overview

Each embodiment of the present invention has been described above. The following gives a general overview of the present invention by focusing on the embodiments A1 and B1 which are particularly representative of the above embodiments.

Although the terms used in the embodiments A1 and B1 are somewhat different, the byte code processing unit, the decryption unit, the restoration processing unit, the stream decryption unit, the demultiplexer, the byte code data, the encrypted content file, the transformed content file, the terminal ID, and the terminal ID reference in the embodiment A1 respectively correspond to and are substantially equivalent to the byte code execution unit, the content restoration processing unit, the demultiplexing unit, the byte code, the protected content data, the transformed content data, the device unique information, and the device unique information embedment in the embodiment B1. Also, the decoding unit in the embodiment A1 corresponds to the video decoder and the audio decoder in the embodiment B1.

(Summary)

FIG. 28 shows a structure of a recording medium B101 and a content reproducing device B102 pertaining to one embodiment of the present invention.

Recorded on the recording medium B101 is the byte code B112 and the protected content data B113.

The protected content data B113 is plaintext MPEG 2 TS data that can be output as video by a decoder, and has been subject to encryption processing with a content key, and further to data transformation processing, for example part of the data being substituted with a different value.

Hereinafter, the data obtained as a result of decrypting the protected content data B113 is called transformed content data.

FIG. 34 shows an example of transformed content data.

The transformed content data complies with transport streams as stipulated in the MPEG 2 system, and has the restoration processing-use TS packet B701, the video data-use TS packets B702, the audio data-use TS packets B703 and the like multiplexed therewith.

The following describes a data structure of the restoration processing-use TS packet. A PMT stipulated in the MPEG 2 system is used as the restoration processing-use TS packet. Specifically, a restoration instruction descriptor is written at the head of a descriptor first loop in a PMT section. The restoration instruction descriptor includes restoration information.

The restoration information and the byte code data are described below. The restoration information and the byte code data are used at the content reproducing device for reversing the transformation processing. The byte code data is, for example, the type of code executable in a virtual operation unit, such as a JAVA virtual machine, and is the data describing a code executable at the content reproducing device.

The restoration information includes a secret parameter identifying value, a restoration instruction flag, a terminal unique information reference position, a relative packet count, an in-packet position, a byte size of restoration target data, and a restoration-use parameter.

The following describes the data structuring the restoration information. The restoration instruction flag is a flag that shows whether or not to perform restoration using this restoration processing-use packet, the possible values thereof having the meanings shown in FIG. 37. The restoration instruction flag may be omitted. In the case of the restoration instruction flag instructing "10 (device unique information embedment)", the device unique information reference position shows a bit position to be referenced in the device unique information. The relative packet count and the in-packet position are information for specifying where the data is transformed, the position where the data is transformed being shown as a relative position to the restoration processing-use TS packet. The in-packet position shows that a transformed TS packet is located, counting from the next TS packet after the restoration processing-use TS packet, the number of packets listed in the relative packet count. The in-packet position additionally shows that transformation processing has been applied to data, the head of which is the number of bytes shown by the in-packet position from the head of the TS packet payload of the TS packet. The byte size of restoration target data shows the number of bytes of the transformed data. The restoration-use parameter is data used in restoring the transformed data.

The restoration information is encrypted according to AES using a secret parameter. Note that the restoration information, excluding the secret parameter identifying value, may be encrypted using a method other than AES, such as dividing the restoration information into secret parameter units and finding an XOR of each with the secret parameter. The secret parameter is an encryption key of the restoration information and is held by the byte code.

An example of the operation of a reproducing terminal is described with reference to FIG. 11, which shows its main parts. The reproducing terminal A1101 reads the byte code data A1103 from the recording medium A205. In the reproducing terminal A1101, in preparation for reproduction, the byte code processing unit A1110 then analyzes the byte code data A1103, acquires the secret parameters, and transmits the secret parameters together with the terminal ID to the restoration processing unit A1106.

Subsequently, at reproduction, the reproducing terminal A1101 reads the encrypted contents file A1102. The decryption unit A1104 decrypts the encrypted content file and outputs the resultant decrypted content file A1102 to the transformation processing-use packet extraction unit A1105 as the transformed content. Upon detection of the transformation processing-use packets, the transformation processing-use packet extraction unit A1105 outputs the transformation processing-use packets and the remaining transformed content to the restoration processing unit A1106. The restoration processing unit A1106 decrypts the piece of restoration information 501 in each of the transformation processing-use packets, via an XOR operation or the like using a corresponding secret parameter, and carries out the following restoration processing on the basis of each decrypted piece of restoration information A501.

When the restoration instruction flag indicates that restoration is performed, or alternatively, when the restoration instruction flag indicates terminal ID reference and a part of the value of the terminal ID specified by the terminal ID reference position is 1, the restoration processing unit A1106 implements restoration processing. It achieves this by specifying the starting position of the restoration target data in the transformed content on the basis of the relative packet count and the in-packet position, and by overwriting (replacing), with the restoration-use parameter, a same number of bytes as indicated by the restoration target data byte size.

Subsequently, the restoration processing unit A1106 outputs the restored content to the demultiplexer A1107, and the demultiplexer 1107 converts the content information, which includes video and audio data, into a format that can be processed by the decoding unit A1109. The demultiplexer A1107 outputs the converted content information to the video buffer A1108, and the decoding unit A1109 carries out the processing associated with reproduction and output of the content.

Effects Of The Invention

The present invention makes it possible to include information that changes depending on device unique information, into content at the time of reproduction. In so doing, it is possible to specify a reproducing terminal that took an unauthorized copy or unauthorizedly distributed the content.

Also, the process of decrypting (restoring) the encrypted (transformed) content and the process of including the device unique information into the content at the time of reproduction can be performed by substantially the same operation (overwriting with the restoration-use parameter at the position specified by the restoration information).

Conventionally, the device unique information is embedded after the content decryption process. Accordingly, the data which has been decrypted and not embedded with the device unique information can be extracted between the content decryption process and the device unique information embedment process. The data in this state is viewable since it has already been decrypted. Also, since no device unique information has been embedded yet, even if the data is distributed by unauthorized means, it is impossible to specify the distributor. Such data is extremely advantageous for an unauthorized party.

In view of this, the present invention makes it possible to perform the content decryption and the device unique key embedment by substantially the same process. Both the decryption and the device unique information embedment can be completed in one process, so that the above unauthorized act of extracting the data between the two processes can be suppressed.

Also, according to the present invention, these two processes can be switched as needed and are substantially equivalent to each other. Hence it is difficult to distinguish whether the output data is the decrypted data or the data embedded with the device unique information. Accordingly, an unauthorized party can be prevented from distinguishing and collecting only data in which no device unique information is embedded.

6. Other Modifications

The present invention has been described based on, but is not limited to, the above embodiments. Cases such as the following are included in the present invention.

(1) Each described device is, specifically, a computer system composed of a microprocessor, a ROM, a RAM, a hard disk unit, a display unit, a keyboard, a mouse, and the like. Computer programs are stored in the RAM or the hard disk unit. Each device achieves predetermined functions by the microprocessor operating according to the computer programs. Each computer program is composed of a plurality of command codes that show instructions with respect to the computer, for achieving the predetermined functions.

(2) All or part of the compositional elements of each device may be composed from one system LSI (Large Scale Integrated circuit). The system LSI is a super-multifunctional LSI on which a plurality of compositional units are manufactured integrated on one chip, and is specifically a computer system that includes a microprocessor, a ROM, a RAM, and the like. Computer programs are stored in the RAM. The system LSI achieves its functions by the microprocessor operating according to the computer programs.

(3) Part or all of the compositional elements of each device may be composed of a removable IC card or a single module. The IC card or the module is a computer system composed of a microprocessor, a ROM, a RAM, and the like. The IC card or the module may include the aforementioned super-multi-functional LSI. The IC card or the module may achieve its functions by the microprocessor operating according to computer programs. The IC card or the module may be tamper-resistant.

(4) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded in any of the aforementioned recording media.

Furthermore, the present invention may be the computer program or the digital signal transmitted on a network such as an electric communication network, a wireless or wired communication network, or an internet, or via data broadcasting and the like.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(5) The present invention is a recording medium having data recorded thereon, wherein the data is content data protected by data transformation and by encryption using a content key, the data transformation being an operation distinct from the encryption.

(6) The present invention is the recording medium of the above (5), further having at least a program recorded thereon, wherein the program is for calculating a parameter required for restoring the content data.

(7) The present invention is the recording medium of the above (5), further having restoration information recorded thereon, wherein the restoration information is required for restoring the content data, and is multiplexed with the content data.

(8) The present invention is the recording medium of the above (5), further having restoration information recorded thereon, wherein the restoration information is required for restoring the content data, and is recorded as a different file from the content data.

(9) The present invention is the recording medium of the above (5), further having restoration information recorded thereon, wherein the restoration information is required for restoring the content data, and is both multiplexed with the content data and recorded as a different file from the content data.

(10) The present invention is the recording medium of any of the above (7) to (9), wherein part or all of the restoration information is encrypted using the parameter.

(11) The present invention is a data generating method for implementing operations on content data, including a step of implementing, on part or all of the content data, a transformation operation distinct from encryption using a content key.

(12) The present invention is the data generating method of the above (11), further including a step of generating a program for a data processing device to calculate a parameter required for restoring the content data.

(13) The present invention is the data generating method of the above (11), further including the steps of: generating a program for a data processing device to calculate a parameter required for restoration processing of the content data; generating restoration information required for the restoration processing; encrypting the restoration information using the parameter; and multiplexing the encrypted restoration information with the content data.

(14) The present invention is the data generating method of the above (11), further including the steps of: generating a program for a data processing device to calculate a parameter required for restoration processing of the content data; generating restoration information required for the restoration processing; encrypting the restoration information using the parameter; and generating the encrypted restoration information as a different file from the content data.

(15) The present invention is the data generating method of the above (11), further including the steps of: generating a program for a data processing device to calculate a parameter required for restoration processing of the content data; generating restoration information required for the restoration processing; encrypting the restoration information using the parameter; multiplexing the encrypted restoration information with the content data; and generating the encrypted restoration information as a different file from the content data.

(16) Also, the present invention is a data generating device for implementing operations on content data, including at least a unit operable to implement, on part or all of the content data, a transformation operation distinct from encryption using a content key.

(17) The present invention is the data generating device of the above (16), further including: a unit operable to generate a program to calculate a parameter required for restoration processing of the content data; a unit operable to generate restoration information required for the restoration processing; a unit operable to encrypt the restoration information using the parameter; and a unit operable to multiplex the encrypted restoration information with the content data.

(18) The present invention is the data generating device of the above (16), further including: a unit-operable to generate a program to calculate a parameter required for restoration processing of the content data; a unit operable to generate restoration information required for the restoration processing; a unit operable to encrypt the restoration information using the parameter; and a unit operable to generate the encrypted restoration information as a different file from the content data.

(19) The present invention is the data generating device of the above (16), further including: a unit operable to generate a program to calculate a parameter required for restoration processing of the content data; a unit operable to generate restoration information required for the restoration processing; a unit operable to encrypt the restoration information using the parameter; a unit operable to multiplex the encrypted restoration information with the content data; and a unit operable to multiplex the encrypted restoration information as a different file from the content data.

(20) The present invention is a program causing a computer to execute the one or more steps included in the data generating method of any of the above (11) to (15).

(21) The present invention is a computer readable recording medium having recorded thereon a program for causing a computer to execute the one or more steps in the data generating method of any of the above (11) to (15).

(22) The present invention is a recording medium on which content data is recorded, wherein the content data is protected by encryption with a content key, and data transformation according to an operation that is different to the encryption.

(23) The present invention is the recording medium of the above (22), wherein in addition to the content data, the content key and a program for calculating a parameter necessary for restoration of the content data are recorded on the recording medium.

(24) The present invention is the recording medium of the above (23), wherein the program enables calculation of the parameter only by an authorized data processing device that is permitted to use the content data.

(25) The present invention is the recording medium of the above (23), wherein the parameter includes terminal unique information.

(26) The present invention is the recording medium of the above (23), wherein the parameter includes information for distinguishing whether restoration processing is unique to the content or unique to a data processing device.

(27) The present invention is the recording medium of the above (23), wherein part or all of the parameter is recorded multiplexed with the content data.

(28) The present invention is the recording medium of the above (27), wherein the part or all of the parameter that is recorded multiplexed with the content data includes information that specifies a data transformation position.

(29) The present invention is the recording medium of the above (23), wherein part or all of the parameter is recorded as a file that is separate to the content data.

(30) The present invention is the recording medium of the above (29), wherein the part or all of the parameter that is recorded multiplexed with the content data includes information that specifies a data transformation position.

(31) The present invention is the recording medium of the above (23), wherein the recording medium had recorded thereon both a file that includes part or all of the parameter and is separate from the content data, and a file that includes part or all of the parameter and is multiplexed with the content data.

(32) The present invention is a data processing method for reproducing content data that is recorded on a recording medium, the content data being protected by encryption with a content key, and data transformation according to an operation that is different to the encryption, the data processing method comprising: a step of decrypting with the content key; and a step of performing restoration of the content data.

(33) The present invention is the data processing method of the above (32), wherein the step of performing restoration of the content data includes: a step of, before reproduction commences, calculating a parameter necessary for restoration processing; and a step of, during reproduction, performing the restoration processing of the content data using the parameter, the steps being separate.

(34) The present invention is the data processing method of the above (33), wherein in the step of performing parameter calculation, device unique information is used.

(35) The present invention is the data processing method of the above (33), wherein in the step of performing the restoration processing of the content data, device unique information is used.

(36) The present invention is the data processing method of the above (33), wherein in the step of performing the restoration processing of the content data, content unique information is used.

(37) The present invention is the data processing method of the above (33), wherein the step of performing restoration of the content data during reproduction performs the restoration processing in accordance with restoration processing-use data that is multiplexed with the content data.

(38) The present invention is the data processing method of the above (33), wherein the step of performing restoration of the content data during reproduction performs the restoration processing in accordance with restoration processing-use data that is recorded as a separate file to the content data.

(39) The present invention is a data processing device for reproducing content data that is recorded on a recording medium, the content data being protected by encryption with a content key, and data transformation according to an operation that is different to the encryption, the data processing device comprising: an information reading unit operable to read information from the recording medium; a unit operable to decrypt with the content key; a unit operable to store terminal unique information; a unit operable to execute a program for calculating a parameter necessary for restoration of the content data; a unit operable to perform restoration processing of the content data using the calculated information necessary for restoration; and a decoding unit operable to decode the content data.

(40) The present invention is a program that enables a computer to execute the steps included in the data processing method of any of the above (32) to (38).

(41) The present invention is a computer-readable recording medium having recorded thereon a program that enables a computer to execute the steps included in the data processing method of any of the above (32) to (38).

(42) The present invention is a recording medium having data recorded thereon, wherein the data is content data protected by data transformation and by encryption using a content key, the data transformation being an operation distinct from the encryption.

(43) The present invention is the recording medium of the above (42), further having at least a program recorded thereon, wherein the program is for calculating a parameter required for restoring the content data.

(44) The present invention is the recording medium of the above (43), wherein the program enables calculation of the parameter only by an authorized data processing device that is permitted to use the content data.

(45) The present invention is the recording medium of the above (43), wherein the parameter includes unique information of a data processing device.

(46) The present invention is the recording medium of the above (43), wherein the parameter includes information for distinguishing whether restoration processing is unique to the data processing device.

(47) The present invention is the recording medium of the above (43), wherein part or all of the parameter is recorded multiplexed with the content data.

(48) The present invention is the recording medium of the above (47), wherein the part or all of the parameter that is recorded multiplexed with the content data includes information that specifies a data transformation position.

(49) The present invention is a data generating method for implementing operations on content data, including a step of implementing, on part or all of the content data, a transformation operation distinct from encryption using a content key.

(50) The present invention is the data generating method of the above (49), wherein the step of performing transformation of the content data includes: a step of, before commencing reproduction of the content data, a data processing device generating a program for calculating a parameter necessary for restoration processing.

(51) The present invention is the data generating method of the above (49), wherein the step of performing transformation of the content data includes: a step of, before commencing reproduction of the content data, the data processing device generating a program for calculating information about part of a parameter necessary for restoration processing; a step of generating restoration information data including information about the rest of the parameter necessary for the restoration processing; and a step of multiplexing the restoration information data with the content data.

(52) The present invention is the data generating method of the above (51), wherein the step of generating the program includes, into the program, information showing whether unique information of the data processing device is used in the reproduction by the data processing device.

(53) The present invention is the data generating method of any of the above (50) to (52), wherein the step of generating the program includes, into the program, unique information of the data processing device not permitted to perform reproduction.

(54) The present invention is the data generating method of the above (49), wherein the step of performing transformation of the content data includes: a step of analyzing video information of the content data; and a step of specifying a position of data to be transformed based on a result of analyzing the video information.

(55) The present invention is a data generating device for implementing operations on content data, including a unit operable to implement, on part or all of the content data, a transformation operation distinct from encryption using a content key.

(56) The present invention is the data generating device of the above (14), further including: a unit operable to; before commencing reproduction of the con-tent data, a data processing device generating a program for calculating a parameter necessary for restoration processing.

(57) The present invention is the data generating device of the above (55), further including: a unit operable to, before commencing reproduction of the content data, a data processing device generating a program for calculating a parameter required for restoration processing of the content data; a unit operable to generate restoration information data including information about the rest of the parameter required for the restoration processing; and a unit operable to multiplex the restoration information data with the content data.

(58) The present invention is a program that enables a computer to execute the steps included in the data processing method of any of the above (49) to (54).

(59) The present invention is a computer-readable recording medium having recorded thereon a program that enables a computer to execute the steps included in the data processing method of any of the above (49) to (54).

(60) The present invention is a recording medium on which content data is recorded, wherein the content data is protected by encryption with a content key, and data transformation according to an operation that is different to the encryption.

(61) The present invention is the recording medium of the above (60), wherein in addition to the content data, the content key and a program for calculating a parameter necessary for restoration of the content data are recorded on the recording medium.

(62) The present invention is the recording medium of the above (61), wherein the program enables calculation of the parameter only by an authorized data processing device that is permitted to use the content data.

(63) The present invention is the recording medium of the above (61), wherein the parameter includes terminal unique information.

(64) The present invention is the recording medium of the above (61), wherein the parameter includes information for distinguishing whether restoration processing is unique to the content or unique to a data processing device.

(65) The present invention is the recording medium of the above (61), wherein part or all of the parameter is recorded multiplexed with the content data.

(66) The present invention is the recording medium of the above (65), wherein the parameter that is recorded multiplexed with the content data includes information that specifies a data transformation position.

(67) The present invention is a data processing method for reproducing content data that is recorded on a recording medium, the content data being protected by encryption with a content key, and data transformation according to an operation that is different to the encryption, the data processing method comprising: a step of decrypting with the content key; and a step of performing restoration of the content data.

(68) The present invention is the data processing method of the above (67), wherein the step of performing restoration of the content data includes: a step of, before reproduction commences, calculating a parameter necessary for restoration processing; and a step of, during reproduction, performing the restoration processing of the content data using the parameter, the steps being separate.

(69) The present invention is the data processing method of the above (68), wherein in the step of performing parameter calculation, device unique information is used.

(70) The present invention is the data processing method of the above (67), wherein in the step of performing the restoration processing of the content data, device unique information is used.

(71) The present invention is the data processing method of the above (68), wherein in the step of performing the restoration processing of the content data, content unique information is used.

(72) The present invention is the data processing method of the above (68), wherein the step of performing restoration of the content data during reproduction performs the restoration processing in accordance with restoration processing-use data that is multiplexed with the content data.

(73) The present invention is the data processing method of the above (72), wherein the step of performing restoration of the content data during reproduction specifies a data transformation position in accordance with restoration processing-use data that is multiplexed with the content data, and performs the restoration processing.

(74) The present invention is a data processing device for reproducing content data that is recorded on a recording medium, the content data being protected by encryption with a content key, and data transformation according to an operation that is different to the encryption, the data processing device comprising: an information reading unit operable to read information from the recording medium; a unit operable to decrypt with the content key; a unit operable to store terminal unique information; a unit operable to execute a program for calculating a parameter necessary for restoration of the content data; a unit operable to perform restoration processing of the content data using the calculated information necessary for restoration; and a decoding unit operable to decode the content data.

(75) The present invention is a program that enables a computer to execute the steps included in the data processing method of any of the above (67) to (73).

(76) The present invention is a computer-readable recording medium having recorded thereon a program that enables a computer to execute the steps included in the data processing method of any of the above (67) to (73).

(77) The present invention may be any combination of the above-described embodiments and modifications.

The information recording medium on which is recorded content data encrypted and transformed for protecting copyright and information necessary for reproducing the content data, the data generation method, the data generating device, the data processing method, and the data processing device of the present invention are beneficial in fields such as packaged media.

The invention claimed is:

1. A reproducing device for reproducing content data for content recorded on a recording medium, the content including a plurality of pieces of original partial data, and the content data including a plurality of original packets, at least one transformed packet and at least one restoration-use packet, the at least one transformed packet corresponding to one of the plurality of pieces of original partial data, each of the plurality of original packets corresponding to any one of the plurality of pieces of original partial data other than the one piece of original partial data corresponding to the least one transformed packet, the at least one transformed packet including transformed or altered data, each of the plurality of original packets including a corresponding one of the plurality of pieces of original partial data as-is, the at least one transformed packet including (i) the one piece of the original partial data corresponding thereto as-is except a target part which is a part of the one piece of the original partial data corresponding thereto, and (ii) a transformed part instead of the target part, the transformed part being generated by encrypting the target part, the reproducing device comprising:
a device unique information storage unit operable to store device unique information for uniquely identifying the reproducing device, the device unique information storing unit being a non-transitory memory for storing the device unique information;
an acquisition unit operable to acquire the content data from the recording medium;
an extraction unit operable to extract a piece of restoration information from the at least one restoration-use packet constituting the acquired content data, the least one restoration-use packet being positioned a relative packet count before the at least one transformed packet in the content data, and the at least one restoration-use packet including a piece of restoration information including a relative packet count, an in-packet position, a restoration-use parameter and a restoration instruction flag;
a position specification unit operable to specify, as the at least one transformed packet, a packet positioned the relative packet count included in the extracted piece of restoration information after the at least one restoration-use packet, and specify the position of the transformed part in the at least one transformed packet based on the in-packet position included in the extracted piece of restoration information;
a restoration unit operable to judge which of the following the restoration instruction flag indicates: (a) the restoration processing is performed, (b) the restoration processing is not performed, and (c) the restoration processing is performed depending on the device unique information, and
(i) when the judging indicates that (a) the restoration processing is performed, perform the restoration processing of replacing part of the content data with the restoration-use parameter on the specified position,
(ii) when the judging indicates that (b) the restoration processing is not performed, not to perform the restoration processing, and
(iii) when the judging indicates that (c) the restoration processing is performed depending on the device unique information, perform the restoration processing depending on the device unique information for uniquely identifying the reproducing device on the specified position; and
a reproducing unit operable to reproduce the content data,
wherein the in-packet position indicates a position of the transformed part in the at least one transformed packet, the restoration-use parameter is the target part, and the restoration instruction flag indicates any one of that (a) restoration processing of the transformed part is performed, (b) restoration processing is not performed, and (c) restoration processing is performed depending on the device unique information for uniquely identifying the reproducing device.

2. The reproducing device of claim 1,
wherein the piece of restoration information is encrypted using a secret parameter,
a byte code, in which a procedure of outputting a secret parameter is described in a form executable by the reproducing device, is further recorded on the recording medium, and
the reproducing device further comprises:
a byte code execution unit operable to execute the byte code; and
a decryption unit operable to decrypt the encrypted piece of restoration information using the secret parameter output as a result of executing the byte code, and
wherein the restoration unit performs the restoration processing using the decrypted piece of restoration information.

3. The reproducing device of claim 1,
wherein the piece of restoration information further includes bit position information indicating a bit position in the device unique information, and
when the restoration instruction flag indicates that the restoration processing is performed depending on the device unique information, the restoration unit performs the restoration processing if bit data in the device unique information corresponding to the bit position indicated by the bit position information has a predetermined value.

4. The reproducing device of claim 1, wherein
the restoration-use packet including the piece of restoration information is a transport stream packet including a program map table,
the program map table includes the piece of restoration information, and the extraction unit extracts the piece of restoration information from the transport stream packet including the program map table.

5. A recording device for recording content data for content onto a recording medium, the content data being generated by performing a transforming process on a part of the content, and including a plurality of packets, the recording device comprising:
an input unit operable to receive at least one piece of transformed position information designating a position of a target part on which the transforming process is to be performed in the content;
a transformation control unit operable to generate a restoration-use parameter as the target part and generate at least one piece of restoration information including a relative packet count, an in-packet position, the restoration-use parameter and a restoration instruction flag, the relative packet count indicating a position of at least one transformed packet including a transformed part in units of packets, which is counted from at least one restoration-use packet including the generated piece of restoration information in the content data, the in-packet position indicating a position of the transformed part in the at least one transformed packet, the restoration flag indicating any one of that (a) the restoration processing for the transformed part is performed, (b) the restoration processing is not performed, and (c) the restoration processing is performed depending on device unique information for uniquely identifying a reproducing device;
a multiplexing unit operable to multiplex a plurality of pieces of original partial data and the generated piece of restoration information, by generating (i) a plurality of packets each including at corresponding one of the plurality of pieces of original partial data and (ii) at least one restoration-use packet including the generated piece of restoration information, and by arranging the at least one restoration-use packet including the generated piece of restoration information at the relative packet count before one of the generated plurality of packets which includes the target part designated by the at least one piece of transformed position information;
a transforming process unit operable to specify the packet including the target part among the generated plurality of packets based on the at least one piece of transformed position information, specify the position of the target part in the specified packet based on the at least one piece of transformed position information and perform a transforming process for encrypting the target part at the designated position; and
a storage unit operable to (i) write the plurality of packets including the packet on which the transforming process has been performed and (ii) the at least one restoration-use packet as content data onto the recording medium, the storage unit being a non-transitory memory for storing the device unique information.

6. The recording device of claim 5,
wherein the transformation control unit further encrypts the piece of restoration information using a secret parameter, and generates a byte code including a procedure of outputting the secret parameter, and
the multiplexing unit multiplexes a plurality of pieces of partial data that constitutes the content and each piece of restoration information that has been encrypted, and
the storage unit writes the content data including the encrypted piece of restoration information onto the recording medium, and further writes the generated byte code onto the recording medium.

7. A non-transitory recording medium on which content data for content is recorded, the content including a plurality of pieces of original partial data, the content data including a plurality of original packets, at least one transformed packet and at least one restoration-use packet, the at least one restoration-use packet being positioned a relative packet count before the at least one transformed packet in the content data, the at least one transformed packet corresponding to one of the plurality of pieces of original partial data, each of the plurality of original packets corresponding to any one of the plurality of pieces of original partial data other than the one piece of original partial data corresponding to the at least one transformed packet, the at least one transformed packet including transformed or altered data, each of the plurality of original packets including a corresponding one of the plurality of pieces of original partial data as-is, the at least one transformed packet including (i) the one piece of original partial data corresponding thereto as-is except a target part which is part of the one piece of original partial data corresponding thereto, and (ii) a transformed part instead of the target part, the transformed part being generated by encrypting the target part, the at least one restoration-use packet includes a piece of restoration information including the relative packet count, an in-packet position, a restoration-use parameter and a restoration instruction flag, the in-packet position indicating a position of the transformed part in the at least one transformed packet, the restoration-use parameter being the target part, the restoration instruction flag indicating any one of that (a) restoration processing of the transformed part is performed, (b) the restoration processing is not performed, and (c) the restoration processing is performed depending on device unique information for uniquely identifying a reproducing device.

8. The recording medium of claim 7,
wherein the piece of restoration information is encrypted using a secret parameter, and
a byte code including a procedure of outputting the secret parameter is further recorded on the recording medium.

9. A data processing method used in a reproducing device for reproducing content data for content recorded on a recording medium, the content including a plurality of pieces of original partial data, the content data including a plurality of original packets, at least one transformed packet and at least one restoration-use packet, the at least one transformed, packet corresponding to one of the plurality of pieces of original partial data, each of the plurality of original packets corresponding to any one of the plurality of pieces of original partial data other than the one piece of original partial data corresponding to the at least one transformed packet, the at least one transformed packet including transformed or altered data, each of the plurality of original packets including a corresponding one of the plurality of pieces of original partial data as-is, the at least one transformed packet including (i) the one piece of original partial data corresponding thereto as-is except a target part which is a part of the one piece of original partial data corresponding thereto, and (ii) a transformed part instead of the target part, the transformed part being generated by encrypting the target part, the reproducing device including a device unique information storage unit operable to store the device unique information for uniquely identifying the reproducing device, the device unique information storing unit being a non-transitory memory for storing the device unique information, the data processing method comprising:
acquiring, using an acquisition unit, the content data from the recording medium;

extracting, using an extraction unit, the piece of restoration information from the at least one restoration-use packet constituting the acquired content data, the at least one restoration-use packet being positioned a relative packet count before the at least one transformed packet in the content data, and the at least one restoration-use packet including a piece of restoration information including the relative packet count, an in-packet position, a restoration-use parameter and a restoration instruction flag;

specifying, using a position specification unit, as the at least one transformed packet, a packet positioned at the relative packet count included in the extracted piece of restoration information after the at least one restoration-use packet, and specifying the position of the transformed part in the at least one transformed packet based on the in-packet position included in the extracted piece of restoration information, performing the restoration processing, using a restoration unit, on part of the content data corresponding to the specified position, depending on the restoration instruction flag, including:

judging which of the following the restoration instruction flag indicates: (a) the restoration processing is performed, (b) the restoration processing is not performed, and (c) the restoration processing is performed depending on the device unique information, and (i) when the judging indicates that (a) the restoration processing is performed, performing the restoration processing of replacing part of the content data with the restoration-use parameter on the specified position, (ii) when the judging indicates that (b) the restoration processing is not performed, not performing the restoration processing, and (iii) when the judging indicates that (c) the restoration processing is performed depending on the device unique information, performing the restoration processing depending on the device unique information for uniquely identifying the reproducing device on the specified position; and reproducing the content data after the restoration processing is performed depending on the restoration instruction flag, wherein the in-packet position indicating a position of the transformed part in the at least one transformed packet, the restoration-use parameter being the target part, the restoration instruction flag indicating any one of that (a) restoration processing of the transformed part is performed, (b) the restoration processing is not performed, and (c) the restoration processing is performed depending on the device unique information for uniquely identifying the reproducing device.

10. A non-transitory computer-readable recording medium storing a data processing program used in a reproducing device for reproducing content data for content recorded on a recording medium, the content including a plurality of pieces of original partial data, the content data including a plurality of original packets, at least one transformed packet and at least one restoration-use packet, the at least one transformed packet corresponding to one of the plurality of pieces of original partial data, each of the plurality of original packets corresponding to any one of the plurality of pieces of original partial data other than the one piece of original partial data corresponding to the at least one transformed packet, the at least one transformed packet including transformed or altered data, each of the plurality of original packets including a corresponding one of the plurality of pieces of original partial data as-is, the at least one transformed packet including (i) the one piece of original partial data corresponding thereto as-is except a target part which is part of the one piece of original partial data corresponding thereto, and (ii) a transformed part instead of the target part, the transformed part being generated by encrypting the target part, the data processing program causing a computer to perform steps comprising:

acquiring the content data and the piece of restoration information from the recording medium;

extracting the piece of restoration information from the at least one restoration-use packet constituting the acquired content data, the at least one restoration-use packet being positioned a relative packet count before the at least one transformed packet in the content data, and the at least one restoration-use packet including a piece of restoration information including the relative packet count, an in-packet position, a restoration-use parameter and a restoration instruction flag;

specifying, as the at least one transformed packet, a packet positioned the relative packet count included in the extracted piece of restoration information after the at least one restoration-use packet, and specifying the position of the transformed part in the at least one transformed packet based on the id-packet position included in the extracted piece of restoration information;

performing the restoration processing on part of the content data corresponding to the specified position, depending on the restoration instruction flag, including:

judging which of the following the restoration instruction flag indicates: (a) the restoration processing is performed, (b) the restoration processing is not performed, and (c) the restoration processing is performed depending on the device unique information, and (i) when the judging indicates that (a) the restoration processing is performed, performing the restoration processing of replacing part of the content data with the restoration-use parameter on the specified position, (ii) when the judging indicates that (b) the restoration processing is not performed, not performing the restoration processing, and (iii) when the judging indicates that (c) the restoration processing is performed depending on device unique information for uniquely identifying the reproducing device, performing the restoration processing depending on the device unique information for uniquely identifying the reproducing device on the specified position; and reproducing the content data after the restoration processing is performed depending on the restoration instruction flag, wherein the in-packet position indicating a position of the transformed part in the at least one transformed packet, the restoration-use parameter being the target part, the restoration instruction flag indicating any one of that (a) restoration processing of the transformed part is performed, (b) the restoration processing is not performed, and (c) the restoration processing is performed depending on the device unique information for uniquely identifying the reproducing device, the reproducing device including a device unique information storage unit operable to store the device unique information.

11. An integrated circuit provided in a reproducing device for reproducing content data for content recorded on a recording medium, the content including a plurality of pieces of original partial data, the content data including a plurality of original packets, at least one transformed packet and at least one restoration-use packet, the at least one transformed packet corresponding to one of the plurality of pieces of original partial data, each of the plurality of original packets corresponding to any one of the plurality of pieces of original partial data other than the one piece of original partial data corresponding to the at least one transformed packet, the at least one transformed packet including transformed or altered data, each of the plurality of original packets including a corresponding one of the plurality of pieces of original partial data as-is, the at least one transformed packet including (i) the one piece of original partial data corresponding thereto as-is except a target part which is a part of the one piece of original partial data corresponding thereto, and (ii) a transformed part instead of the target part, the transformed part being generated by encrypting the target part, the integrated circuit comprising:

a device unique information storage unit operable to store device unique information for uniquely identifying the reproducing device, the device unique information storing unit being a non-transitory memory for storing the device unique information;

an acquisition unit operable to acquire the content data and each piece of restoration information from the recording medium;

an extraction unit operable to extract a piece of restoration information from the at least one restoration-use packet constituting the acquired content data, the at least one restoration-use packet being positioned a relative packet count before the at least one transformed packet in the content area, and the at least one restoration-use packet including a piece of restoration information including the relative packet count an in-packet position a restoration-use parameter and a restoration instruction flag;

a position specification unit operable to specify, as the at least one transformed packet, a packet positioned at the relative packet count included in the extracted piece of restoration information after the at least one restoration-use packet, and specify the position of the transformed part in the at least one transformed packet based on the in-packet position included in the extracted piece of restoration information, a restoration unit operable to perform the restoration processing on part of the content data corresponding to the specified position, depending on the restoration instruction flag, the restoration unit judging which of the following the restoration instruction flag indicates: (a) the restoration processing is performed, (b) the restoration processing is not performed, and (c) the restoration processing is performed depending on the device unique information, and (i) when the judging indicates that (a) the restoration processing is performed, perform the restoration processing of replacing part of the content data with the restoration-use parameter on the specified position, (ii) when the judging indicates that (b) the restoration processing is not performed, not to perform the restoration processing, and (iii) when the judging indicates that (c) the restoration processing is performed depending on the device unique information, perform the restoration processing depending on the device unique information for uniquely identifying the reproducing device on the specified position; and a reproducing unit operable to reproduce the content data after the restoration processing is performed depending on the restoration instruction flag, wherein the in-packet position indicating a position of the transformed part in the at least one transformed packet, the restoration-use parameter being the target part, the restoration instruction flag indicating any one of that (a) restoration processing of the transformed part is performed, (b) the restoration processing is not performed, and (c) the restoration processing is performed depending on the device unique information for uniquely identifying the reproducing device.

12. A data recording method used in a recording device for recording content data for content onto a recording medium, the content data being generated by performing a transforming process on a part of the content, and including a plurality of packets, comprising:

receiving, using an input unit, at least one piece of transformed position information designating a position of a target part on which the transforming process is to be performed in the content;

generating, using a transformation control unit, a restoration-use parameter as the target part and generating at least one piece of restoration information including a relative packet count, an in-packet position, the restoration-use parameter and a restoration instruction flag, the relative packet count indicating a position of at least one transformed packet including a transformed part in units of packets, which is counted from at least one restoration-use packet including the generated piece of restoration information in the content data, the in-packet position indicating a position of the transformed part in the at least one transformed packet, the restoration flag indicating any one of that (a) the restoration processing for the transformed part is performed, (b) the restoration processing is not performed, and (c) the restoration processing is performed depending on device unique information for uniquely identifying a reproduction device;

multiplexing, using a multiplexing unit, the plurality of pieces of original partial data and the generated piece of restoration information, by generating (i) a plurality of packets each including a corresponding one of the plurality of pieces of original partial data and (ii) at least one restoration-use packet including the generated piece of restoration information, and by arranging the at least one restoration-use packet including the generated piece of restoration information at the relative packet count before one of the generated plurality of packets which includes the target part designated by the at least one piece of transformed position information;

specifying, using a transforming process unit, the packet including the target part among the generated plurality of packets based on the at least one piece of transformed position information, specifying the position of the target part in the specified packet based on the at least one piece of transformed position information and performing a transforming process for encrypting the target part at the designated position; and writing, using a storage unit, the storage unit being a non-transitory memory for storing the device unique information, (i) the plurality of packets including the packet on which the transforming process has been performed and (ii) the at least one restoration-use packet as content data onto the recording medium.

13. A non-transitory computer-readable recording medium storing a data recording program used in a recording device for recording content data for the content onto a recording medium, the content data being generated by performing a transforming process on a part of the content, and including a plurality of packets, the data recording program causing a computer to perform steps comprising:

receiving at least one piece of transformed position information designating a position of a target part on which the transforming process is to be performed in the content;

generating a restoration-use parameter as the target part and generating at least one piece of restoration information including a relative packet count, an in-packet position, the restoration-use parameter and a restoration instruction flag, the relative packet count indicating a position of at least one transformed packet including a transformed part in units of packets, which is counted from at least one restoration-use packet including the generated piece of restoration information in the content data, the in-packet position indicating a position of the transformed part in the at least one transformed packet, the restoration flag indicating any one of that (a) the restoration processing for the transformed part is performed, (b) the restoration processing is not performed, and (c) the restoration processing is performed depending on device unique information for uniquely identifying a reproduction device;

multiplexing the plurality of pieces of original partial data and the generated piece of restoration information, by generating (i) a plurality of packets each including corresponding of the plurality of pieces of original partial data and (ii) at least one restoration-use packet including the generated piece of restoration information, and by arranging the at least one restoration-use packet including the generated piece of restoration information at the relative packet count before one of the generated plurality of packets which includes the target part designated by the at least one piece of transformed position information;

specifying the packet including the target part among the generated plurality of packets based on the at least one piece of transformed position information, specifying the position of the target part in the specified packet based on the at least one piece of transformed position information and performing a transforming process for encrypting the target part at the designated position; and writing (i) the plurality of packets including the packet on which the transforming process has been performed and (ii) the at least one restoration-use packet as content data onto the recording medium.

14. An integrated circuit provided in a recording device for recording content data for the content onto a recording medium, the content data being generated by performing a transforming process on a part of the content, and including a plurality of packets, comprising:

an input unit operable to receive at least one piece of transformed position information designating a position of a target part on which the transforming process is to be performed in the content;

a transformation control unit operable to generate a restoration-use parameter as the target part and generate at least one piece of restoration information including a relative packet count, an in-packet position, the restoration-use parameter and a restoration instruction flag, the relative packet count indicating a position of at least one transformed packet including a transformed part in units of packets, which is counted from at least one restoration-use packet including the generated piece of restoration information in the content data, the in-packet position indicating a position of the transformed part in the at least one transformed packet, the restoration flag indicating any one of that (a) the restoration processing for the transformed part is performed, (b) the restoration processing is not performed, and (c) the restoration processing is performed depending on device unique information for uniquely identifying a reproduction device;

a multiplexing unit operable to multiplex the plurality of pieces of original partial data and the generated piece of restoration information, by generating (i) a plurality of packets each including a corresponding one of the plurality of pieces of original partial data, and (ii) at least one restoration-use packet including the generated piece of restoration information, and by arranging the at least one restoration-use packet including the generated piece of restoration information at the relative packet count before one of the generated plurality of packets which includes the target part designated by the at least one piece of transformed position information;

a transforming process unit operable to specify the packet including the target part among the generated plurality of packets based on the at least one piece of transformed position information, specify the position of the target part in the specified packet based on the at least one piece of the transformed position information and perform a transforming process for encrypting the target part at the designated position;

a storage unit operable to write (i) the plurality of packets including the packet on which the transforming process has been performed and (ii) the at least one restoration-use packet as content data onto the recording medium, the storage unit being a non-transitory memory for storing the device unique information.

* * * * *